US008394342B2

(12) United States Patent
Felix et al.

(10) Patent No.: US 8,394,342 B2
(45) Date of Patent: Mar. 12, 2013

(54) DENSITY PHASE SEPARATION DEVICE

(75) Inventors: Shenika E. Felix, Hewitt, NJ (US); Jamieson W. Crawford, Demarest, NJ (US); Christopher A. Battles, Seymour, CT (US); Jes Tougaard Gram, Scottsdale, AZ (US)

(73) Assignee: Becton, Dickinson and Company, Franklin Lakes, NJ (US)

(*) Notice: Subject to any disclaimer, the term of this patent is extended or adjusted under 35 U.S.C. 154(b) by 388 days.

(21) Appl. No.: 12/506,866

(22) Filed: Jul. 21, 2009

(65) Prior Publication Data

US 2010/0155319 A1 Jun. 24, 2010

Related U.S. Application Data

(60) Provisional application No. 61/082,356, filed on Jul. 21, 2008, provisional application No. 61/082,365, filed on Jul. 21, 2008.

(51) Int. Cl.

| | |
|---|---|
| ***B01D 45/00*** | (2006.01) |
| ***B01D 21/00*** | (2006.01) |
| ***B01D 12/00*** | (2006.01) |
| ***B01D 17/00*** | (2006.01) |
| ***B01D 43/00*** | (2006.01) |
| ***B04B 1/00*** | (2006.01) |
| ***G01N 1/18*** | (2006.01) |

(52) U.S. Cl. ........ 422/533; 422/527; 422/548; 436/177; 210/513; 210/516

(58) Field of Classification Search .................. 422/533; 210/513

See application file for complete search history.

(56) References Cited

U.S. PATENT DOCUMENTS

| | | | |
|---|---|---|---|
| 2,577,780 | A | 12/1951 | Lockhart |
| 3,326,215 | A | 6/1967 | Sarnoff et al. |
| 3,508,653 | A | 4/1970 | Coleman |
| 3,543,338 | A | 12/1970 | Cooper |
| 3,647,070 | A | 3/1972 | Adler |
| 3,741,400 | A | 6/1973 | Dick |
| 3,771,965 | A | 11/1973 | Grams |
| 3,773,450 | A | 11/1973 | Svanfos |
| 3,779,383 | A | 12/1973 | Ayres |

(Continued)

FOREIGN PATENT DOCUMENTS

| | | |
|---|---|---|
| DE | 19513453 C2 | 3/1997 |
| EP | 0137292 B1 | 3/1990 |

(Continued)

OTHER PUBLICATIONS

U.S. Appl. No. 12/506,841, filed Jul. 21, 2009, by Newby et al., “Density Phase Separation Device”.

(Continued)

*Primary Examiner* — Jill Warden
*Assistant Examiner* — Charles D Hammond
(74) *Attorney, Agent, or Firm* — The Webb Law Firm

(57) ABSTRACT

A mechanical separator for separating a fluid sample into first and second phases is disclosed. The mechanical separator includes a float having a passageway extending between first and second ends thereof with a pierceable head enclosing the first end of the float, a ballast longitudinally moveable with respect to the float, and a bellows extending between a portion of the float and a portion of the ballast. The bellows is adapted for deformation upon longitudinal movement of the float and the ballast, with the bellows isolated from the pierceable head. The float has a first density and the ballast has a second density greater than the first density. The bellows is structured for sealing engagement with a cylindrical wall of a tube, and the pierceable head is structured for application of a puncture tip therethrough. The separation device is suitable for use with a standard medical collection tube.

10 Claims, 35 Drawing Sheets

U.S. PATENT DOCUMENTS 3,780,935 A 12/1973 Lukacs et al.
3,786,985 A 1/1974 Blaivas
3,809,733 A 5/1974 Sandiford et al.
3,814,248 A 6/1974 Lawhead
3,814,258 A 6/1974 Ayres
3,832,110 A 8/1974 Hehl
3,850,174 A 11/1974 Ayres
3,852,194 A 12/1974 Zine, Jr.
3,879,295 A 4/1975 Glover et al.
3,882,021 A 5/1975 Ayres
3,886,928 A 6/1975 Sarstedt
3,887,464 A 6/1975 Ayres
3,890,237 A 6/1975 Welch
3,890,954 A 6/1975 Greenspan
3,891,553 A 6/1975 Ayres
3,894,950 A 7/1975 Ayres et al.
3,894,951 A 7/1975 Ayres
3,894,952 A 7/1975 Ayres
3,897,337 A 7/1975 Ayres
3,897,343 A 7/1975 Ayres
3,901,219 A 8/1975 Kay
3,909,419 A 9/1975 Ayres
3,919,085 A 11/1975 Ayres
3,920,549 A 11/1975 Gigliello et al.
3,929,646 A 12/1975 Adler
3,931,018 A 1/1976 North, Jr.
3,932,277 A 1/1976 McDermott et al.
3,935,113 A 1/1976 Ayres
3,941,699 A 3/1976 Ayres
3,945,928 A 3/1976 Ayres
3,947,176 A 3/1976 Rainville
3,951,801 A 4/1976 Ayres
3,957,654 A 5/1976 Ayres
3,970,565 A 7/1976 Ahlstrand et al.
3,972,812 A 8/1976 Gresl, Jr.
3,981,804 A 9/1976 Gigliello
4,001,122 A 1/1977 Griffin
4,004,868 A 1/1977 Ohdate
4,021,340 A 5/1977 Zine, Jr.
4,027,660 A 6/1977 Wardlaw et al.
4,055,501 A 10/1977 Cornell
4,077,396 A 3/1978 Wardlaw et al.
4,083,788 A 4/1978 Ferrara
4,088,582 A 5/1978 Murty et al.
4,119,125 A 10/1978 Elkins
4,131,549 A 12/1978 Ferrara
4,152,270 A 5/1979 Cornell
4,154,690 A 5/1979 Ballies
4,159,896 A 7/1979 Levine et al.
4,169,060 A 9/1979 Columbus
4,189,385 A 2/1980 Greenspan
4,201,209 A 5/1980 LeVeen et al.
4,202,769 A 5/1980 Greenspan
4,243,362 A 1/1981 Rees et al.
4,246,123 A 1/1981 Cornell et al.
4,257,886 A 3/1981 Kessler
4,275,030 A 6/1981 Mares
4,279,863 A 7/1981 Friehler
4,294,707 A 10/1981 Ikeda et al.
4,315,892 A 2/1982 Stone et al.
4,364,832 A 12/1982 Ballies
4,369,117 A 1/1983 White
4,381,275 A 4/1983 Sorensen
4,396,381 A 8/1983 Fanger et al.
4,409,988 A 10/1983 Greenspan
4,417,981 A 11/1983 Nugent
4,425,235 A 1/1984 Cornell et al.
4,426,290 A 1/1984 Ichikawa et al.
4,443,345 A 4/1984 Wells
4,444,711 A 4/1984 Schad
4,448,741 A 5/1984 Schad
4,464,254 A 8/1984 Dojki et al.
4,470,936 A 9/1984 Potter
4,492,634 A 1/1985 Villa-Real
4,508,676 A 4/1985 Sorensen
4,517,090 A 5/1985 Kersten et al.
4,522,713 A 6/1985 Nussbaumer et al.
4,535,014 A 8/1985 Wright
4,567,754 A 2/1986 Wardlaw et al.
4,569,764 A 2/1986 Satchell
4,602,995 A 7/1986 Cassaday et al.
4,701,292 A 10/1987 Valyi
4,707,276 A 11/1987 Dodge et al.
4,717,324 A 1/1988 Schad et al.
4,726,758 A 2/1988 Sekine et al.
4,803,031 A 2/1989 Ochs et al.
4,818,386 A 4/1989 Burns
4,828,716 A 5/1989 McEwen et al.
4,832,851 A 5/1989 Bowers et al.
4,853,137 A 8/1989 Ersson
4,877,520 A 10/1989 Burns
4,917,801 A 4/1990 Luderer et al.
4,935,184 A 6/1990 Sorensen
4,957,637 A 9/1990 Cornell
4,957,682 A 9/1990 Kobayashi et al.
5,019,243 A 5/1991 McEwen et al.
5,028,226 A 7/1991 De'ath et al.
5,030,341 A 7/1991 McEwen et al.
5,086,784 A 2/1992 Levine et al.
5,236,604 A 8/1993 Fiehler
5,251,474 A 10/1993 Wardlaw et al.
5,269,927 A 12/1993 Fiehler
5,271,852 A 12/1993 Luoma, II
5,282,981 A 2/1994 Adams et al.
5,308,506 A 5/1994 McEwen et al.
5,325,977 A 7/1994 Haynes et al.
5,354,483 A 10/1994 Furse
5,389,265 A 2/1995 Luoma, II
5,393,494 A 2/1995 Greenfield et al.
5,419,835 A 5/1995 Adams et al.
5,454,958 A 10/1995 Fiehler
5,456,885 A 10/1995 Coleman et al.
5,533,518 A 7/1996 Vogler
5,556,541 A 9/1996 Ruschke
5,560,830 A 10/1996 Coleman et al.
5,575,778 A 11/1996 Hardt et al.
5,632,895 A 5/1997 Tsukagoshi et al.
5,632,905 A 5/1997 Haynes
5,651,998 A 7/1997 Bertschi et al.
5,707,876 A 1/1998 Levine
5,736,033 A 4/1998 Coleman et al.
5,755,360 A 5/1998 Elliott
5,785,925 A 7/1998 U'Ren
5,789,033 A 8/1998 Bertschi et al.
5,798,069 A 8/1998 Bertschi et al.
5,902,276 A 5/1999 Namey, Jr.
5,955,009 A 9/1999 Kazuma
6,001,087 A 12/1999 Zurcher
6,074,613 A 6/2000 Harness et al.
6,106,261 A 8/2000 von Holdt
6,174,447 B1 1/2001 Spindler
6,225,123 B1 5/2001 Cohen et al.
6,277,331 B1 8/2001 Konrad
6,280,400 B1 8/2001 Niermann
6,296,796 B1 10/2001 Gordon
6,379,139 B1 4/2002 Boucherie
6,390,966 B2 5/2002 Anderson
6,406,671 B1 6/2002 DiCesare et al.
6,409,528 B1 6/2002 Bodnar
6,464,921 B1 10/2002 Armbruster
6,465,256 B1 10/2002 Iskra
6,471,069 B2 10/2002 Lin et al.
6,479,298 B1 11/2002 Miller et al.
6,497,325 B1 12/2002 DiCesare et al.
6,516,953 B1 2/2003 DiCesare et al.
6,537,503 B1 3/2003 Conway
6,558,149 B1 5/2003 Bodmer et al.
6,582,904 B2 6/2003 Dahm
6,593,145 B2 7/2003 Macfarlane et al.
6,607,685 B2 8/2003 Naritomi et al.
6,623,688 B2 9/2003 Gedritis et al.
6,740,240 B2 5/2004 Coville et al.
6,758,804 B2 7/2004 Anderson
6,783,346 B2 8/2004 Bodmer et al.
6,793,892 B1 9/2004 Niermann
6,803,022 B2 10/2004 DiCesare et al.
6,866,811 B2 3/2005 Kayano et al.

| | | | |
|---|---|---|---|
| 6,933,148 | B2 | 8/2005 | Collins et al. |
| 6,976,509 | B1 | 12/2005 | Kirvan |
| 7,074,577 | B2 | 7/2006 | Haubert et al. |
| 7,077,273 | B2 | 7/2006 | Ellsworth et al. |
| 7,153,477 | B2 | 12/2006 | DiCesare et al. |
| 7,158,854 | B1 | 1/2007 | Kolander |
| 7,179,391 | B2 | 2/2007 | Leach et al. |
| 7,188,734 | B2 | 3/2007 | Konrad |
| 7,205,157 | B2 | 4/2007 | Jurgensen et al. |
| 7,211,433 | B1 | 5/2007 | Dahm et al. |
| 7,220,593 | B2 | 5/2007 | Haubert et al. |
| 7,223,346 | B2 | 5/2007 | Dorian et al. |
| 7,282,168 | B2 | 10/2007 | Downer et al. |
| 7,294,311 | B2 | 11/2007 | Coville |
| 2002/0023884 | A1 | 2/2002 | Anderson |
| 2002/0094305 | A1 | 7/2002 | DiCesare et al. |
| 2002/0132367 | A1 | 9/2002 | Miller et al. |
| 2002/0156439 | A1 | 10/2002 | Iskra |
| 2002/0185778 | A1 | 12/2002 | Armbruster |
| 2003/0028154 | A1 | 2/2003 | Ross |
| 2003/0039717 | A1 | 2/2003 | Hwang et al. |
| 2003/0205538 | A1 | 11/2003 | Dorian et al. |
| 2004/0013575 | A1 | 1/2004 | Stevens et al. |
| 2004/0059255 | A1 | 3/2004 | Manoussakis et al. |
| 2004/0129631 | A1 | 7/2004 | Anraku et al. |
| 2004/0149287 | A1 | 8/2004 | Namey, Jr. |
| 2004/0166029 | A1 | 8/2004 | Losada et al. |
| 2004/0210196 | A1 | 10/2004 | Bush Jr. et al. |
| 2004/0241364 | A1 | 12/2004 | Zihlmann |
| 2005/0033237 | A1 | 2/2005 | Fentress et al. |
| 2005/0037165 | A1 | 2/2005 | Ahern et al. |
| 2005/0059163 | A1 | 3/2005 | Dastane et al. |
| 2005/0170114 | A1 | 8/2005 | Hill |
| 2005/0186120 | A1 | 8/2005 | Dorian et al. |
| 2006/0032825 | A1 | 2/2006 | Ellsworth et al. |
| 2006/0036231 | A1 | 2/2006 | Conard et al. |
| 2006/0068206 | A1 | 3/2006 | Hala et al. |
| 2006/0089602 | A1 | 4/2006 | Boucherie |
| 2006/0263266 | A1 | 11/2006 | DiCesare et al. |
| 2007/0034579 | A1 | 2/2007 | Dorian et al. |
| 2007/0096364 | A1 | 5/2007 | Hahn et al. |
| 2007/0191775 | A1 | 8/2007 | Diep et al. |
| 2007/0267776 | A1 | 11/2007 | Conard et al. |
| 2008/0023414 | A1 | 1/2008 | Konrad |

FOREIGN PATENT DOCUMENTS

| | | | |
|---|---|---|---|
| EP | 0184274 | B1 | 5/1992 |
| EP | 0385953 | B1 | 4/1993 |
| EP | 0537507 | A1 | 4/1993 |
| EP | 0399151 | B1 | 8/1994 |
| EP | 0638804 | A1 | 2/1995 |
| EP | 0520184 | B1 | 1/1996 |
| EP | 0520185 | B1 | 2/1996 |
| EP | 0638171 | B1 | 6/1996 |
| EP | 0753741 | A1 | 1/1997 |
| EP | 0494079 | B1 | 3/1997 |
| EP | 0766973 | A1 | 4/1997 |
| EP | 0493838 | B1 | 5/1997 |
| EP | 0627261 | B1 | 5/1998 |
| EP | 0640215 | B1 | 11/1998 |
| EP | 0817680 | B1 | 12/1999 |
| EP | 0678557 | B1 | 6/2000 |
| EP | 1005910 | A2 | 6/2000 |
| EP | 1016460 | A2 | 7/2000 |
| EP | 0688606 | B1 | 12/2000 |
| EP | 1106252 | A2 | 6/2001 |
| EP | 0739229 | B1 | 10/2001 |
| EP | 0744026 | B1 | 11/2001 |
| EP | 1205250 | A1 | 5/2002 |
| EP | 1221342 | A2 | 7/2002 |
| EP | 0875757 | B1 | 6/2003 |
| EP | 0928301 | B1 | 1/2004 |
| EP | 1005909 | B1 | 5/2004 |
| EP | 1107002 | B1 | 8/2004 |
| EP | 1192996 | B1 | 8/2004 |
| EP | 1106250 | B1 | 4/2005 |
| EP | 1106251 | B1 | 11/2005 |
| EP | 1106253 | B1 | 11/2005 |
| EP | 1014088 | B1 | 3/2006 |
| EP | 1006360 | B1 | 5/2006 |
| EP | 1693109 | A1 | 8/2006 |
| EP | 1189967 | B1 | 3/2007 |
| EP | 1772191 | A1 | 4/2007 |
| EP | 1509326 | B1 | 6/2007 |
| EP | 1289618 | B1 | 1/2008 |
| GB | 2293986 | A | 4/1996 |
| JP | 55-55259 | A | 4/1980 |
| JP | 64-23166 | A | 1/1989 |
| JP | 1-295164 | A | 11/1989 |
| JP | 3270701 | A | 12/1991 |
| JP | 7-103969 | A | 4/1995 |
| JP | 8-201380 | A | 8/1996 |
| JP | 9292393 | A | 11/1997 |
| JP | 11-314011 | A | 11/1999 |
| JP | 2000-74910 | A | 3/2000 |
| JP | 2000199760 | A | 7/2000 |
| JP | 2003185653 | A | 7/2003 |
| JP | 2007-244925 | A | 9/2007 |
| WO | 9322673 | A1 | 11/1993 |
| WO | 9520675 | A1 | 8/1995 |
| WO | 9605770 | A1 | 2/1996 |
| WO | 9609308 | A1 | 3/1996 |
| WO | 9712679 | A1 | 4/1997 |
| WO | 9851411 | A2 | 11/1998 |
| WO | 0114850 | A1 | 3/2001 |
| WO | 0181002 | A1 | 11/2001 |
| WO | 0209840 | A1 | 2/2002 |
| WO | 02073190 | A1 | 9/2002 |
| WO | 03099412 | A1 | 12/2003 |
| WO | 2004030826 | A2 | 4/2004 |
| WO | 2004031770 | A1 | 4/2004 |
| WO | 2005014173 | A1 | 2/2005 |
| WO | 2005080965 | A1 | 9/2005 |
| WO | 2006104636 | A1 | 10/2006 |
| WO | 2006121728 | A2 | 11/2006 |
| WO | 2006135856 | A2 | 12/2006 |
| WO | 2007095450 | A2 | 8/2007 |
| WO | 2008049359 | A1 | 5/2008 |
| WO | 2008097091 | A1 | 8/2008 |
| WO | 2008127639 | A1 | 10/2008 |

OTHER PUBLICATIONS

U.S. Appl. No. 12/506,852, filed Jul. 21, 2009, by Ellis et al., "Density Phase Separation Device".

DENSITY PHASE SEPARATION DEVICE

CROSS REFERENCE TO RELATED APPLICATION

This application claims priority to U.S. Provisional Patent Application No. 61/082,356, filed Jul. 21, 2008, entitled "Density Phase Separation Device", and to U.S. Provisional Patent Application No. 61/082,365 filed Jul. 21, 2008, entitled "Density Phase Separation Device", the entire disclosures of each of which are herein incorporated by reference.

BACKGROUND OF THE INVENTION

1. Field of the Invention

The subject invention relates to a device for separating heavier and lighter fractions of a fluid sample. More particularly, this invention relates to a device for collecting and transporting fluid samples whereby the device and fluid sample are subjected to centrifugation in order to cause separation of the heavier fraction from the lighter fraction of the fluid sample.

2. Description of Related Art

Diagnostic tests may require separation of a patient's whole blood sample into components, such as serum or plasma, (the lighter phase component), and red blood cells, (the heavier phase component). Samples of whole blood are typically collected by venipuncture through a cannula or needle attached to a syringe or an evacuated blood collection tube. After collection, separation of the blood into serum or plasma and red blood cells is accomplished by rotation of the syringe or tube in a centrifuge. In order to maintain the separation, a barrier must be positioned between the heavier and lighter phase components. This allows the separated components to be subsequently examined.

A variety of separation barriers have been used in collection devices to divide the area between the heavier and lighter phases of a fluid sample. The most widely used devices include thixotropic gel materials, such as polyester gels. However, current polyester gel serum separation tubes require special manufacturing equipment to both prepare the gel and fill the tubes. Moreover, the shelf-life of the product is limited. Over time, globules may be released from the gel mass and enter one or both of the separated phase components. These globules may clog the measuring instruments, such as the instrument probes used during the clinical examination of the sample collected in the tube. Furthermore, commercially available gel barriers may react chemically with the analytes. Accordingly, if certain drugs are present in the blood sample when it is taken, an adverse chemical reaction with the gel interface can occur.

Certain mechanical separators have also been proposed in which a mechanical barrier can be employed between the heavier and lighter phases of the fluid sample. Conventional mechanical barriers are positioned between heavier and lighter phase components utilizing differential buoyancy and elevated gravitational forces applied during centrifugation. For proper orientation with respect to plasma and serum specimens, conventional mechanical separators typically require that the mechanical separator be affixed to the underside of the tube closure in such a manner that blood fill occurs through or around the device when engaged with a blood collection set. This attachment is required to prevent the premature movement of the separator during shipment, handling, and blood draw. Conventional mechanical separators are affixed to the tube closure by a mechanical interlock between the bellows component and the closure. One example of such a device is described in U.S. Pat. No. 6,803,022.

Conventional mechanical separators have some significant drawbacks. As shown in FIG. 1, conventional separators include a bellows 34 for providing a seal with the tube or syringe wall 38. Typically, at least a portion of the bellows 34 is housed within, or in contact with a closure 32. As shown in FIG. 1, as the needle 30 enters through the closure 32, the bellows 34 is depressed. This creates a void 36 in which blood may pool during insertion or removal of the needle. This can result in sample pooling under the closure, device pre-launch in which the mechanical separator prematurely releases during blood collection, trapping of a significant quantity of fluid phases, such as serum and plasma, and/or poor sample quality. Furthermore, previous mechanical separators are costly and complicated to manufacture due to the complicated multi-part fabrication techniques.

Accordingly, a need exists for a separator device that is compatible with standard sampling equipment and reduces or eliminates the aforementioned problems of conventional separators. A need also exists for a separator device that is easily used to separate a blood sample, minimizes cross-contamination of the heavier and lighter phases of the sample during centrifugation, is independent of temperature during storage and shipping and is stable to radiation sterilization.

SUMMARY OF THE INVENTION

The present invention is directed to an assembly for separating a fluid sample into a higher specific gravity phase and a lower specific gravity phase. Desirably, the mechanical separator of the present invention may be used with a tube, and the mechanical separator is structured to move within the tube under the action of applied centrifugal force in order to separate the portions of a fluid sample. Most preferably, the tube is a specimen collection tube including an open end, a second end, and a sidewall extending between the open end and second end. The sidewall includes an outer surface and an inner surface and the tube further includes a closure disposed to fit in the open end of the tube with a resealable septum. Alternatively, both ends of the tube may be open, and both ends of the tube may be sealed by elastomeric closures. At least one of the closures of the tube may include a needle pierceable resealable septum.

The mechanical separator may be disposed within the tube at a location between the top closure and the bottom of the tube. The separator includes opposed top and bottom ends and includes a float having a pierceable head, a ballast, and a bellows. The components of the separator are dimensioned and configured to achieve an overall density for the separator that lies between the densities of the phases of a fluid sample, such as a blood sample.

In one embodiment, the mechanical separator for separating a fluid sample into first and second phases within a tube includes a float having a passageway extending between first and second ends thereof with a pierceable head enclosing the first end of the float. The mechanical separator also includes a ballast longitudinally moveable with respect to the float, and a bellows extending between a portion of the float and a portion of the ballast, the bellows adapted for deformation upon longitudinal movement of the float and the ballast. The bellows of the mechanical separator are isolated from the pierceable head. In one embodiment, the float has a first density and the ballast has a second density, wherein the first density is less than the second density.

The pierceable head of the mechanical separator is structured to resist deformation upon application of a puncture tip therethrough. The pierceable head may comprise a rim portion for engagement with a closure, and optionally, the rim portion may define at least one notch.

The pierceable head may be received at least partially within an upper recess of the float. The bellows may be circumferentially disposed about at least a portion of the float. In one configuration, the pierceable head and the bellows are isolated by a portion of the float. In another configuration, the pierceable head and the bellows are isolated by a neck portion of the float. In yet another configuration, the bellows includes an interior wall defining a restraining surface, and the float includes a shoulder for engaging the restraining surface.

The ballast can define an interlock recess for accommodating a portion of the bellows for attachment thereto. In this manner, the bellows and the ballast can be secured. Additionally, the ballast can include an exterior surface defining an annular shoulder circumferentially disposed within the exterior surface to assist in the assembly process.

In one embodiment of the mechanical separator, the float can be made of polypropylene, the pierceable head can be made of a thermoplastic elastomer (TPE), such as Kraton®, commercially available from Kraton Polymers, LLC, the bellows can also be made of a thermoplastic elastomer, and the ballast can be made of polyethylene terephthalate (PET).

In another embodiment, a separation assembly for enabling separation of a fluid sample into first and second phases includes a tube, having an open end, a second end, and a sidewall extending therebetween, and a closure adapted for sealing engagement with the open end of the tube. The closure defines a recess and the separation assembly includes a mechanical separator releasably engaged within the recess. The mechanical separator includes a float having a passageway extending between first and second ends thereof with a pierceable head enclosing the first end of the float. The mechanical separator also includes a ballast longitudinally moveable with respect to the float, and a bellows extending between a portion of the float and a portion of the ballast, the bellows adapted for deformation upon longitudinal movement of the float and the ballast. The bellows of the mechanical separator are isolated from the pierceable head. In one embodiment, the float has a first density and the ballast has a second density, wherein the first density is less than the second density.

The pierceable head of the float may be structured to resist deformation upon application of a puncture tip therethrough. In one configuration, the pierceable head and the bellows are isolated by a portion of the float. In another configuration, the pierceable head and the bellows are isolated by a neck portion of the float. Optionally, the bellows includes an interior wall defining a restraining surface, and the float comprises a shoulder for engaging the restraining surface. The ballast may define an interlock recess for accommodating a portion of the bellows for attachment thereto.

In another embodiment, the mechanical separator includes a first sub-assembly including a float having a pierceable head enclosing a first end thereof, and a second sub-assembly having a ballast and a bellows. The first sub-assembly may have a first density and the second sub-assembly may have a second density, the second density being greater than the first density of the first sub-assembly. The first sub-assembly and the second sub-assembly may be attached through the bellows such that the ballast is longitudinally movable with respect to the float upon deformation of the bellows. The bellows of the second sub-assembly is isolated from the pierceable head of the first sub-assembly.

In yet another embodiment of the present invention, a method of assembling a mechanical separator includes the steps of providing a first sub-assembly, the first sub-assembly including a float with a neck and a pierceable head, providing a second sub-assembly, the second sub-assembly including a bellows extending from a ballast and including an interior restraining surface, and joining the first sub-assembly with the second sub-assembly. The first sub-assembly and the second sub-assembly are joined such that the neck of the float is in mechanical interface with the interior restraining surface of the bellows. The float may have a first density and the ballast may have a second density greater than the first density of the float. Optionally, the joining step includes inserting and guiding the float through an interior of the bellows until the neck of the float is in mechanical interface with the interior restraining surface of the bellows. The ballast may also include an exterior surface defining an annular shoulder circumferentially disposed thereabout for receipt of a mechanical assembler therein.

In another embodiment of the present invention, a separation assembly for enabling separation of a fluid sample into first and second phases includes a closure adapted for sealing engagement with a tube, with the closure defining a recess. The separation assembly further includes a mechanical separator. The mechanical separator includes a float defining a passageway extending between first and second ends thereof with a pierceable head enclosing the first end of the float. The pierceable head is releasably engaged within the recess. The mechanical separator also includes a ballast longitudinally movable with respect to the float, the ballast having a second density greater than the first density of the float. The mechanical separator further includes a bellows extending between a portion of the float and a portion of the ballast, the bellows being adapted for deformation upon longitudinal movement of the float and the ballast with the bellows being isolated from the pierceable head.

In one configuration, the interface between the closure and the mechanical separator occurs only between the pierceable head and the recess. The separation assembly may also be configured such that the mechanical separator may be released from the closure without elongation of the deformable bellows.

In accordance with another embodiment of the present invention, a mechanical separator for separating a fluid sample into first and second phases within a tube includes a float comprising a passageway extending between a first upwardly oriented end and a second downwardly oriented end thereof. The mechanical separator also includes a ballast longitudinally movable with respect to the float, and a bellows extending between a portion of the float and a portion of the ballast, the bellows being adapted for deformation upon longitudinal movement of the float and the ballast, and isolated from the first upwardly oriented end of the float.

In accordance with another embodiment of the present invention, a separation assembly for enabling separation of a fluid sample into first and second phases includes a tube having an open end, a second end, and a sidewall extending therebetween. The separation assembly also includes a closure adapted for sealing engagement with the open end of the tube, the closure defining a recess, and a mechanical separator releasably engaged within the recess. The mechanical separator includes a float having a passageway extending between a first upwardly oriented end and a second downwardly oriented end thereof. The mechanical separator also includes a ballast longitudinally movable with respect to the float, and a bellows extending between a portion of the float and a portion of the ballast. The bellows being adapted for deformation upon longitudinal movement of the float and the ballast, and isolated from the first upwardly oriented end of the float. Optionally, the separation assembly is adapted to introduce a fluid sample into the tube and around the mechanical separator without passing through the mechanical separator.

In accordance with yet another embodiment of the present invention, a mechanical separator for separating a fluid sample into first and second phases within a tube includes a float defining an interior having a moveable plug disposed therein. The moveable plug is adapted to transition from a first position to a second position along a longitudinal axis of the float in response to expansion of the fluid sample within the interior of the float.

In one configuration, the float defines a transverse hole and the moveable plug defines a transverse hole substantially aligned with the transverse hole of the float in the first position and blocked by a portion of the float in the second position. Optionally, the moveable plug is restrained within the interior of the float by a pierceable head. The mechanical separator may also include a ballast longitudinally movable with respect to the float, and a bellows extending between a portion of the float and a portion of the ballast. The bellows may be adapted for deformation upon longitudinal movement of the float and the ballast, and may be isolated from the first upwardly oriented end of the float.

In accordance with yet a further embodiment of the present invention, a mechanical separator for separating a fluid sample into first and second phases within a tube includes a float, a ballast longitudinally movable with respect to the float, and a bellows extending between a portion of the float and a portion of the ballast. The bellows may be adapted for deformation upon longitudinal movement of the float and the ballast, and may be adapted to separate at least partially from the float to allow venting of gas therebetween.

The assembly of the present invention is advantageous over existing separation products that utilize separation gel. In particular, the assembly of the present invention will not interfere with analytes, whereas many gels interact with bodily fluids. Another attribute of the present invention is that the assembly of the present invention will not interfere with therapeutic drug monitoring analytes.

The assembly of the present invention is also advantageous over existing mechanical separators in that the separate pierceable head and bellows allows for isolating the seal function of the bellows from the needle interface of the mechanical separator. This enables different materials or material thicknesses to be used in order to optimize the respective seal function and needle interface function. Also, this minimizes device pre-launch by providing a more stable target area at the puncture tip interface to reduce sample pooling under the closure. In addition, pre-launch is further minimized by precompression of the pierceable head against the interior of the stopper. The reduced clearance between the exterior of the float and the interior of the ballast minimizes the loss of trapped fluid phases, such as serum and plasma. Additionally, the assembly of the present invention does not require complicated extrusion techniques during fabrication, and may optimally employ two-shot molding techniques.

As described herein, the mechanical separator of the present invention does not occlude an analysis probe like traditional gel tubes. Further details and advantages of the invention will become clear from the following detailed description when read in conjunction with the accompanying drawings.

DESCRIPTION OF THE PREFERRED EMBODIMENTS

Figure 1:
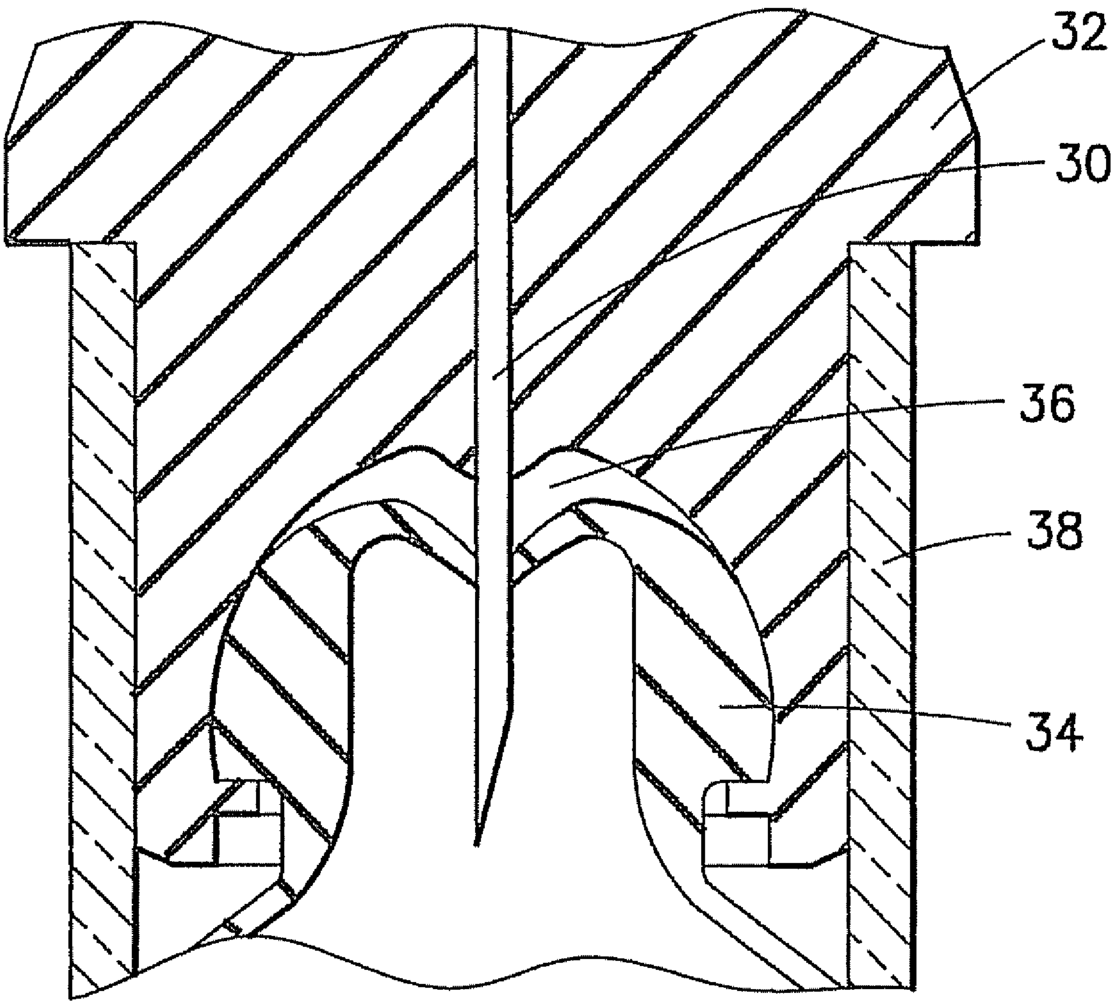
FIG. 1 PRIOR ART
FIG. 1 is a partial cross-sectional side view of a conventional mechanical separator.

For purposes of the description hereinafter, the words “upper”, “lower”, “right”, “left”, “vertical”, “horizontal”, “top”, “bottom”, “lateral”, “longitudinal” and like spatial terms, if used, shall relate to the described embodiments as oriented in the drawing figures. However, it is to be understood that many alternative variations and embodiments may be assumed except where expressly specified to the contrary.

It is also to be understood that the specific devices and embodiments illustrated in the accompanying drawings and described herein are simply exemplary embodiments of the invention.

Figure 2:
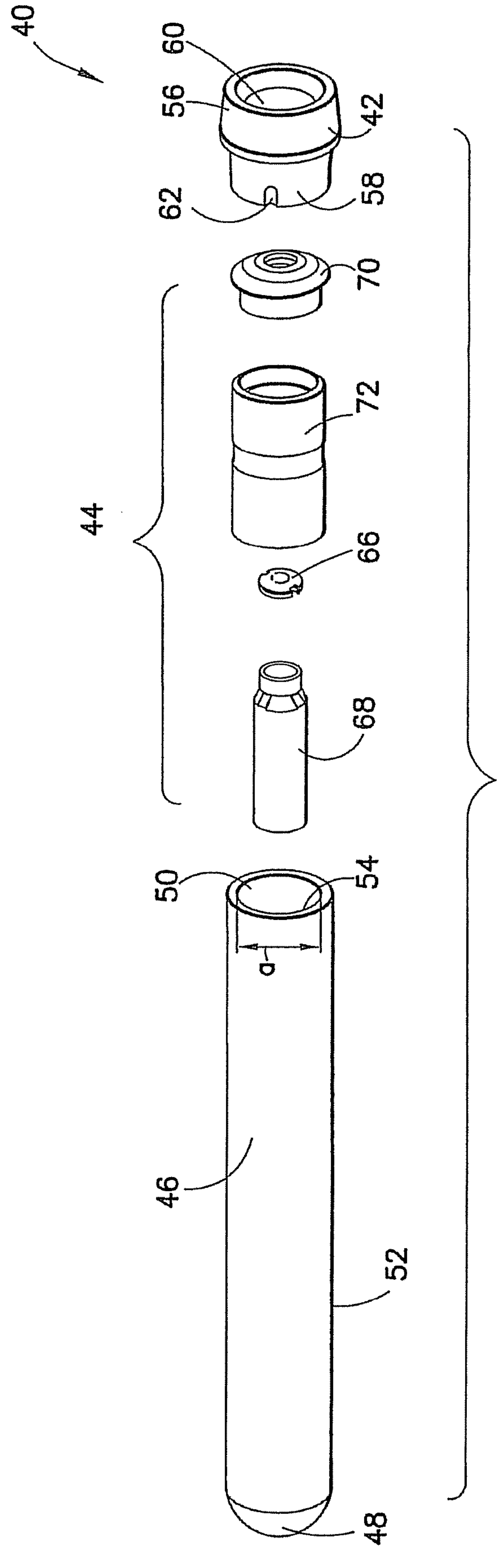
FIG. 2 is an exploded perspective view of a mechanical separator assembly including a closure, a bellows, a ballast, a pierceable head, a float, and a collection tube in accordance with an embodiment of the present invention.

As shown in exploded perspective view in FIG. 2, the mechanical separator assembly 40 of the present invention includes a closure 42 with a mechanical separator 44, for use in connection with a tube 46 for separating a fluid sample into first and second phases within the tube 46. The tube 46 may be a sample collection tube, such as a proteomics, molecular diagnostics, chemistry sample tube, blood or other bodily fluid collection tube, coagulation sample tube, hematology sample tube, and the like. Desirably tube 46 is an evacuated blood collection tube. In one embodiment, the tube 46 may contain additional additives as required for particular testing procedures, such as clot inhibiting agents, clotting agents, and the like. Such additives may be in particle or liquid form and may be sprayed onto the cylindrical sidewall 52 of the tube 46 or located at the bottom of the tube 46. The tube 46 includes a closed bottom end 48, such as an apposing end, an open top end 50, and a cylindrical sidewall 52 extending therebetween. The cylindrical sidewall 52 includes an inner surface 54 with an inside diameter "a" extending substantially uniformly from the open top end 50 to a location substantially adjacent the closed bottom end 48.

The tube 46 may be made of one or more than one of the following representative materials: polypropylene, polyethylene terephthalate (PET), glass, or combinations thereof. The tube 46 can include a single wall or multiple wall configurations. Additionally, the tube 46 may be constructed in any practical size for obtaining an appropriate biological sample. For example, the tube 46 may be of a size similar to conventional large volume tubes, small volume tubes, or microtainer tubes, as is known in the art. In one particular embodiment, the tube 46 may be a standard 3 ml evacuated blood collection tube, as is also known in the art.

Figure 3:
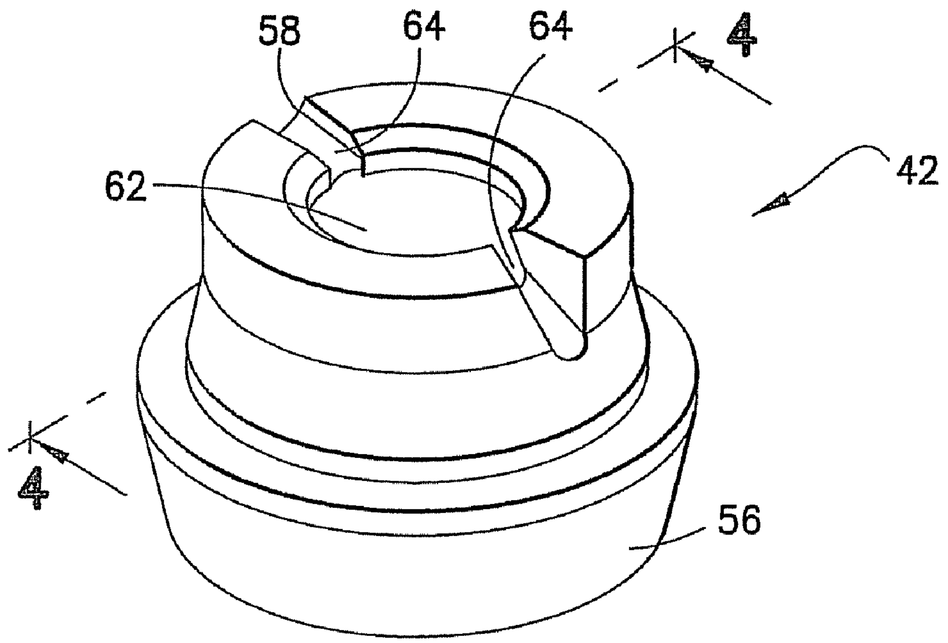
FIG. 3 is a perspective view of the bottom surface of the closure of FIG. 2.
Figure 4:
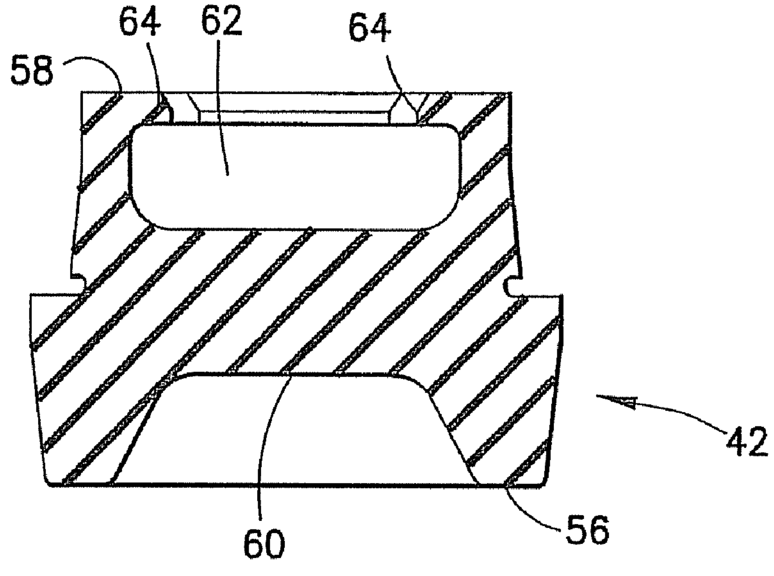
FIG. 4 is a cross-sectional view of the closure of FIG. 2, taken along line 4-4 of FIG. 3.

The open top end 50 is structured to at least partially receive the closure 42 therein to faun a liquid impermeable seal. The closure includes a top end 56 and a bottom end 58 structured to be at least partially received within the tube 46. Portions of the closure 42 adjacent the top end 56 defines a maximum outer diameter which exceeds the inside diameter "a" of the tube 46. As shown in FIGS. 2-4, portions of the closure 42 at the top end 56 include a central recess 60 which define a pierceable resealable septum. Portions of the closure 42 extending downwardly from the bottom end 58 may taper from a minor diameter which is approximately equal to, or slightly less than, the inside diameter "a" of the tube 46 to a major diameter that is greater than the inside diameter "a" of the tube 46 at the top end 56. Thus, the bottom end 58 of the closure 42 may be urged into a portion of the tube 46 adjacent the open top end 50. The inherent resiliency of closure 42 can insure a sealing engagement with the inner surface of the cylindrical sidewall 52 of the tube 46.

In one embodiment, the closure 42 can be formed of a unitarily molded elastomeric material, having any suitable size and dimensions to provide sealing engagement with the tube 46. The closure 42 can also be formed to define a bottom recess 62 extending into the bottom end 58. The bottom recess 62 may be sized to receive at least a portion of the mechanical separator 44. Additionally, a plurality of spaced apart arcuate flanges 64 may extend around the bottom recess 62 to at least partially restrain the mechanical separator 44 therein.

Referring again to FIG. 2, the mechanical separator 44 includes a pierceable head 66, a float 68 engaged with a portion of the pierceable head 66, a bellows 70 disposed about a portion of the float 68, and a ballast 72 disposed about at least a portion of the float 68 and engaged with the bellows 70.

Figure 5:
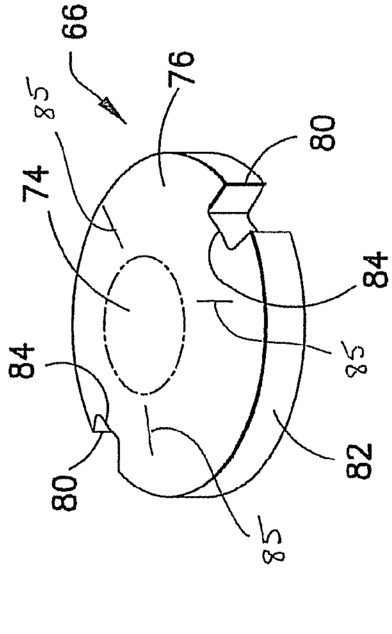
FIG. 5 is a perspective view of the pierceable head of FIG. 2.
Figure 6:
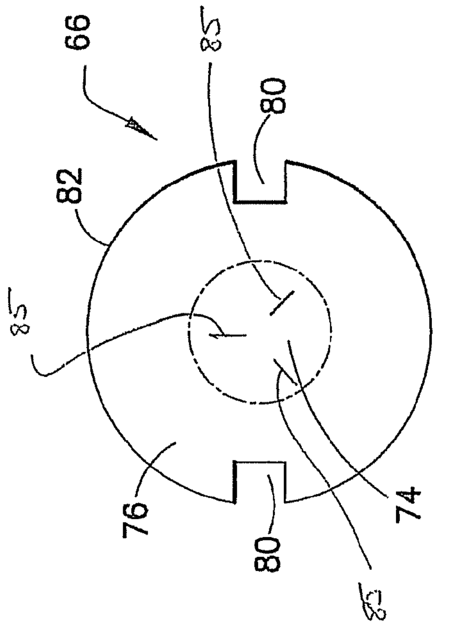
FIG. 6 is a top view of the pierceable head of FIG. 2.
Figure 7:
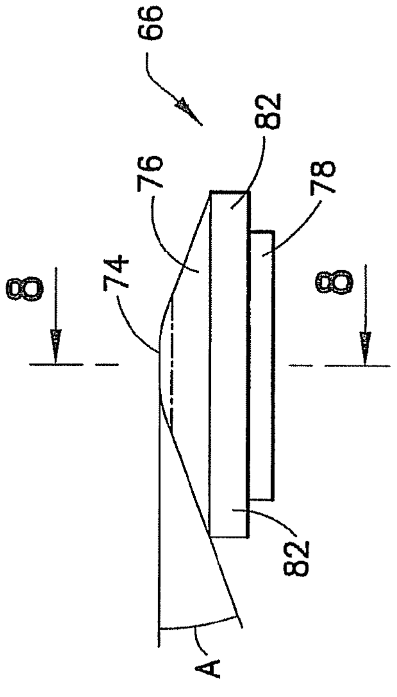
FIG. 7 is a side view of the pierceable head of FIG. 2.

Referring to FIGS. 5-8, the pierceable head 66 of the mechanical separator 44 may be extruded and/or molded of a resiliently deformable and self-sealable material, such as TPE. The pierceable head 66 includes an upper rim portion 76 and a lower portion 78, opposite the upper rim portion 76. The upper rim portion 76 may have a generally curved shape for correspondingly mating to the shape of the bottom recess 62 of the closure 42, shown in FIGS. 3-4. In order to mitigate pre-launch, the pierceable head 66 may be precompressed against the bottom recess 62 of the closure 42. In one embodiment, as shown in FIG. 7, the upper rim portion 76 of the pierceable head 66 has a curvature angle A of about 20 degrees. In another embodiment, the upper rim portion 76 of the pierceable head 66 includes a slightly tapered or flattened portion 74. The portion 74 can have any suitable dimensions, however, it is preferable that the portion 74 have a diameter of from about 0.120 inch to about 0.150 inch.

Figure 26:
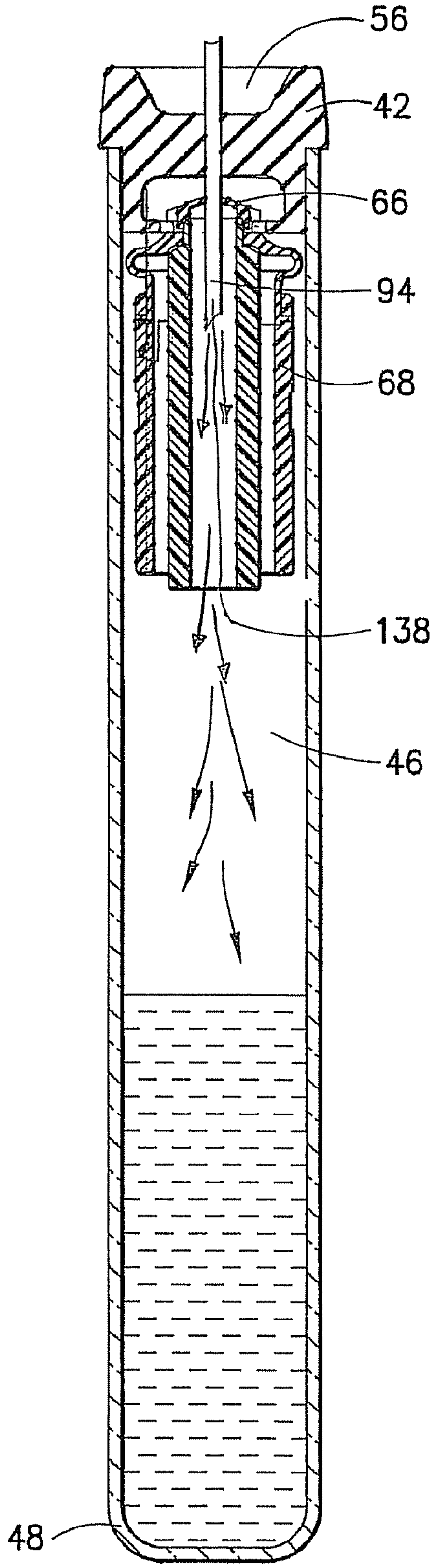
FIG. 26 is a cross-sectional front view of the assembly of FIG. 25 having a needle accessing the interior of the tube and an amount of fluid provided through the needle into the interior of the tube in accordance with an embodiment of the present invention.

The portion 74 of the pierceable head 66 is structured to allow a puncture tip, shown in FIG. 26, such as a needle tip, needle cannula, or probe, to pass therethrough. Upon withdrawal of the puncture tip from the portion 74, the pierceable head 66 is structured to reseal itself to provide a liquid impermeable seal. The flattened shape of the portion 74 allows for a penetration by the puncture tip without significant deformation. In one embodiment, the portion 74 of the pierceable head 66 is structured to resist deformation upon application of a puncture tip therethrough. The generally curved shape of the upper rim portion 76 and the small diameter of the portion 74 make the pierceable head 66 of the present invention more stable and less likely to "tent" than the pierceable region of existing mechanical separators. To further assist in limiting sample pooling and premature release of the separator 44 from the bottom recess 62 of the closure 42, the portion 74 of the pierceable head 66 may optionally include a thickened region, such as from about 0.010 inch to about 0.030 inch thicker than other portions of the upper rim portion 76 of the pierceable head 66.

The pierceable head 66 also includes a lower portion 78, opposite the upper rim portion 76, structured to engage at least a portion of the float 68, shown in FIG. 2. The pierceable head 66 may define at least one cut-out notch 80, shown in FIGS. 5-6, extending from the upper rim portion 76 to the lower portion 78 and from an outer circumference 82 of the upper rim portion 76 to a location 84 circumferentially inward from the outer circumference 82. The cut-out notch 80 may be provided to allow the upper rim portion 76 of the pierceable head 66 to bend, such as upon application of a puncture tip through the access portion 74, without significant resulting hoop-stress to the pierceable head 66. In one embodiment, a plurality of cut-out notches 80 may be provided at a plurality of locations about the outer circumference 82 of the pierceable head 66. A plurality of cut-out notches 80 may enable the pierceable head 66 to flex in such a manner as to control the release load of the mechanical separator 44 from the closure 42.

Figure 8:
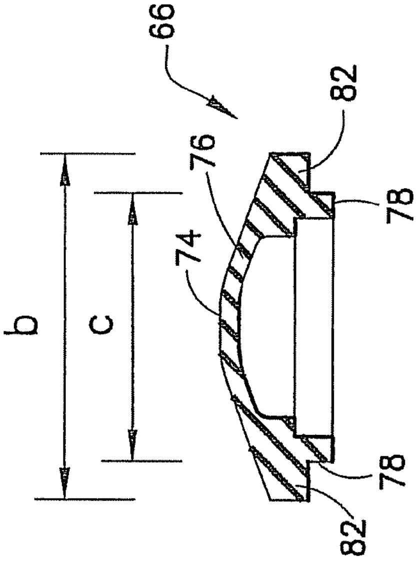
FIG. 8 is a cross-sectional view of the pierceable head of FIG. 2, taken along line 8-8 of FIG. 7.

As shown in FIGS. 7-8, the upper rim portion 76 of the pierceable head 66 may include an extended portion 82 dimensioned to overhang the lower portion 78. In one embodiment, the extended portion 82 of the pierceable head 66 may be dimensioned to have a diameter "b" that is greater than the diameter "c" of the lower portion 78. In another embodiment, the lower portion 78 of the pierceable head 66 may be dimensioned for engagement with, such as receipt within, a portion of the float 68 as shown in FIG. 2. In yet another embodiment, as shown in FIGS. 5-6, the pierceable head 66 may be optionally vented with a plurality of slits 85 created by a post-molding assembly operation. The pierceable head 66 may include three such spaced slits 85.

Figure 9:
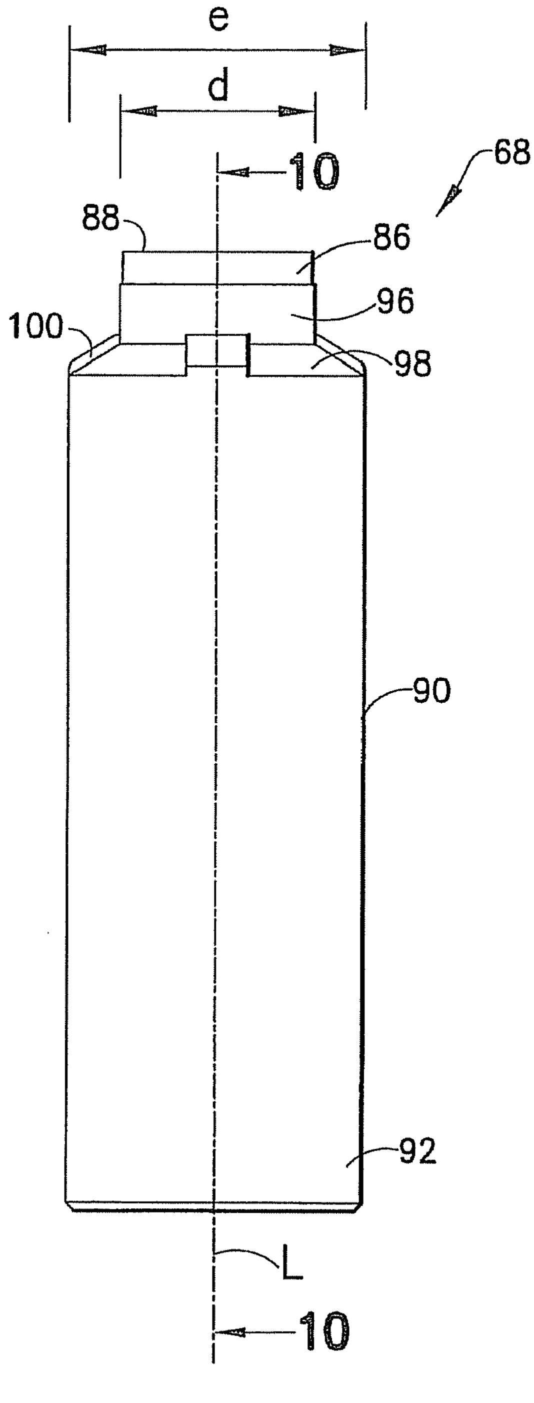
FIG. 9 is a side view of the float of FIG. 2.
Figure 10:
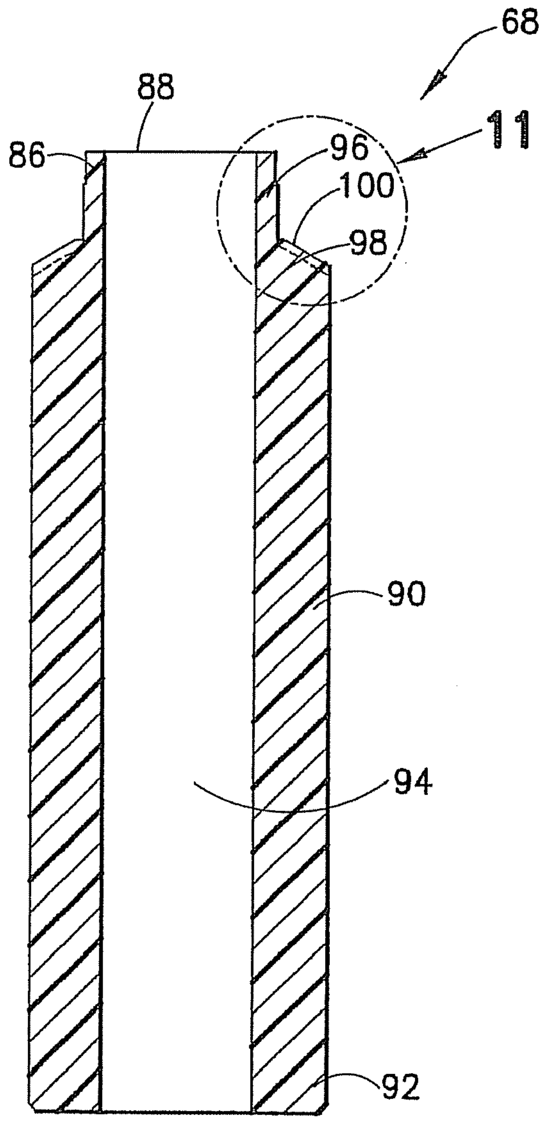
FIG. 10 is a cross-sectional view of the float of FIG. 2, taken along line 10-10 of FIG. 9.
Figure 12:
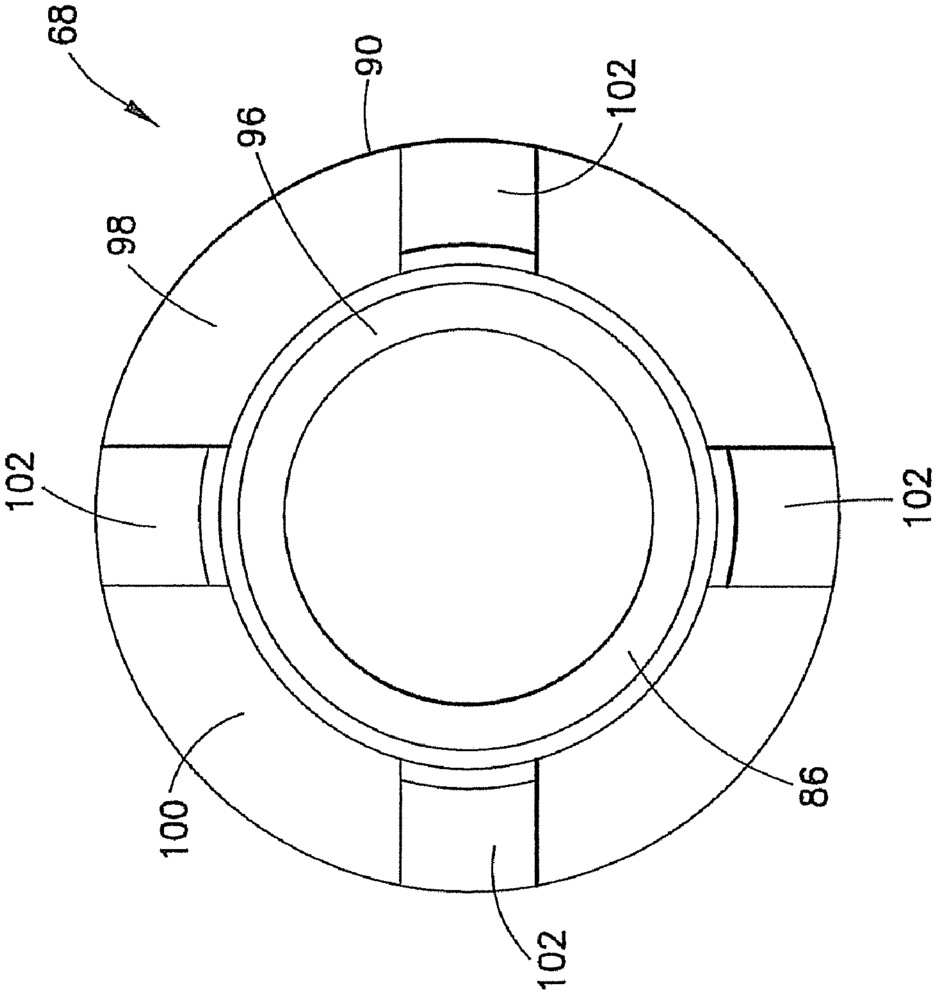
FIG. 12 is a top view of the float of FIG. 2.
Figure 11:
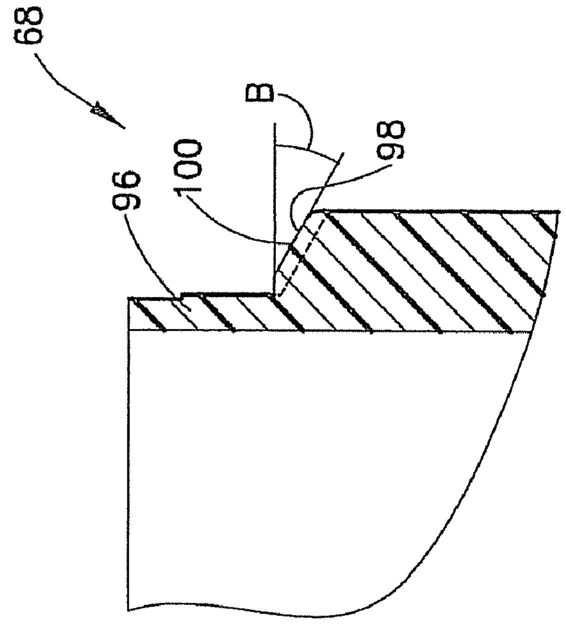
FIG. 11 is close-up cross-sectional view of a portion of the float of FIG. 2 taken along section XI of FIG. 10.

Referring to FIGS. 9-12, the float 68 of the mechanical separator 44 is a generally tubular structure 90 having an upper end 86, a lower end 92, and a passage 94 extending longitudinally therebetween. As shown in FIGS. 9-10, the float 68 of the mechanical separator 44 includes an upper end 86 defining an upper recess 88 for receiving the lower portion 78 of the pierceable head 66. The upper end 86 of the float 68 has a diameter "d" which may be larger than the diameter "c" of the lower portion 78 of the pierceable head 66, shown in FIG. 8, to allow receipt of the pierceable head 66 therein. In one embodiment, the diameter "d" of the upper end 86 of the float 68 is smaller than the diameter "b" of the extended portion 82 of the pierceable head 66, also shown in FIG. 8. In another embodiment, the diameter "e" of the tubular structure 90 of the float 68 is greater than the diameter "b" of the upper rim portion 76 of the pierceable head 66, therefore, the lower portion 78 of the pierceable head 66 may be received within the float 68 while the extended portion 82 of the pierceable head 66 extends beyond the interior of the float 68 when the pierceable head 66 and the float 68 are engaged. Optionally, the diameter "d" of the float 68 may be equal to the diameter "c" of the pierceable head 66. This may be particularly preferable for two-shot molding techniques.

The annular engagement of the lower portion 78 of the pierceable head 66 within the recess 88 establishes a mechanical engagement for providing structural rigidity to the pierceable head 66. Such structural rigidity, in combination with the profile and dimensions of the access portion 74 of the pierceable head 66, limits the amount of deformation thereof when a puncture tip is pressed therethrough. In this manner, sample pooling and premature release of the separator 44 from the closure 42 can be prevented.

Referring again to FIGS. 9-12, the upper end 86 of the float 68 also includes a generally tubular neck 96. Adjacent the neck 96, and extending circumferentially around the longitudinal axis L of the float 68 is a shoulder 98 having an exterior surface 100. As shown in a close-up view in FIG. 11 taken along section XI, in one embodiment the exterior surface 100 has an angled slope B of about 29 degrees to facilitate the shedding of cells around the mechanical separator 44 during centrifugation.

In another embodiment, a plurality of protrusions 102 may be located about the shoulder 98 of the float 68. The protrusions 102 may be a plurality of segmented protrusions spaced about a circumference of float 68. The protrusions 102 may create channels for venting of air from within the mechanical separator 44 when the mechanical separator 44 is submerged in fluid during centrifugation. In one embodiment, the venting pathway is created by a hole or series of holes through a wall in the float 68 adjacent the junction of the bellows 70 and the float 68.

In one embodiment, it is desirable that the float 68 of the mechanical separator 44 be made from a material having a density lighter than the liquid intended to be separated into two phases. For example, if it is desired to separate human blood into serum and plasma, then it is desirable that the float 68 have a density of no more than about 0.902 gm/cc. In another embodiment, the float 46 can be formed from polypropylene. In yet another embodiment, the pierceable head 66, shown in FIGS. 2 and 5-8, and the float 68, shown in FIGS. 2 and 9-12, can be co-molded, such as two-shot molded, or co-extruded as a first sub-assembly.

Figure 13:
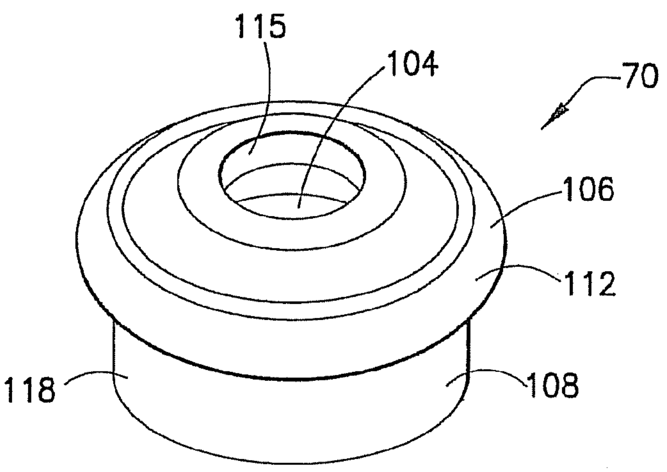
FIG. 13 is a perspective view of the bellows of FIG. 2.
Figure 14:
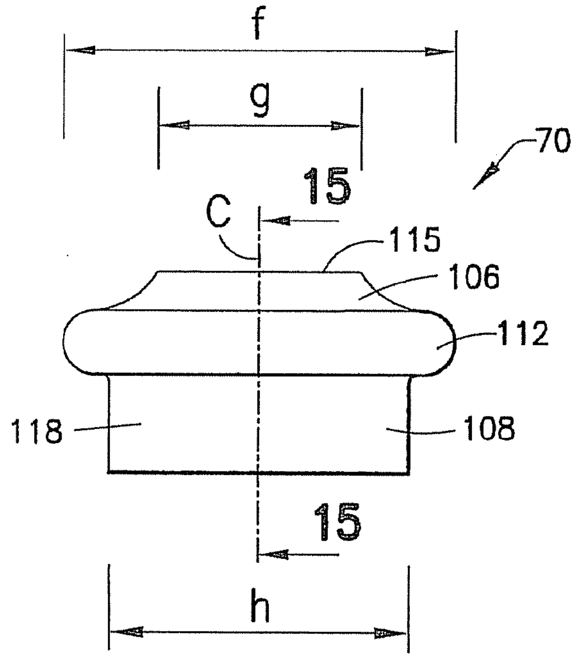
FIG. 14 is a side view of the bellows of FIG. 2.
Figure 15:
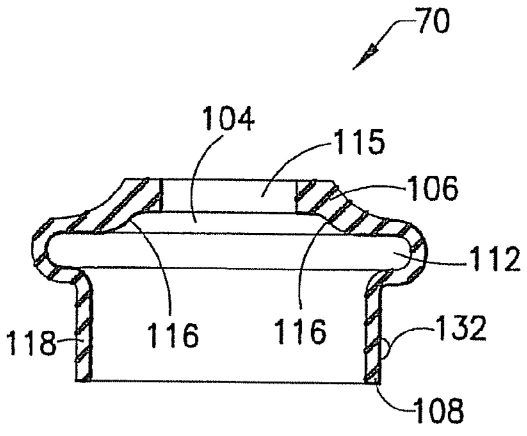
FIG. 15 is a cross-sectional view of the bellows of FIG. 2, taken along line 15-15 of FIG. 14.
Figure 16:
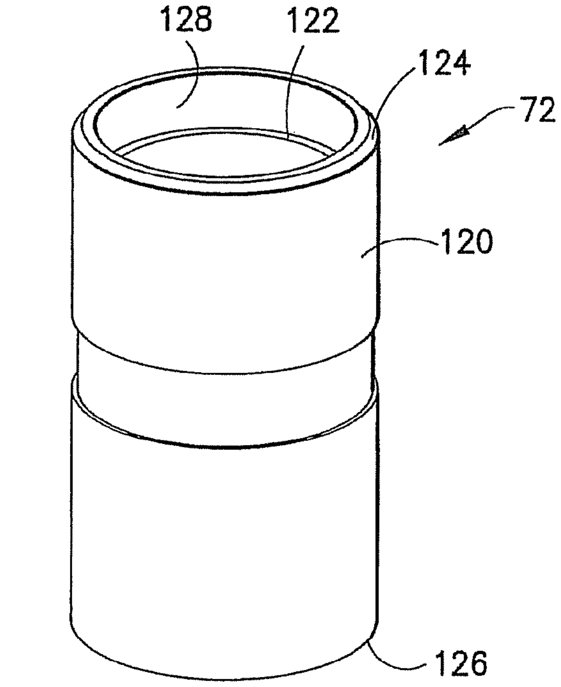
FIG. 16 is a perspective view of the ballast of FIG. 2.

As shown in FIGS. 13-15 the bellows 70 are extruded and/or molded of a resiliently deformable material that exhibits good sealing characteristics with the tube material(s). The bellows 70 is symmetrical about a center longitudinal axis C, and includes an upper end 106, a lower end 108, and a hollow interior 104. The bellows 70 also defines a deformable sealing portion 112 positioned between the upper end 106 and the lower end 108 for sealing engagement with the cylindrical sidewall 52 of the tube 46, as shown in FIG. 2. The bellows 70 can be made of any sufficiently elastomeric material sufficient to form a liquid impermeable seal with the cylindrical sidewall 52 of the tube 46. In one embodiment, the bellows is TPE and has an approximate dimensional thickness of from about 0.020 inch to about 0.050 inch.

The deformable sealing portion 112 can have a generally toroidal shape having an outside diameter "f" which, in an unbiased position, slightly exceeds the inside diameter "a" of the tube 46, shown in FIG. 2. However, oppositely directed forces on the upper end 106 and the lower end 108 will lengthen the bellows 70, simultaneously reducing the diameter of the deformable sealing section to a dimension less than "a". Accordingly, the bellows 70 are adapted to deform upon longitudinal movement of the float 68 in a first direction and the ballast 72 in a second opposite direction.

The bellows 70 can be disposed about, such as circumferentially disposed about, at least a portion of the float 68, shown in FIG. 2. As shown in FIGS. 13-15, the bellows 70 includes an interior wall 114 within the interior 104. Adjacent the upper end 106 of the bellows 70, the interior wall 114 defines an interior restraining surface 116 for mechanical interface with the shoulder 98 of the float 68, shown in FIGS. 9-12. In one embodiment, the interior restraining surface 116 of the bellows 70, shown in FIGS. 13-15, has a slope that corresponds to the slope of the shoulder 98 of the float 68, shown in FIGS. 9-12.

In this embodiment, the diameter "g" of the opening 115 of the upper end 106 of the bellows 70 defined by the interior wall 114 is smaller than the diameter "d" of the upper end 86 of the float 68, shown in FIG. 9, and smaller than the diameter "e" of the tubular structure 90 of the float 68, also shown in FIG. 9. During centrifugation, the diameter "g" of the bellows 70 increases in size beyond the diameter "d" of the float and enables the venting of air from within the mechanical separator 44. This allows the neck 96 of the float 68, shown in FIG. 9, to pass through the upper end 106 of the bellows 70 but restrains the shoulder 98 of the float 68 against the interior restraining surface 116 of the interior wall 114 of the bellows 70. The tubular structure 90 of the float is not able to pass through the upper end 106 of the bellows 70.

Portions of the exterior wall of the bellows 70 between the deformable sealing portion 112 and the lower end 108 define a generally cylindrical ballast mounting section 118 having an outer diameter "h" structured to receive the ballast 72 of the mechanical separator 44 thereon.

As shown in FIGS. 16-19, the ballast 72 of the mechanical separator 44 includes a generally cylindrical section 120 having an interior surface 122 structured to engage the ballast mounting section 118 of the bellows 70, shown in FIGS. 13-15. In one embodiment, at least a portion of the ballast 72 extends along the ballast mounting section 118 of the bellows 70, again shown in FIGS. 13-15. The ballast 72 includes opposed upper and lower ends 124, 126. In one embodiment, the upper end 124 includes a recess 128 for receiving the lower end 108 of the bellows 70, shown in FIGS. 13-15, therein. The diameter "i" of the recess 128 is greater than the outer diameter "h" of the bellows 70, and the outer diameter "j" of the ballast 72 is less than the inside diameter "a" of the tube 46, as shown in FIG. 2. Accordingly, the lower end 108 of the bellows 70 may be received within the upper end 124 of the ballast 72 and the mechanical separator 44, shown in FIG. 2, may be received within the interior of the tube 46, also shown in FIG. 2. In one embodiment, the diameter "i" of the ballast 72 is equal to the diameter "h" of the bellows 70. Optimally, the ballast 72 may be molded first and the bellows 70 may be subsequently molded onto the ballast 72. In one embodiment, the bellows 70 and the ballast 72 exhibit material compatibility such that the bellows 70 and the ballast 72 bond together as a result of two-shot molding.

Figure 17:
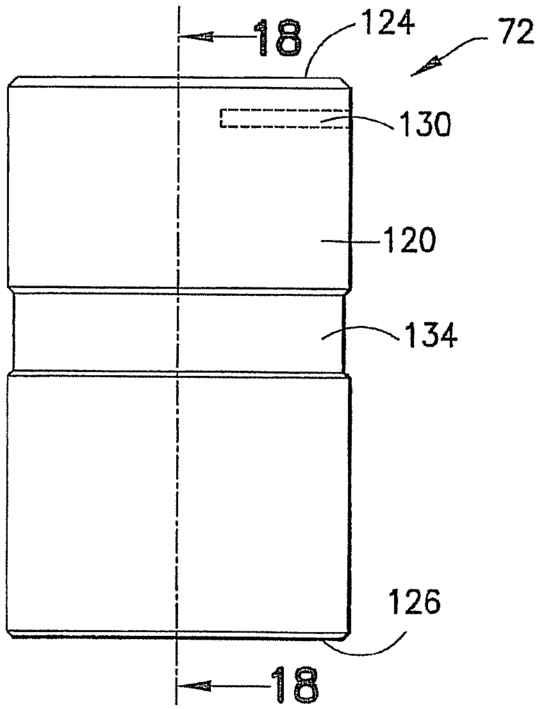
FIG. 17 is a side view of the ballast of FIG. 2.
Figure 18:
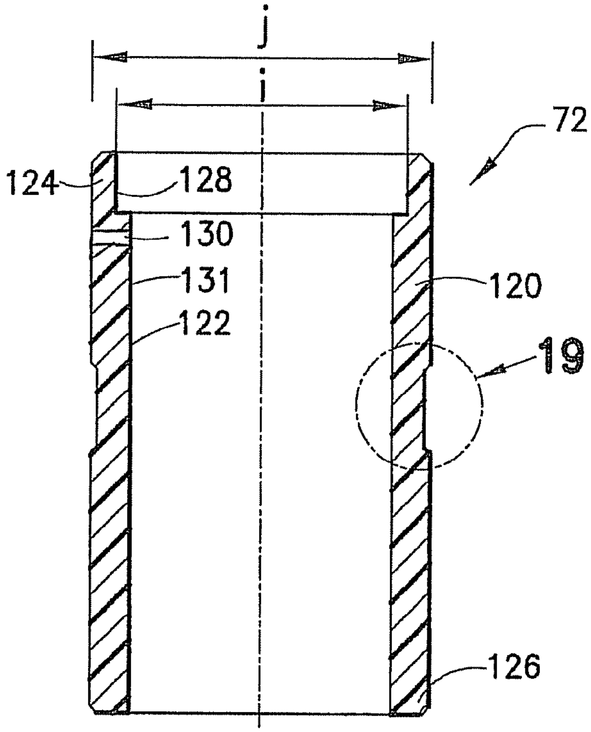
FIG. 18 is a cross-sectional view of the ballast of FIG. 2, taken along line 18-18 of FIG. 17.
Figure 19:
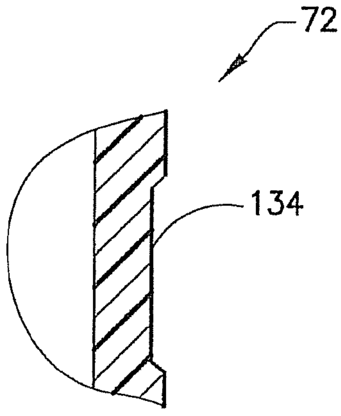
FIG. 19 is a close-up cross-sectional view of a portion of the bellows of FIG. 2 taken along section IXX of FIG. 18.

As shown in FIG. 17, in one embodiment, the ballast 72 may include a mechanical interlock recess 130 extending through the generally cylindrical section 120, such as adjacent the upper end 124. In another embodiment, the ballast 72 may include the mechanical interlock recess 130 within an interior wall 131, such as within recess 128. A corresponding interlock attachment protrusion 132 may be provided on the exterior surface of the lower end 108 of the bellows 70, shown in FIG. 15, to mechanically engage the bellows 70 with the ballast 72.

In one embodiment, it is desirable that the ballast 72 of the mechanical separator 44 be made from a material having a density heavier than the liquid intended to be separated into two phases. For example, if it is desired to separate human blood into serum and plasma, then it is desirable that the ballast 72 have a density of at least 1.326 gm/cc. In one embodiment, the ballast 72 can be formed from PET. In yet another embodiment, the bellows 70, shown in FIGS. 2 and 13-15, and the ballast 72, shown in FIGS. 2 and 16-19, can be co-molded, such as two-shot molded, or co-extruded as a second sub-assembly.

In yet another embodiment, the exterior surface of the ballast 72 may define an annular recess 134 circumferentially disposed about a longitudinal axis D of the ballast 72 and extending into the exterior surface. In this embodiment, the annular recess 134 is structured to allow for an automated assembly to engage the second sub-assembly, including the bellows and the ballast for joinder with the first sub-assembly, including the pierceable head and the float.

Figure 20:
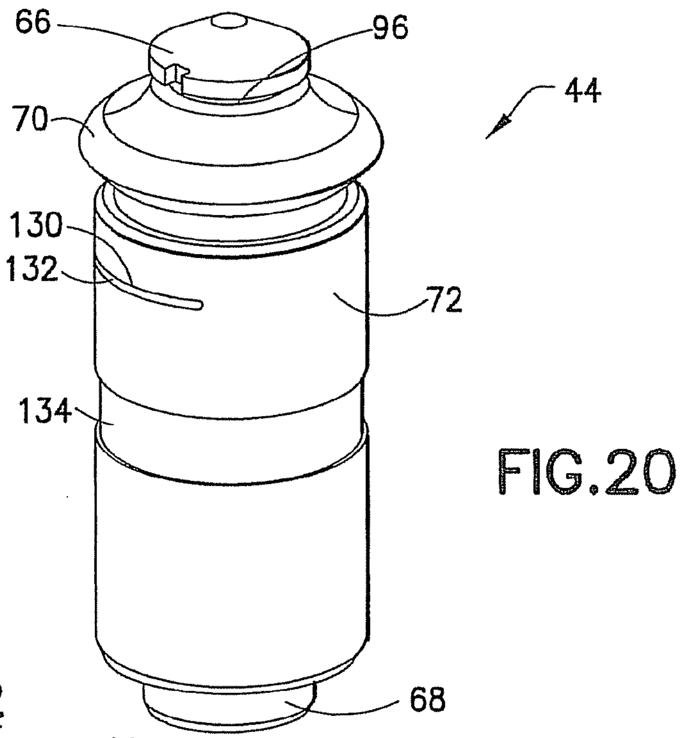
FIG. 20 is a perspective view of the mechanical separator including the pierceable head, float, bellows, and ballast in accordance with an embodiment of the present invention.
Figure 21:
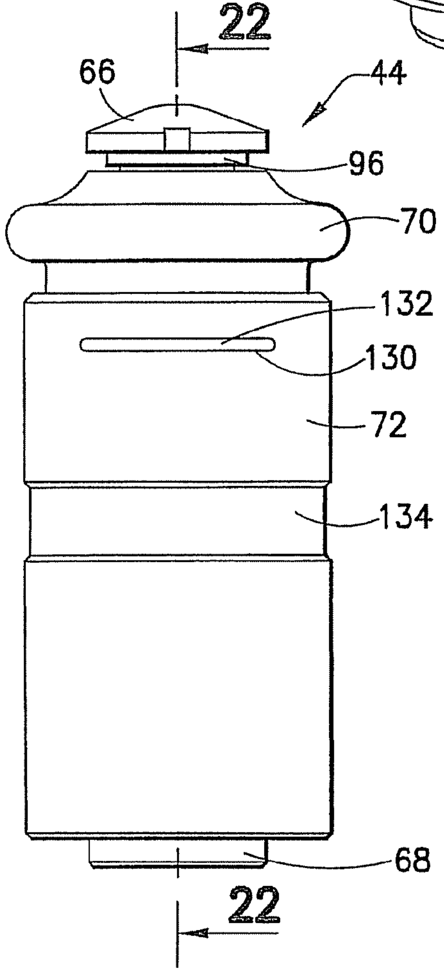
FIG. 21 is a front view of the mechanical separator of FIG. 20.
Figure 22:
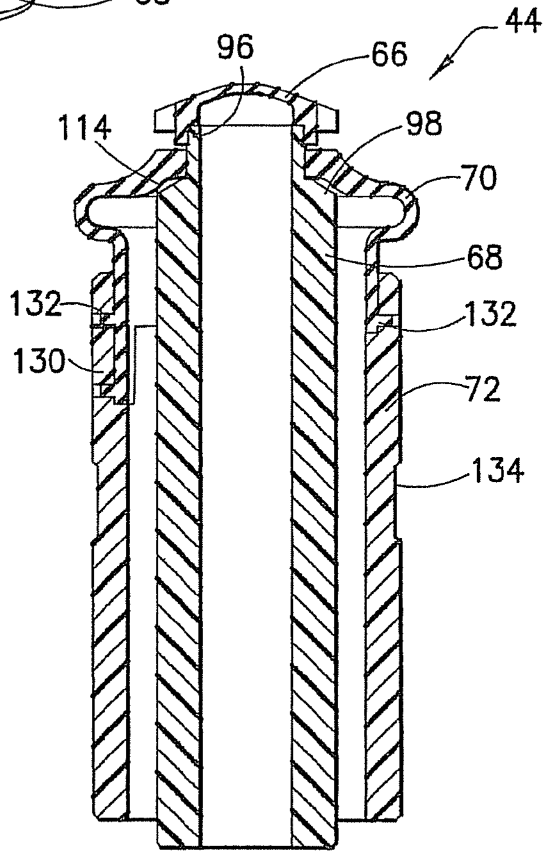
FIG. 22 is a cross-sectional view of a mechanical separator of FIG. 20, taken along line 22-22 of FIG. 21.

As shown in FIGS. 20-22, when assembled, the mechanical separator 44 includes a pierceable head 66 engaged with a portion of a float 68, and a bellows 70 circumferentially disposed about the float 68 and engaged with the shoulder 98 of the float 68, and a ballast 72 disposed about the float 68 and engaged with a portion of the bellows 70. As shown in FIGS. 20-22, the pierceable head 66 can be at least partially received within the float 68. The bellows 70 can be disposed about the float 68 and the shoulder 98 of the float 68 can be mechanically engaged with the restraining surface 116 of the bellows 70. The ballast 72 can be circumferentially disposed about the float 68 and at least a portion of the bellows 70, and the mechanical interlock recess 130 and the attachment protrusion 132 can mechanically secure the bellows 70 with the ballast 72. Optimally, the bellows 70 and the ballast 72 may be two-shot molded and the mechanical interlock may further secure the ballast 72 and the bellows 70.

In one embodiment, the first sub-assembly including the pierceable head 66 and the float 68, and the second sub-assembly including the bellows 70 and the ballast 72 can be separately molded or extruded and subsequently assembled. Maintenance of the float density within the specified tolerances is more easily obtained by using a standard material that does not require compounding with, for example, glass micro-spheres in order to reduce the material density. In one embodiment, the material of the float 68 is polypropylene with a nominal density of about 0.902 gm/cc. In addition, co-molding, such as two-shot molding, the first sub-assembly and the second sub-assembly reduces the number of fabrication steps required to produce the mechanical separator 44.

Figure 23:
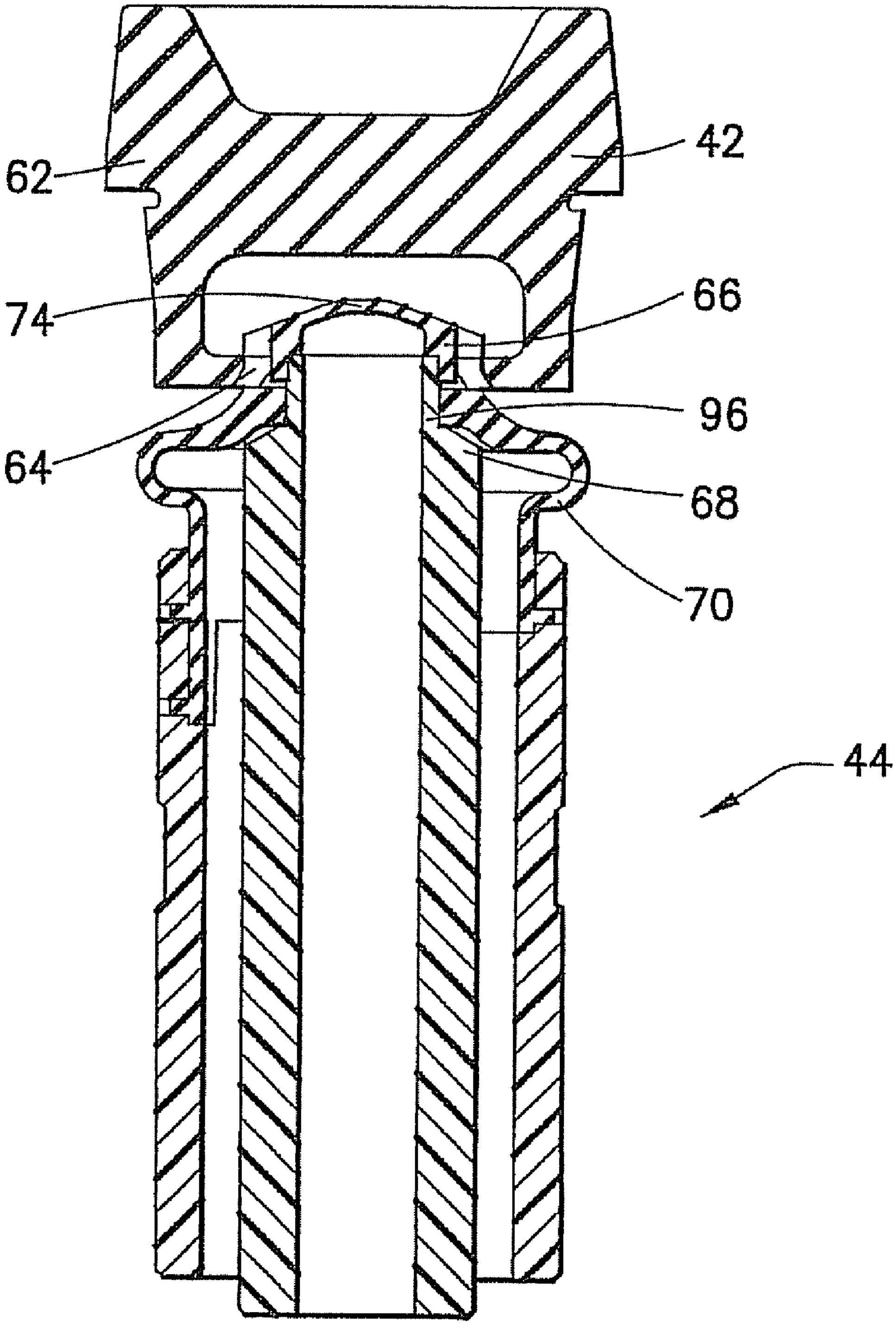
FIG. 23 is a cross-sectional view of a mechanical separator affixed to a closure in accordance with an embodiment of the present invention.

As shown in FIG. 23, the assembled mechanical separator 44 may be urged into the bottom recess 62 of the closure 42. This insertion engages the flanges 64 of the closure 42 with the neck 96 of the float 68 or against the pierceable head 66. During insertion, at least a portion of the pierceable head 66 will deform to accommodate the contours of the closure 42. In one embodiment, the closure 42 is not substantially deformed during insertion of the mechanical separator 44 into the bottom recess 62. In one embodiment, the mechanical separator 44 is engaged with the closure 42 by an interference fit of the pierceable head 66 and the bottom recess 62 of the closure 42.

Referring again to FIG. 23, the pierceable head 66 and the bellows 70 are physically isolated from one another by a portion of the float 68, such as the neck 96. This isolation allows for the pierceable head 66 to control both the release load from the closure 42 and the amount of deformation caused by application of a puncture tip through the access portion 74 independent of the bellows 70. Likewise, the bellows 70 may control the seal load with the tube 46, shown in FIG. 2, during applied centrifugal rotation independent of the restraints of the pierceable head 66.

Figure 24:
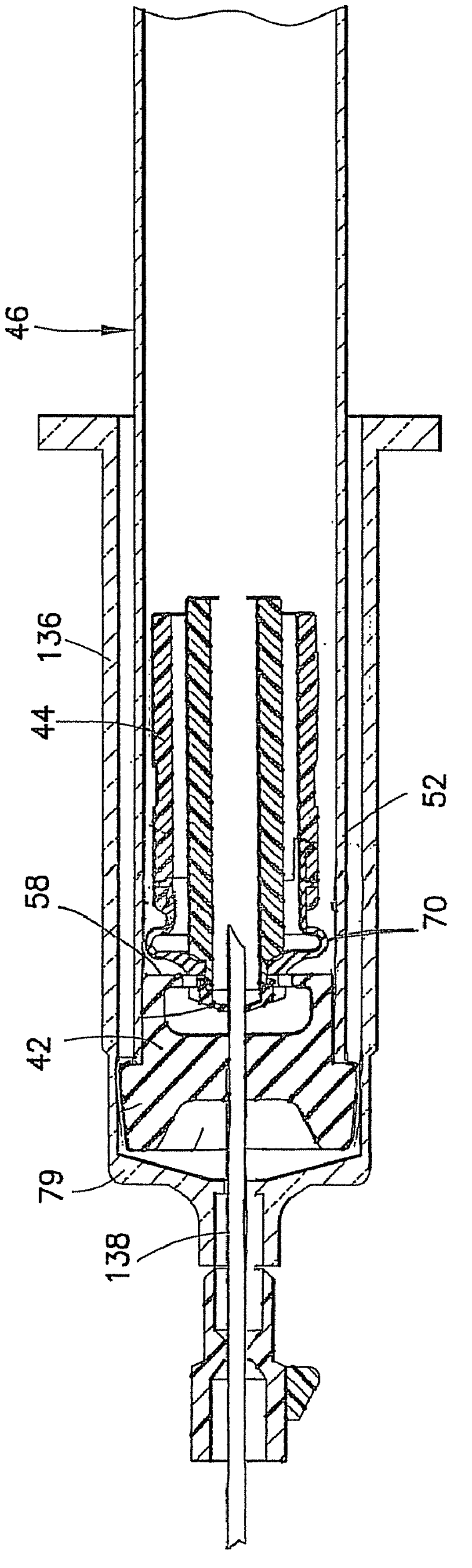
FIG. 24 is a partial cross-sectional perspective view of a mechanical separator assembly including a tube, a mechanical separator positioned within the tube, a closure, a shield surrounding the closure and a portion of the tube, and a needle accessing the tube in accordance with an embodiment of the present invention.
Figure 25:
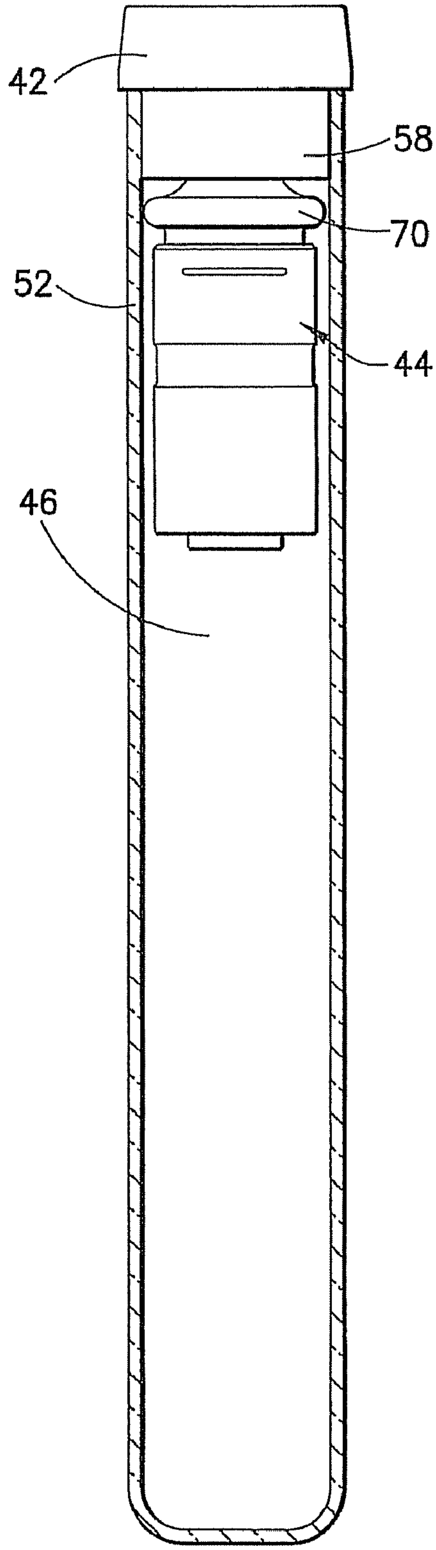
FIG. 25 is a front view of an assembly including a tube having a closure and a mechanical separator disposed therein in accordance with an embodiment of the present invention.

As shown in FIGS. 24-25, the subassembly including the closure 42 and the mechanical separator 44 are inserted into the open top end of the tube 46, such that the mechanical separator 44 and the bottom end 58 of the closure 42 lie within the tube 46. The mechanical separator 44, including the bellows 70, will sealingly engage the interior of the cylindrical sidewall 52 and the open top end of the tube 46. The assembly including the tube 46, the mechanical separator 44 and the closure 42 may then be inserted into a needle holder 136 having a puncture tip 138, such as a needle, extending therethrough. Optionally, the closure 42 may be at least partially surrounded by a shield, such as a Hemogard® Shield commercially available from Becton Dickinson and Company, to shield the user from droplets of blood in the closure 42 and from potential blood aerosolisation effects when the closure 42 is removed from the tube 46.

As shown in FIG. 26, a liquid sample is delivered to the tube 46 by the puncture tip 138 that penetrates the septum of the top end 56 of the closure 42 and the access portion 74 of the pierceable head 66. For purposes of illustration only, the liquid is blood. Blood will flow through the central passage 94 of the float 68 and to the closed bottom end 48 of the tube 46. The puncture tip 138 will then be withdrawn from the assembly. Upon removal of the puncture tip 138, the closure 42 will reseal itself. The pierceable head 66 will also reseal itself in a manner that is substantially impervious to fluid flow.

Figure 27:
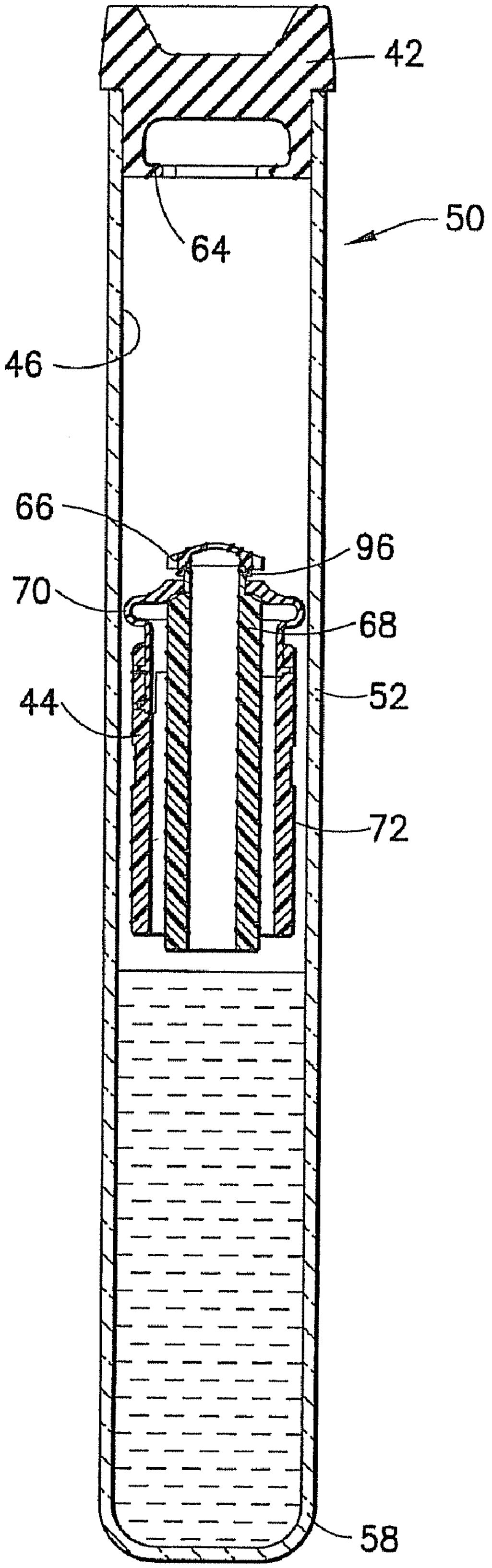
FIG. 27 is a cross-sectional front view of the assembly of FIG. 25 having the needle removed therefrom during use and the mechanical separator positioned apart from the closure in accordance with an embodiment of the present invention.

As shown in FIG. 27, when the assembly is subjected to an applied rotational force, such as centrifugation, the respective phases of the blood will begin to separate into a denser phase displaced toward the bottom 58 of the tube 46, and a less dense phase displaced toward the top 50 of the tube 46. The applied centrifugal force will urge the ballast 72 of the mechanical separator 44 toward the closed bottom end and the float 68 toward the top end of the tube 46. This movement of the ballast 72 will generate a longitudinal deformation of the bellows 70. As a result, the bellows 70 will become longer and narrower and will be spaced concentrically inward from the inner surface of the cylindrical sidewall 52. Accordingly, lighter phase components of the blood will be able to slide past the bellows 70 and travel upwards, and likewise, heavier phase components of the blood will be able to slide past the bellows 70 and travel downwards.

Initially, the neck 96 of the mechanical separator 44 will be engaged with the flanges 64 of the closure 42. However, upon application of applied centrifugal force, the mechanical separator 44 is subject to a force that acts to release the mechanical separator 44 from the closure 42. In one embodiment, the closure 42, particularly the flanges 64, are not dimensionally altered by the application of applied centrifugal force and, as a consequence, do not deform. It is noted herein, that the longitudinal deformation of the bellows 70 during applied centrifugal force does not affect or deform the pierceable head 66 as the pierceable head 66 and the bellows 70 are isolated from one another by the neck 96 of the float 68.

Figure 27A:
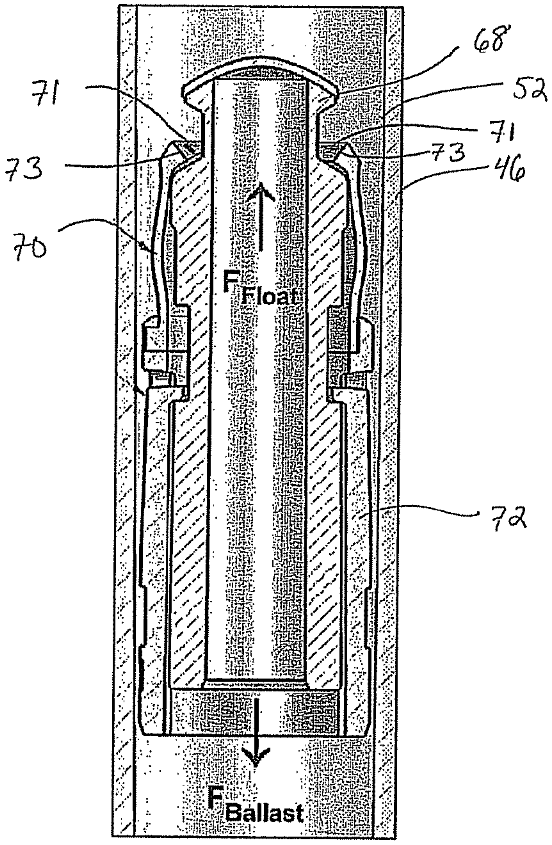
FIG. 27A is a partial cross-sectional front view of an assembly including a tube having a mechanical separator disposed therein under load in accordance with an embodiment of the present invention.
Figure 27B:
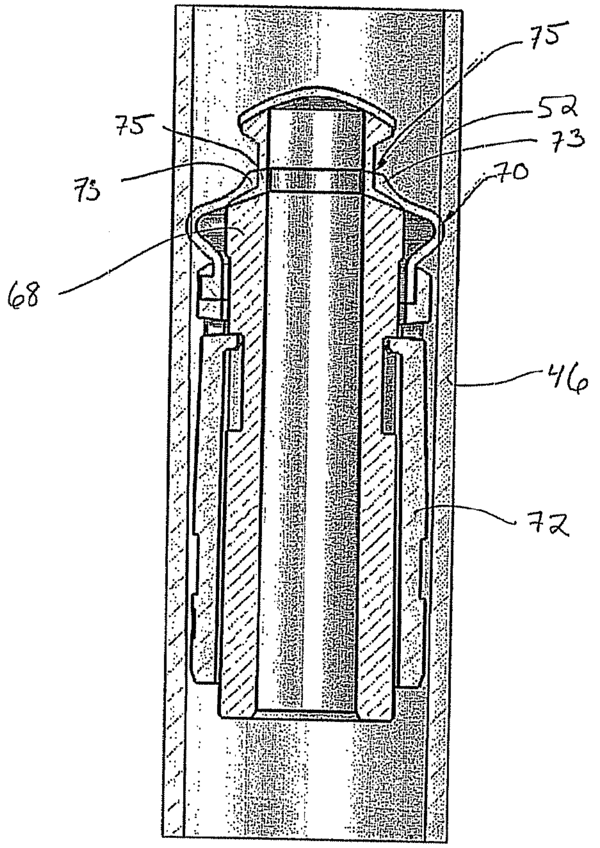
FIG. 27B is a partial cross-sectional front view of the assembly of FIG. 27A after centrifugation.
Figure 30:
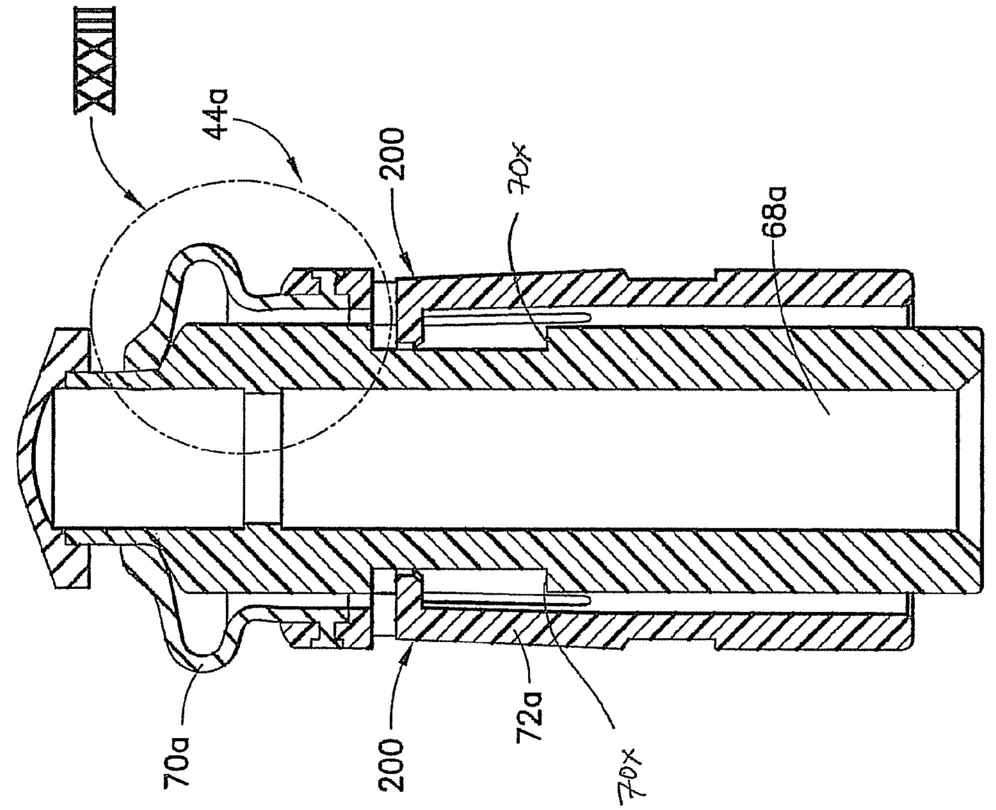
FIG. 30 is a cross-sectional front view of the mechanical separator of FIG. 29.
Figure 29:
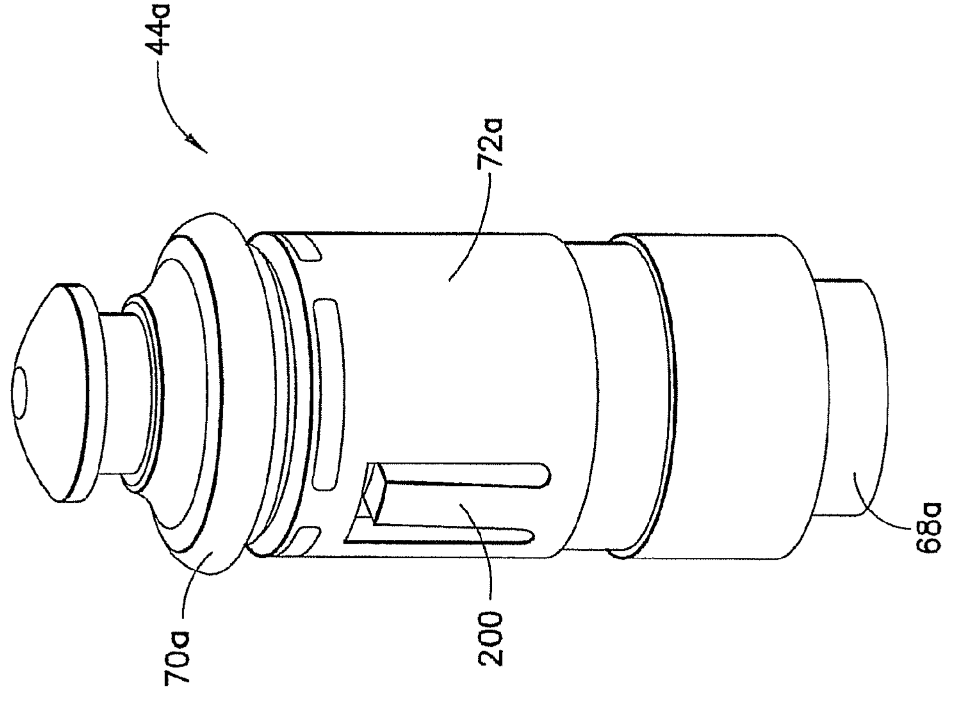
FIG. 29 is a perspective view of an alternative embodiment of a mechanical separator having a ballast snap in accordance with an embodiment of the present invention.
Figure 32:
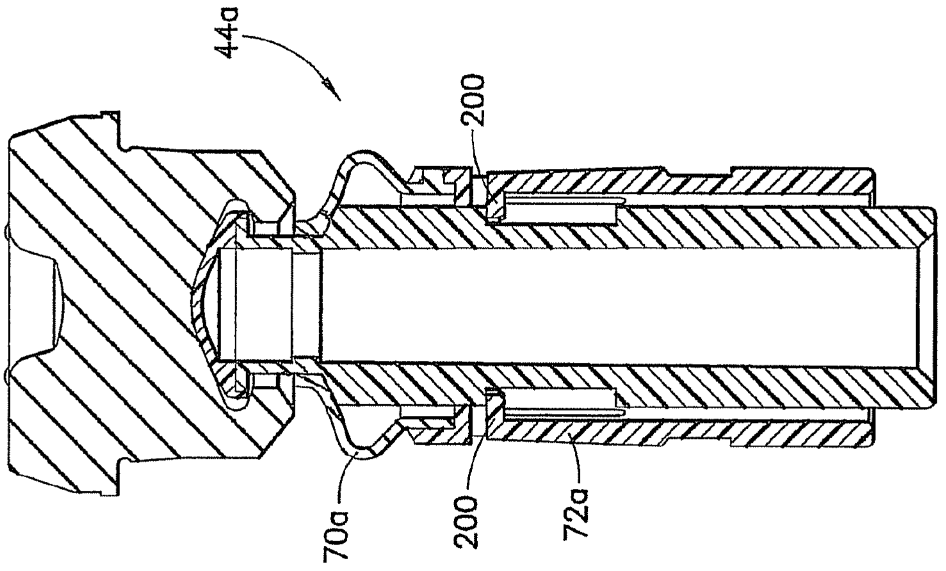
FIG. 32 is a cross-sectional view of the mechanical separator of FIG. 29 taken along line 32-32 of FIG. 31.
Figure 31:
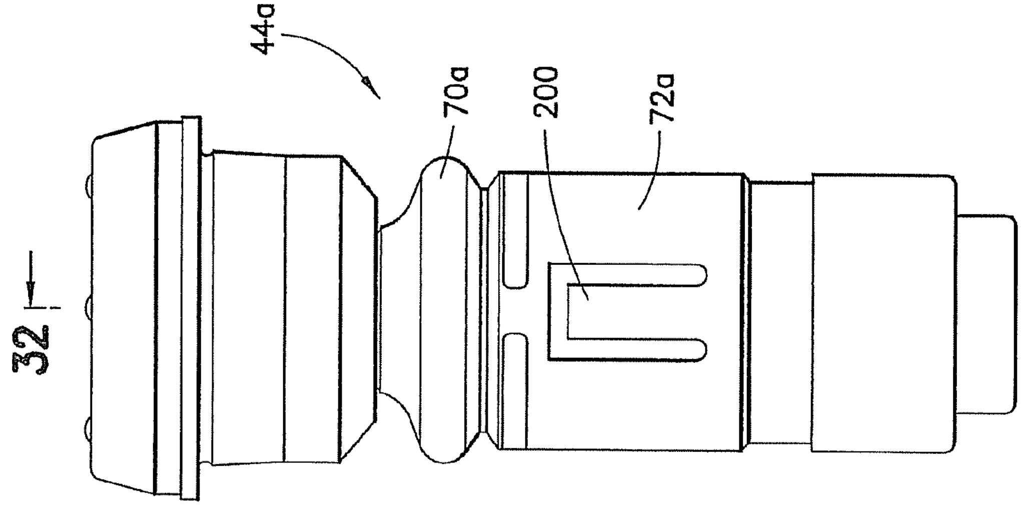
FIG. 31 is a front view of the mechanical separator of FIG. 29.

In one embodiment referring to FIGS. 27A-27B, during centrifuge, the negative buoyancy $F_{Ballast}$ of the ballast 72 opposes the positive buoyancy $F_{Float}$ of the float 68 creating a differential force which causes the bellows 70 to contract away from the interior surface of the sidewall 52 of the tube 46. This elongation of the bellows 70 causes an opening 71 between the float 68 and the sealing surface 73 of the bellows 70 under load. Once the opening 71 is formed between the float 68 and the sealing surface 73 of the bellows 70, as shown in FIG. 27A, air trapped within the mechanical separator 44 may be vented through the opening 71 into the tube at a location above the mechanical separator 44. In this configuration, the bellows 70 deform away from the float 68 allowing venting to occur therebetween. After centrifugation, as shown in FIG. 27B, the bellows 70 resiliently returns to the undeformed position and re-sealingly engages the interior surface of the sidewall 52 of the tube 46. Thus, the opening 71 between the float 68 and the sealing surface 73 of the bellows 70 is sealed as the sealing surface 73 of the bellows 70 contacts the float 68 at contact surface 75. With reference to FIGS. 5-6, during centrifuge, the slits 85 positioned within the pierceable head portion 66 may open due to the elongation of the pierceable head portion material, allowing air trapped within the interior of the float 68 to be vented therethrough.

Figure 28:
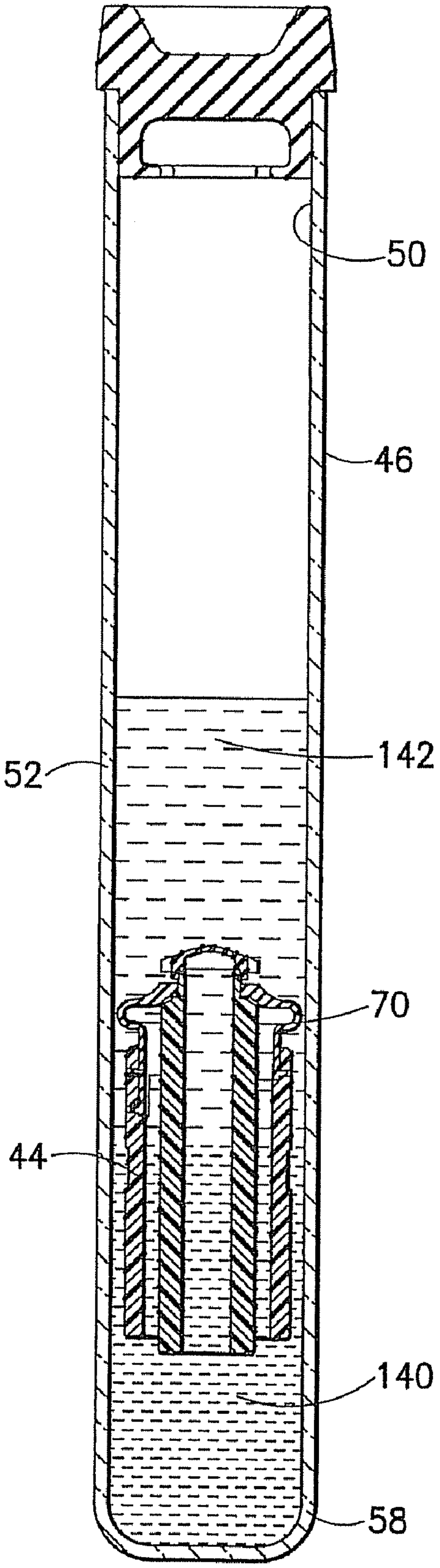
FIG. 28 is a cross-sectional front view of the assembly of FIG. 25 having the mechanical separator separating the less dense portion of the fluid from the denser portion of the fluid in accordance with an embodiment of the present invention.

As noted above, the mechanical separator 44 has an overall density between the densities of the separated phases of the blood. Consequently, as shown in FIG. 28, the mechanical separator 44 will stabilize in a position within the tube 46 such that the heavier phase components 140 will be located between the mechanical separator 44 and the closed bottom end 48 of the tube 46, while the lighter phase components 142 will be located between the mechanical separator 44 and the top end of the tube 50.

After this stabilized state has been reached, the centrifuge will be stopped and the bellows 70 will resiliently return to its unbiased state and into sealing engagement with the interior of the cylindrical sidewall 52 of the tube 46. The foamed liquid phases may then be accessed separately for analysis.

In an alternative embodiment, as shown in FIGS. 29-33, the mechanical separator 44*a* may include one or more ballast snaps 200 for preventing the float 68*a* from passing entirely through the bellows 70*a* under applied load. The ballast snaps 200 may be co-molded with the ballast 72*a* to limit the movement of the float 68*a* with respect to the ballast 72*a*, such as by contacting and being restrained by a restraining surface 70*x* of the float 68*a* under applied load. As shown in detail in FIG. 33, the ballast snaps 200 may include a restraint portion 201 for engaging a corresponding recess 202 within the bellows 70*a*.

Figure 34:
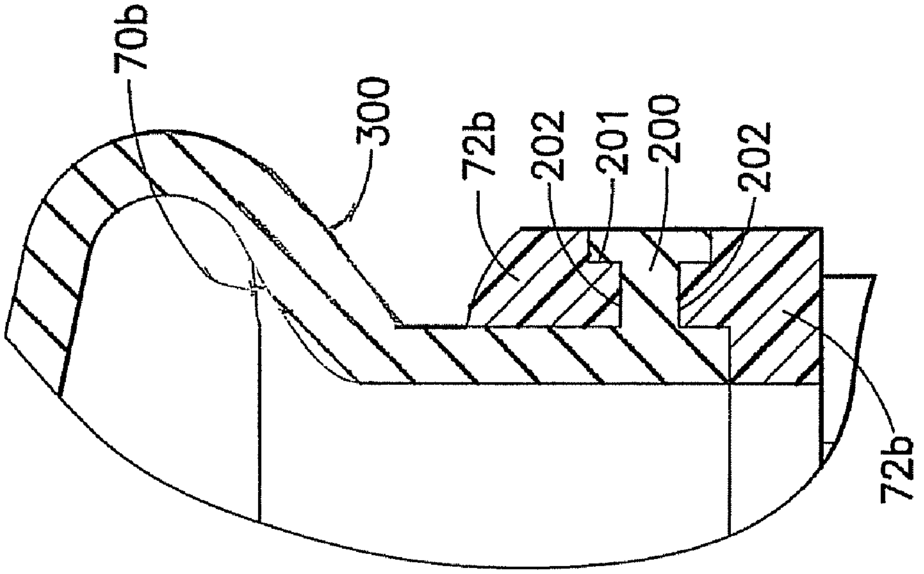
FIG. 34 is an alternative embodiment of the partial cross-sectional view of FIG. 33 having a tapered profile in accordance with an embodiment of the present invention.
Figure 33:
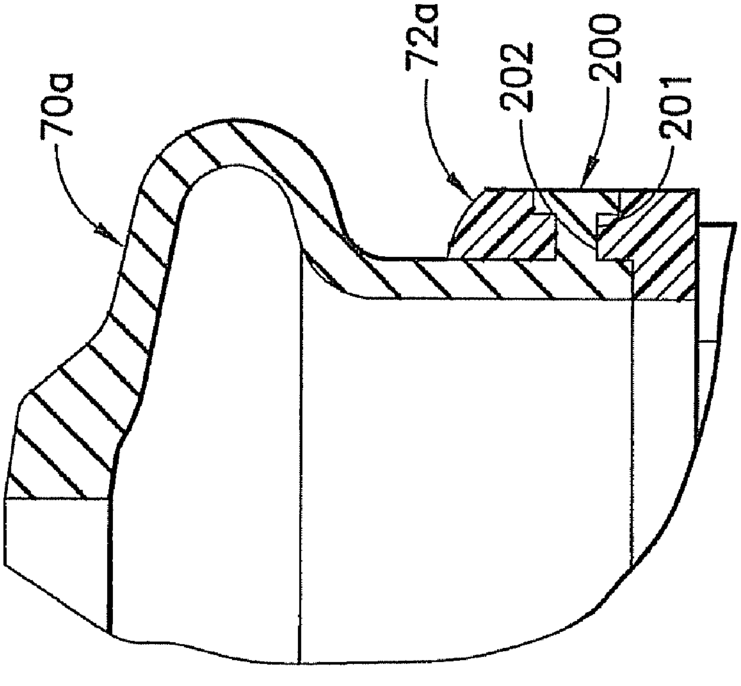
FIG. 33 is a partial cross-sectional view of the mechanical separator of FIG. 29 taken along section XXXIII of FIG. 30.

In another alternative embodiment, as shown in FIG. 34, the bellows 70*b* may have a tapered profile 300 adjacent the recess 202 for corresponding engagement with the restraint portion 201 of the ballast snaps 200 of the ballast 72*b*. The tapered profile 300 of the bellows 70*b* may minimize the formation of bellows pinching due to axial movement of the ballast 72*b*.

Figure 36:
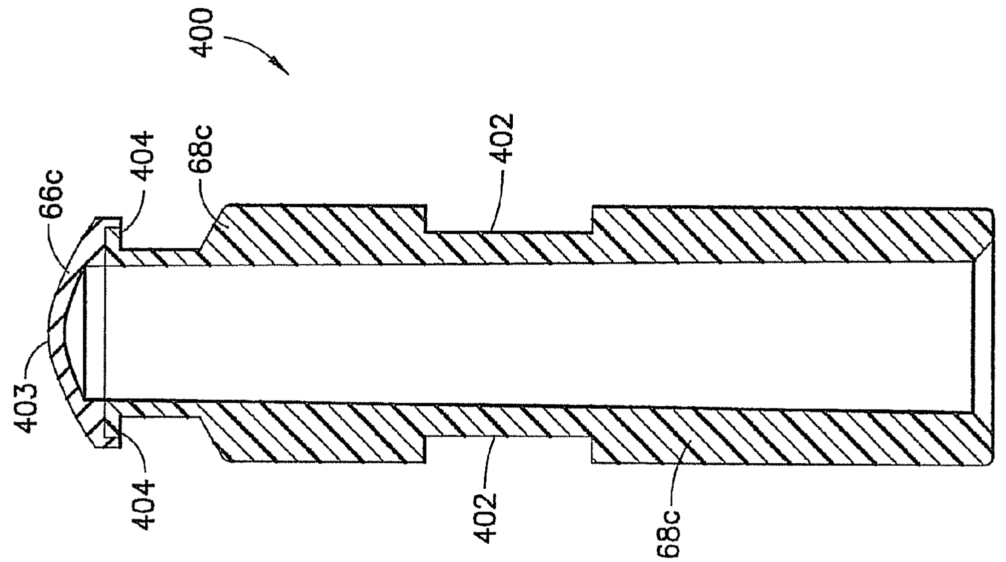
FIG. 36 is a cross-sectional view of the first sub-assembly of FIG. 35.
Figure 35:
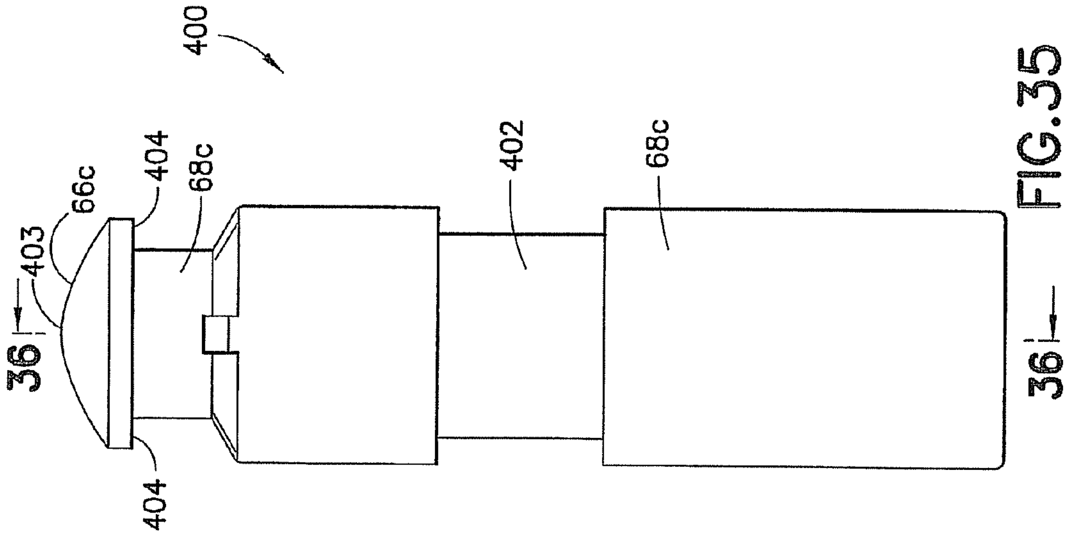
FIG. 35 is a front view of a first sub-assembly having a pierceable head portion and a float in accordance with an embodiment of the present invention.
Figure 38:
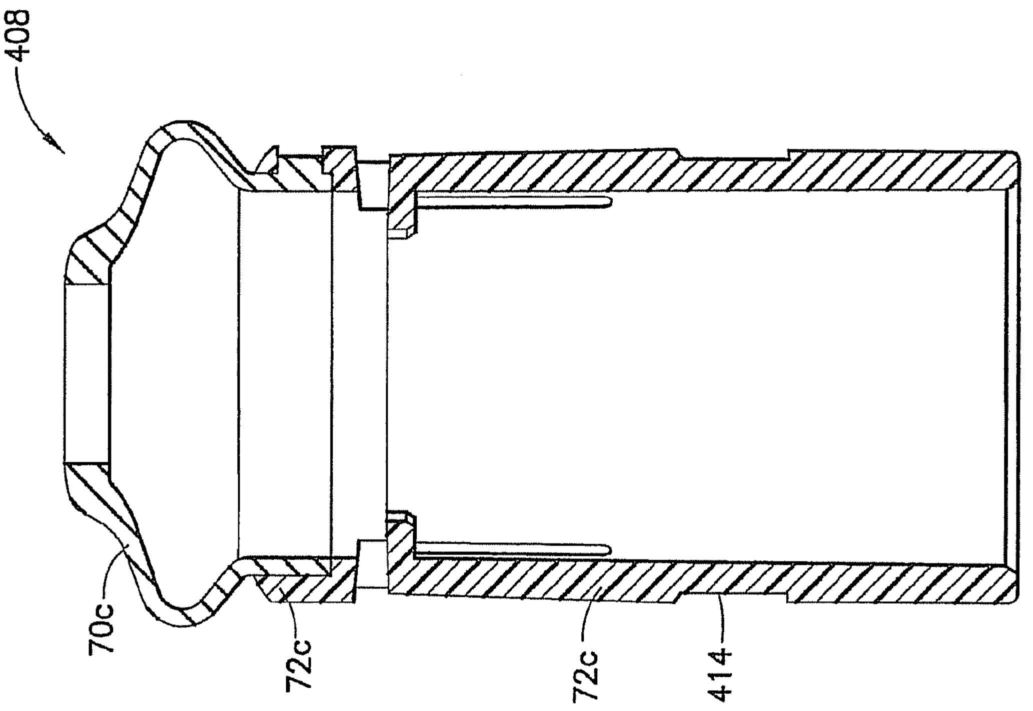
FIG. 38 is a partial cross-sectional front view of the second sub-assembly of FIG. 37.
Figure 37:
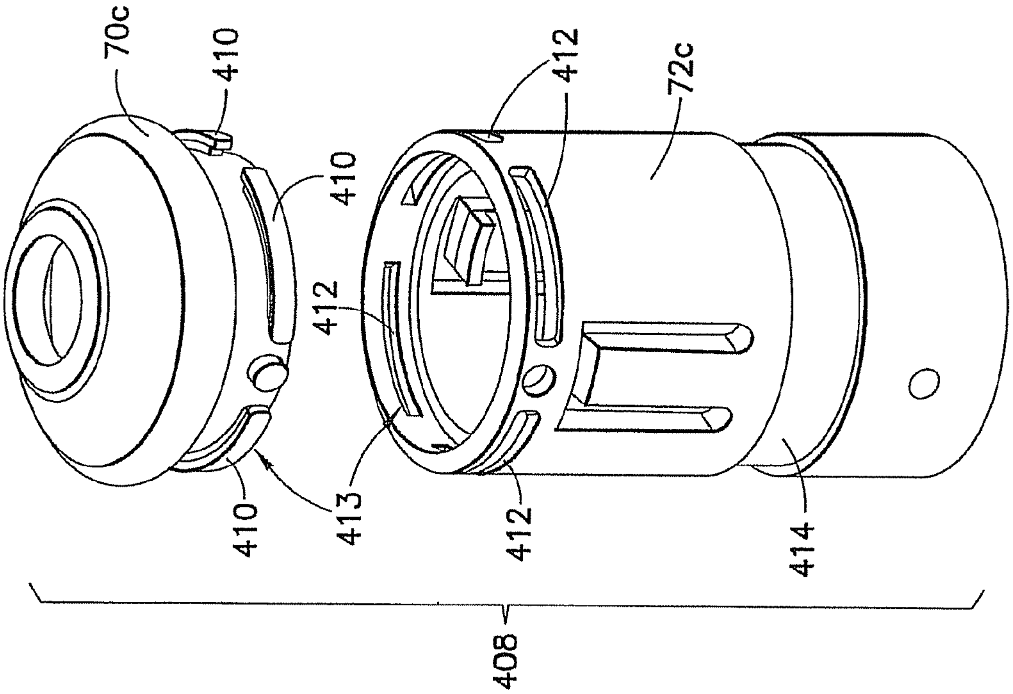
FIG. 37 is a perspective view of a second sub-assembly having a bellows and a ballast in accordance with an embodiment of the present invention.

In another alternative embodiment, a first sub-assembly 400 including a pierceable head 66*c* and a float 68*c* may be co-molded as shown in FIGS. 35-36. The first sub-assembly 400 may include a relief ring 402 for mating adaptation with the ballast (shown in FIGS. 37-38) to limit relative travel during assembly and application of accelerated forces. The pierceable head 66*c* may be provided with a target area dome 403 to reduce tenting and to facilitate the shedding of debris therefrom. The pierceable head 66*c* may also be provided with a rigid halo surface 404 to increase launch load and reduce movement of the mechanical separator during insertion into the closure. As shown in FIGS. 37-38, the second sub-assembly 408 including a ballast 72*c* and a bellows 70*c*, may also be co-molded. As shown in FIG. 37, protrusions 410 on the bellows 70*c* may engage with corresponding recesses 412 within the ballast 72*c* to form a locking structure 413 to improve bond strength and securement of the bellows 70*c* and ballast 72*c*. In one embodiment, a plurality of protrusions 410 and corresponding recesses 412 are provided within the bellows 70*c* and ballast 72*c*, respectively. As shown in FIGS. 37-38, a relief ring 414 may be circumferentially provided about the ballast 72*c* to assist in assembly of the second sub-assembly 408 with the first sub-assembly 400, shown in FIGS. 35-36.

Figure 39:
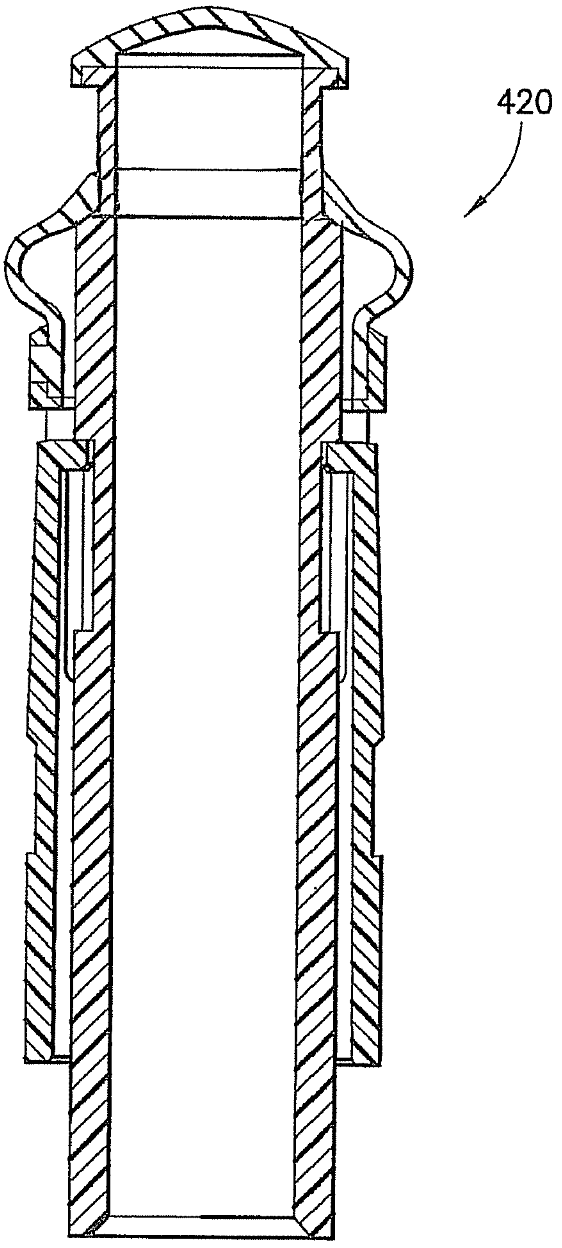
FIG. 39 is a cross-sectional front view of an assembled first sub-assembly and second sub-assembly of a mechanical separator in accordance with an embodiment of the present invention.
Figure 40:
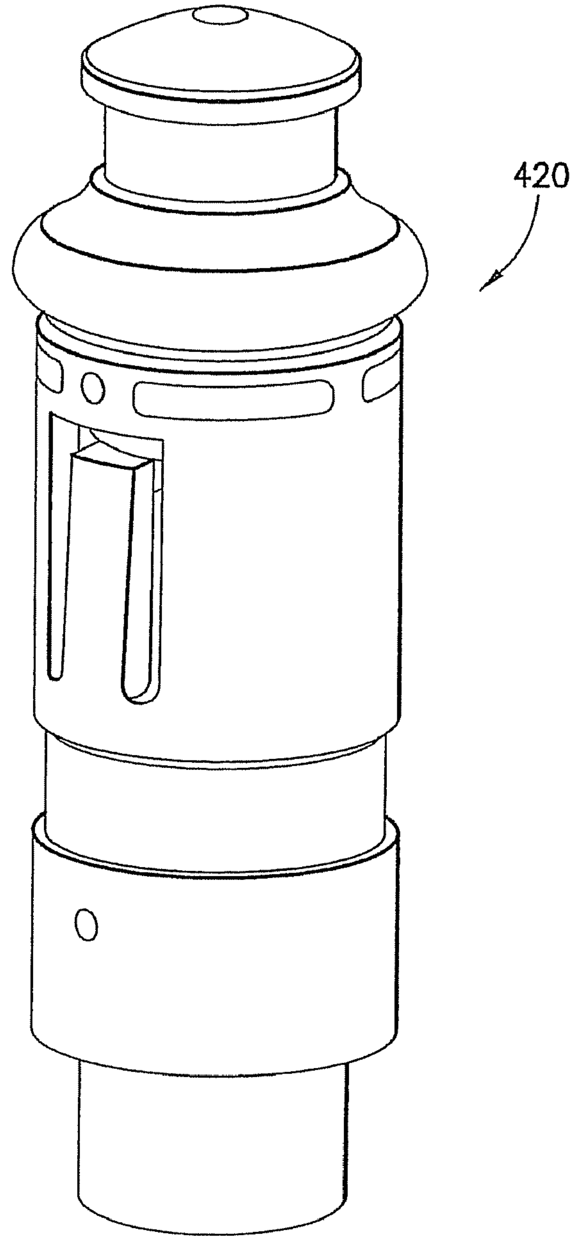
FIG. 40 is a perspective view of the assembled mechanical separator of FIG. 39.
Figure 41:
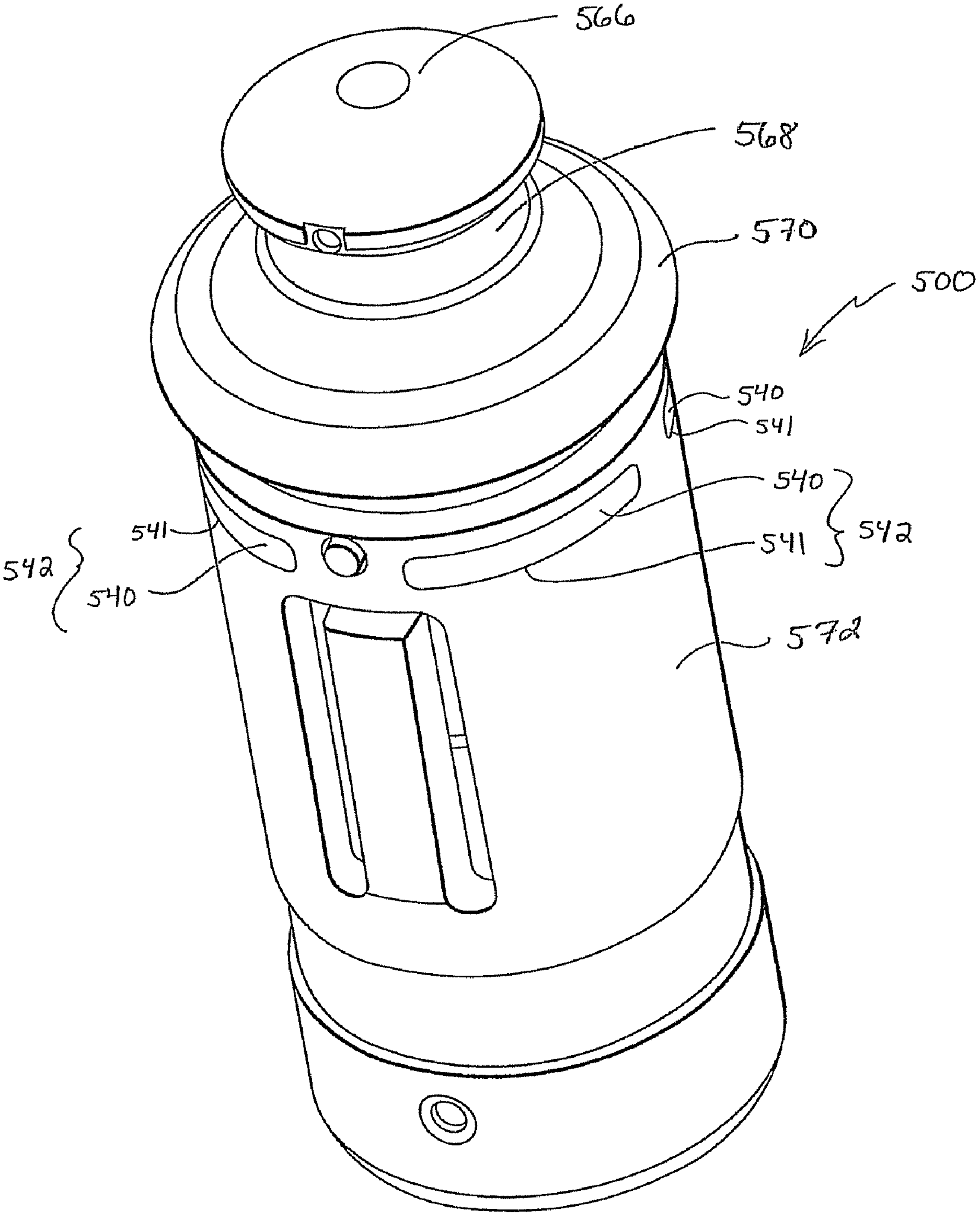
FIG. 41 is a perspective view of a mechanical separator in accordance with an embodiment of the present invention.
Figure 43:
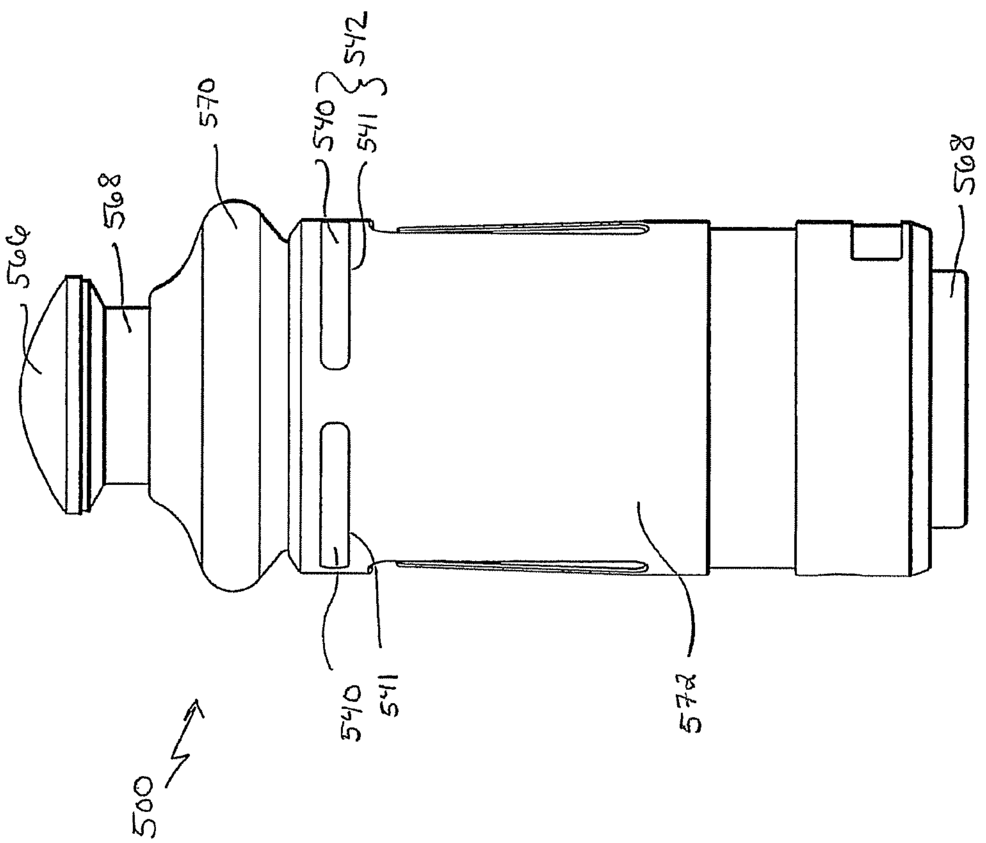
FIG. 43 is a left side view of the mechanical separator of FIG. 41.
Figure 42:
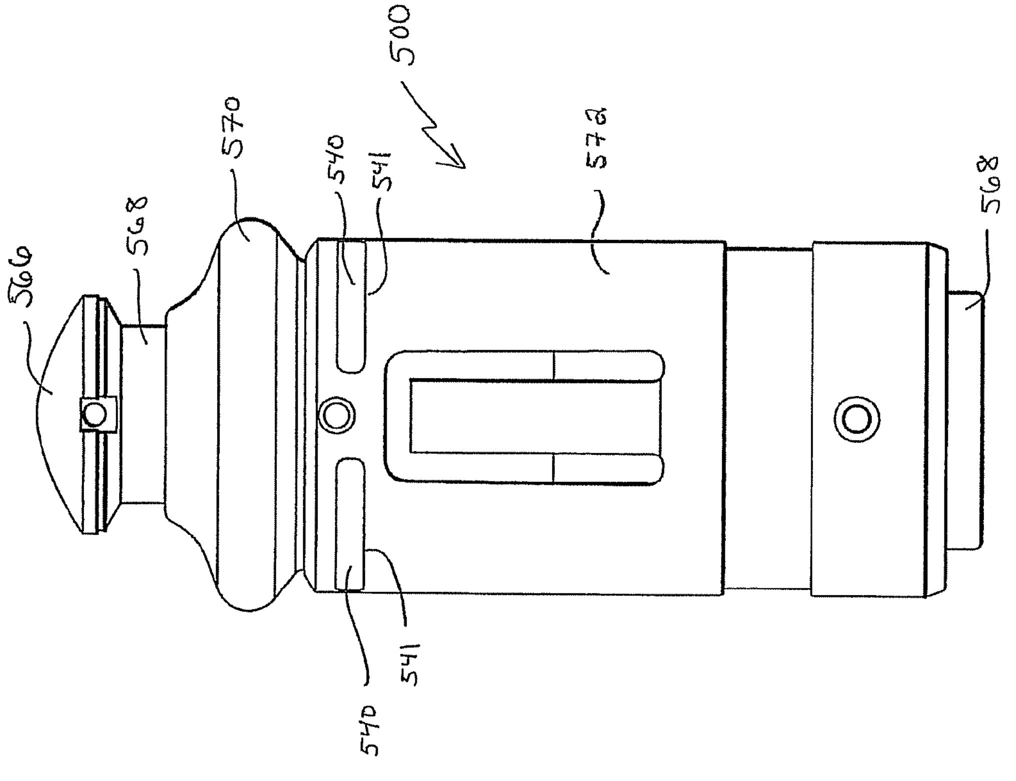
FIG. 42 is a front view of the mechanical separator of FIG. 41.
Figure 45:
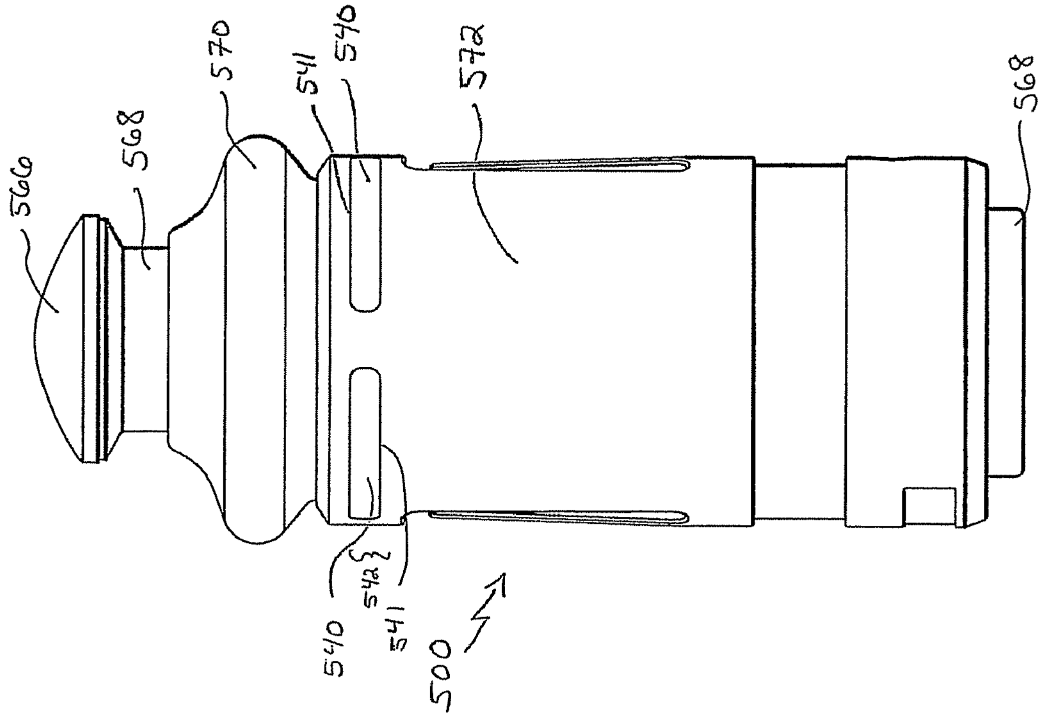
FIG. 45 is a right side view of the mechanical separator of FIG. 41.
Figure 44:
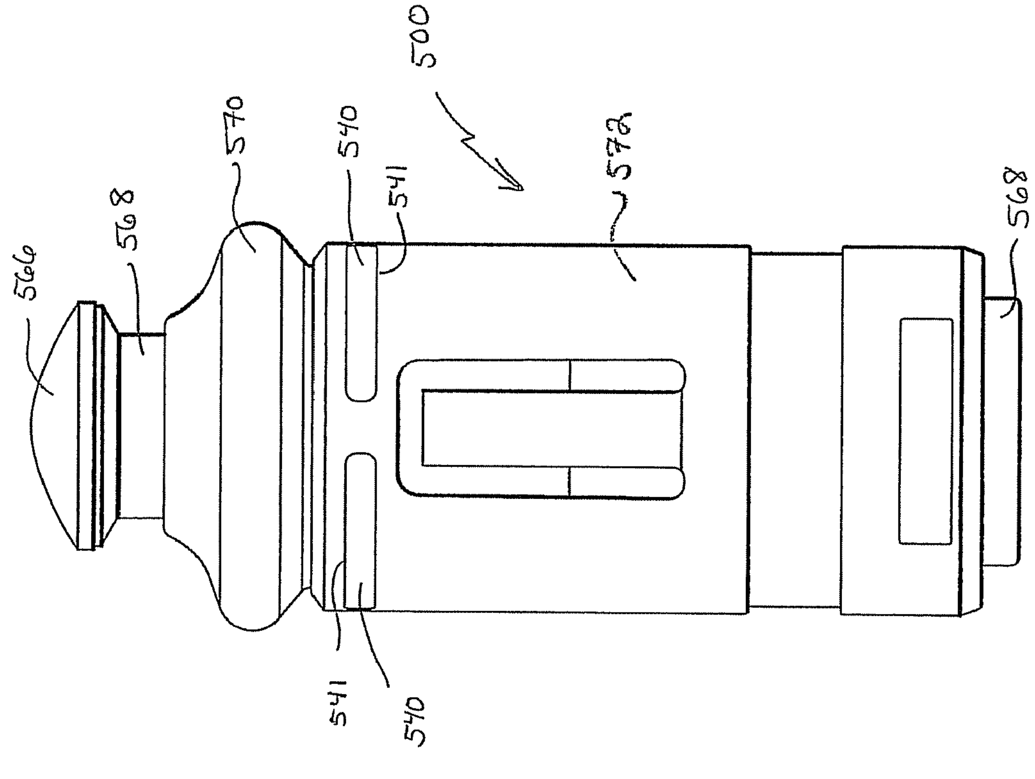
FIG. 44 is a rear view of the mechanical separator of FIG. 41.
Figure 47:
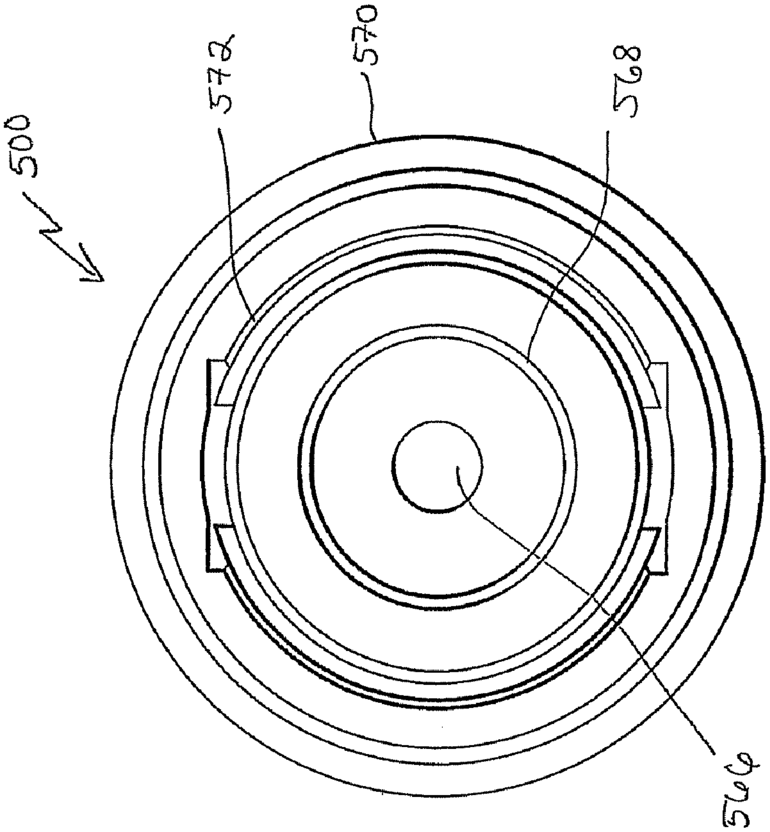
FIG. 47 is a bottom view of the mechanical separator of FIG. 41.
Figure 46:
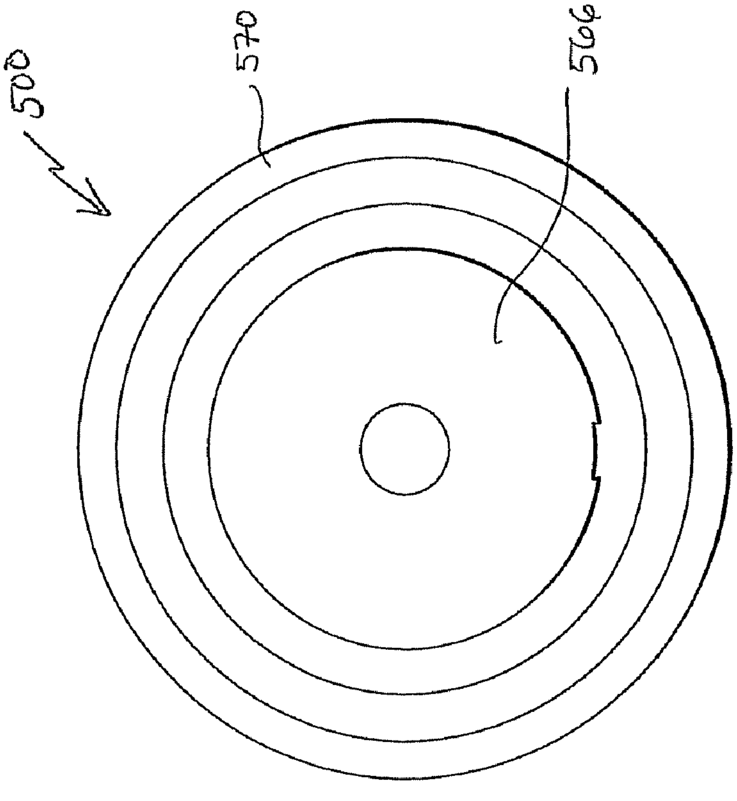
FIG. 46 is a top view of the mechanical separator of FIG. 41.

The assembled mechanical separator 420 is shown in FIGS. 39-40 including the joined first sub-assembly 400 (shown in FIGS. 35-36) and the second sub-assembly 408 (shown in FIGS. 37-38). In one embodiment, the assembled mechanical separator 420 may be scaled to fit within a 13 mm collection tube (not shown).

Figure 48:
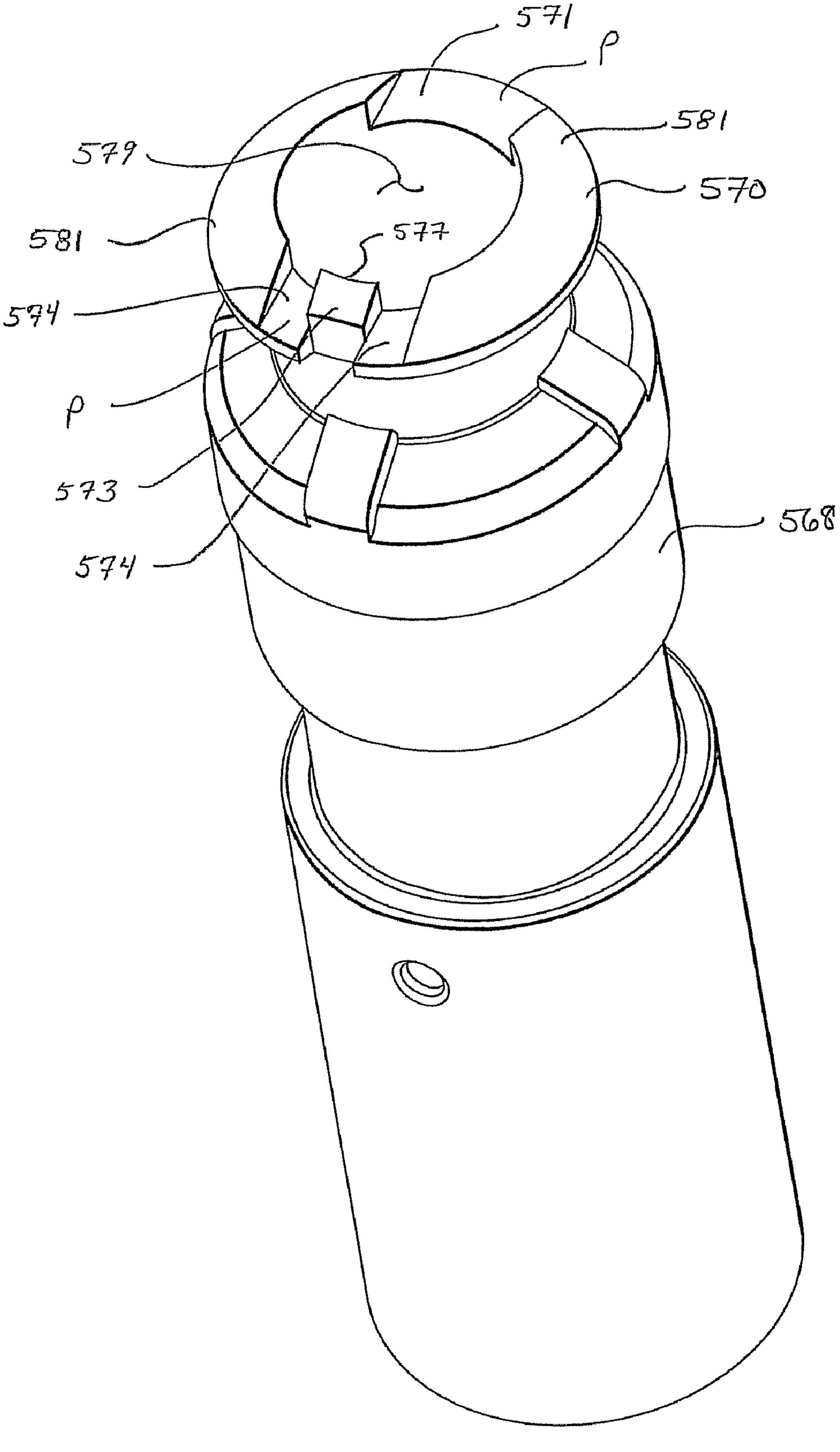
FIG. 48 is a perspective view of the float of the mechanical separator of FIG. 41.
Figure 49:
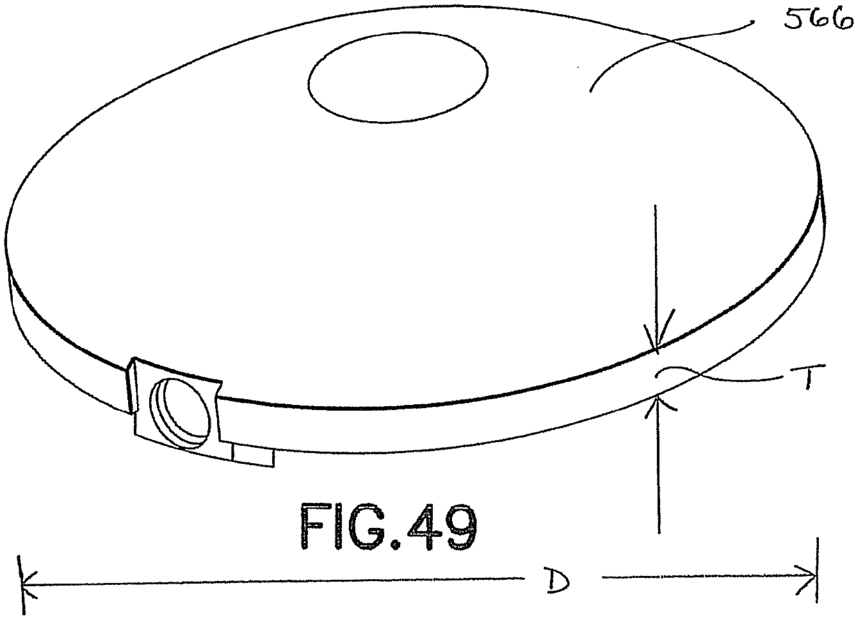
FIG. 49 is a top perspective view of the pierceable head of the mechanical separator of FIG. 41.
Figure 50:
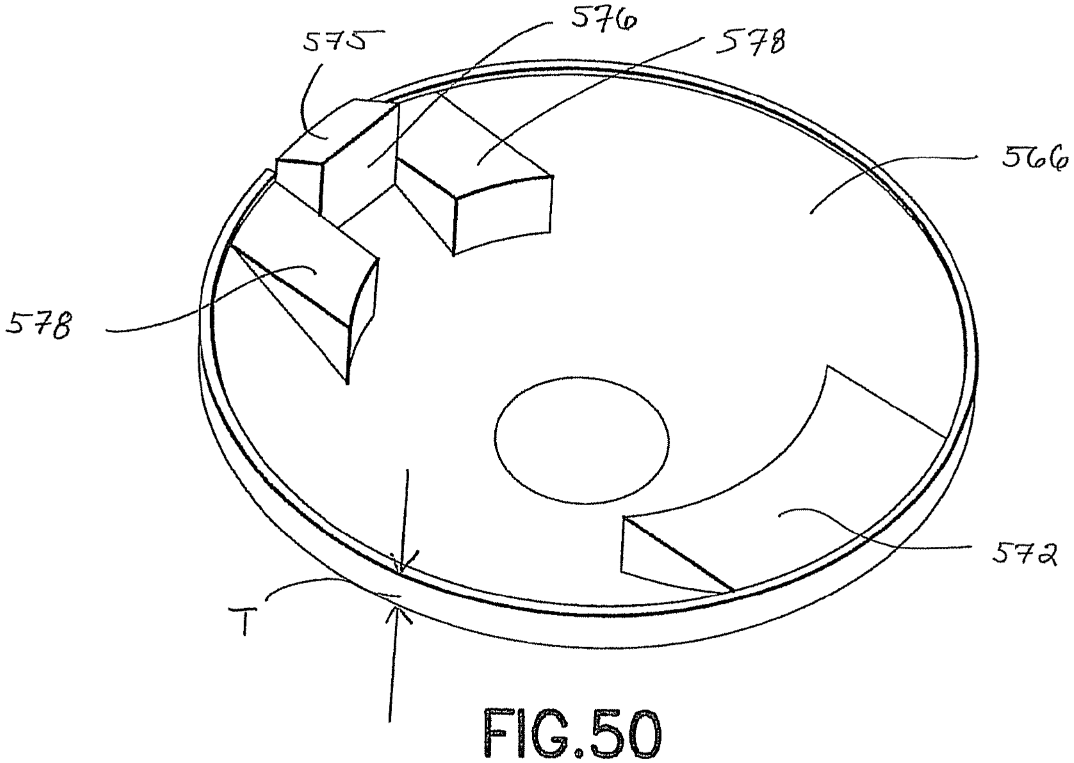
FIG. 50 is a bottom perspective view of the pierceable head of FIG. 49.

In accordance with yet another embodiment of the present invention, as shown in FIGS. 41-47, a mechanical separator 500 may include a ballast 572, a bellows 570, a float 568, and a pierceable head 566 as similarly described above. In this configuration, the float 568 and the pierceable head 566 may be co-formed or separately formed and subsequently assembled into a first sub-assembly, as described above. Referring specifically to FIG. 48, the float 568 may include an upper portion 570 having a profile P adapted for receiving the pierceable head portion 566, shown in FIGS. 49-50, in such a fashion that the thickness T of the pierceable head portion 566 is substantially uniform across the diameter D of the pierceable head portion 566, shown in FIG. 49. In one configuration, the upper portion 570 of the float 568 may have a recess 571 and the pierceable head portion 566 may have a corresponding protrusion 572 for mating with the recess 571 of float 568. In another configuration, the upper portion 570 of the float 568 may have a protrusion 573, such as a protrusion 573 flanked by corresponding recesses 574. The pierceable head portion 566 may also have a protrusion 575 having a mating surface 576 for abutting a corresponding surface 577 of the protrusion 573 of the float 568. The protrusion 575 of the pierceable head portion 566 may also include flanked protrusions 578 for engaging the corresponding recesses 574 of the float 568. The pierceable head portion 566 may be provided over the upper portion 570 such that the thickness T of the pierceable head portion 566 is uniform over the opening 579 of the float 568. In another embodiment, the pierceable head portion 566 may be provided over the upper portion 570 such that the thickness T of the pierceable head portion 566 is uniform over both the opening 579 of the float 566 and the surrounding ridge 581 of the float 566.

Referring once again to FIGS. 41-47, the ballast 572 and the bellows 570 may be co-formed or separately formed and subsequently assembled into a second sub-assembly, as described above. In one embodiment, the bellows 570 may include a protrusion 540, and the ballast 572 may include a corresponding recess 541 for receiving the protrusion 540 therein. The protrusion 540 and the recess 541 may correspondingly engage to form a locking structure 542, such that the ballast 572 and the bellows 570 are joined, and to improve bond strength and securement. In another embodiment, the bellows 570 may include a plurality of protrusions 540 space about a circumference of the bellows 570, and the ballast 572 may include a plurality of corresponding recesses 541 spaced about a circumference of the ballast 572.

Figure 51:
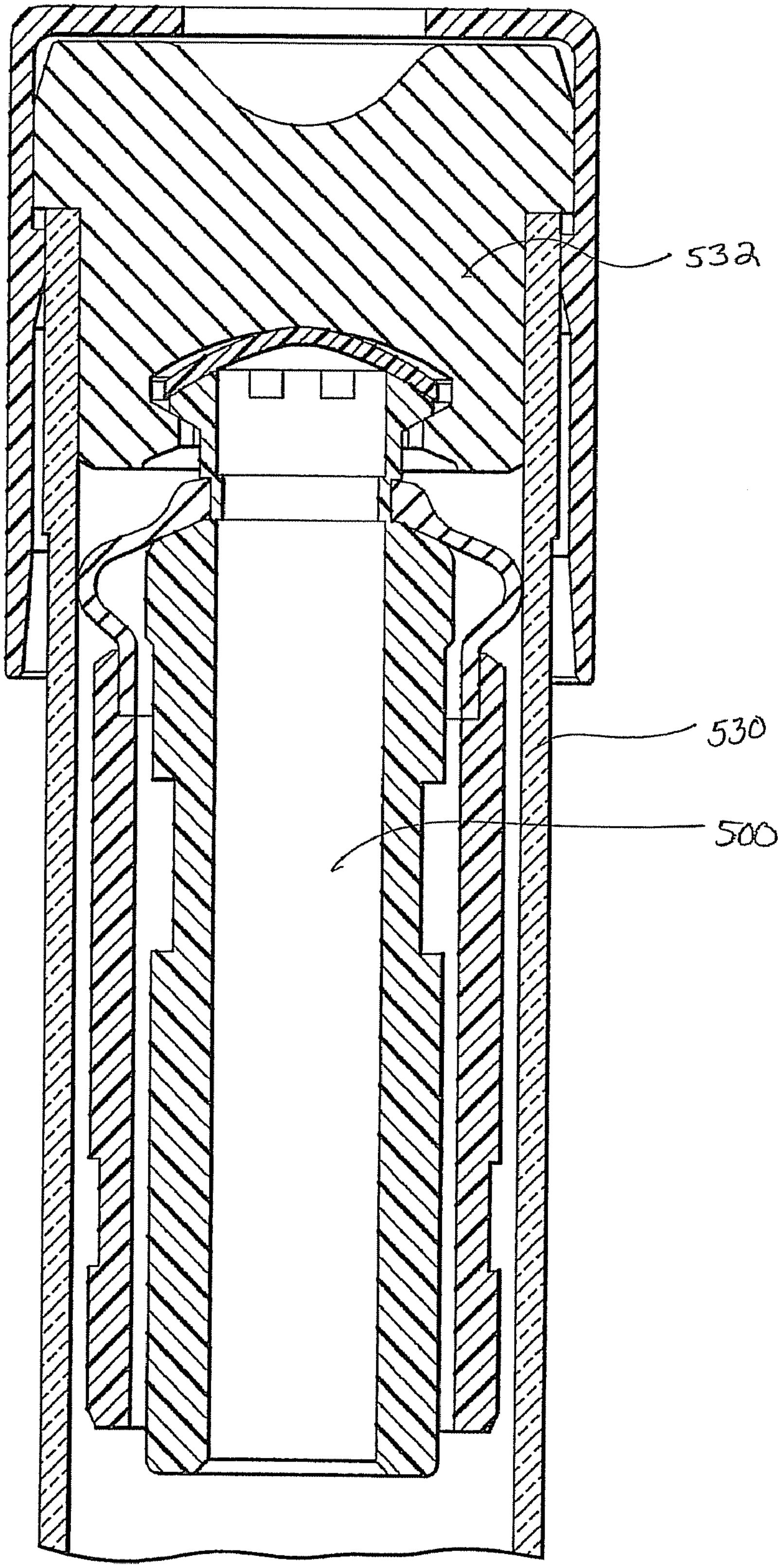
FIG. 51 is a cross-sectional front view of the mechanical separator of FIG. 41 positioned within a closure of the present invention.
Figure 52:
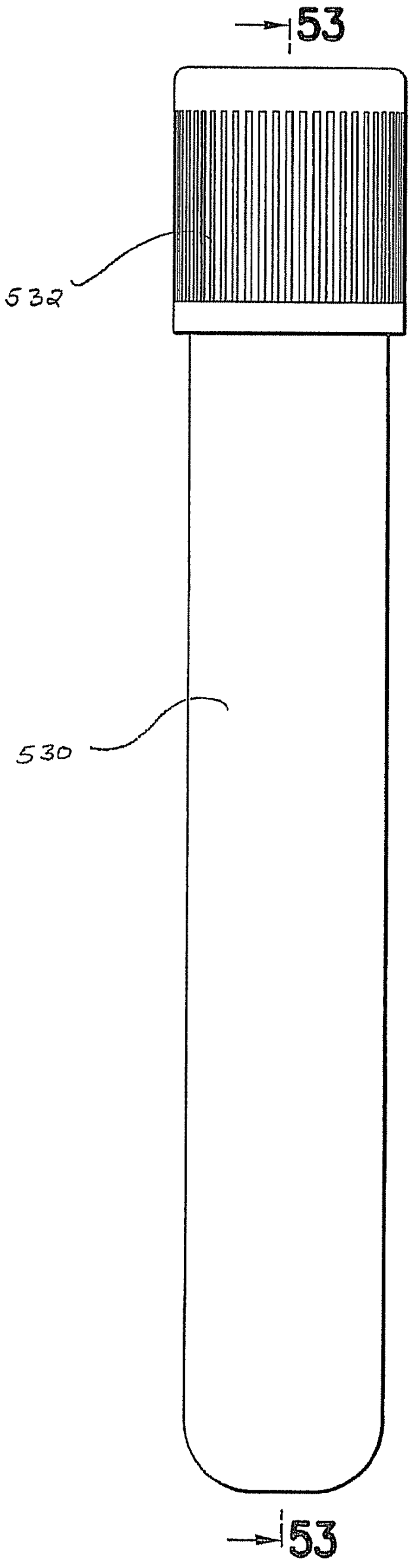
FIG. 52 is a front view of a specimen collection container having a closure with the mechanical separator of FIG. 41 disposed therein.
Figure 53:
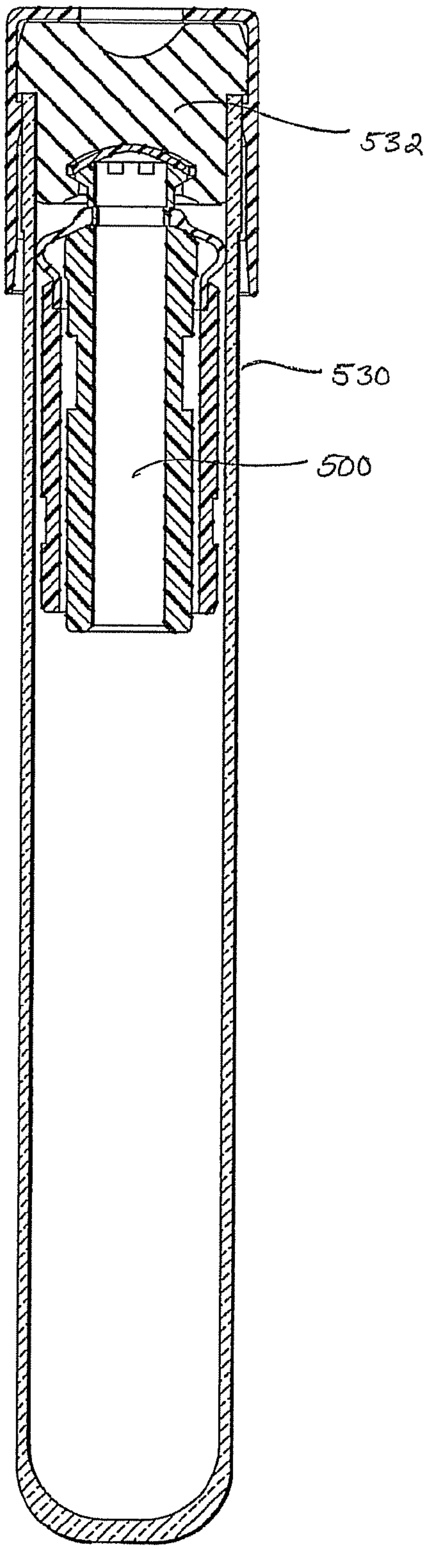
FIG. 53 is a cross-sectional front view of the specimen collection container, closure and mechanical separator of FIG. 52 taken along line 53-53 of FIG. 52.

The mechanical separator 500, shown in FIGS. 41-47 is shown in FIGS. 51-53 disposed within a specimen collection container 530 and a closure 532, as described herein.

Figure 54:
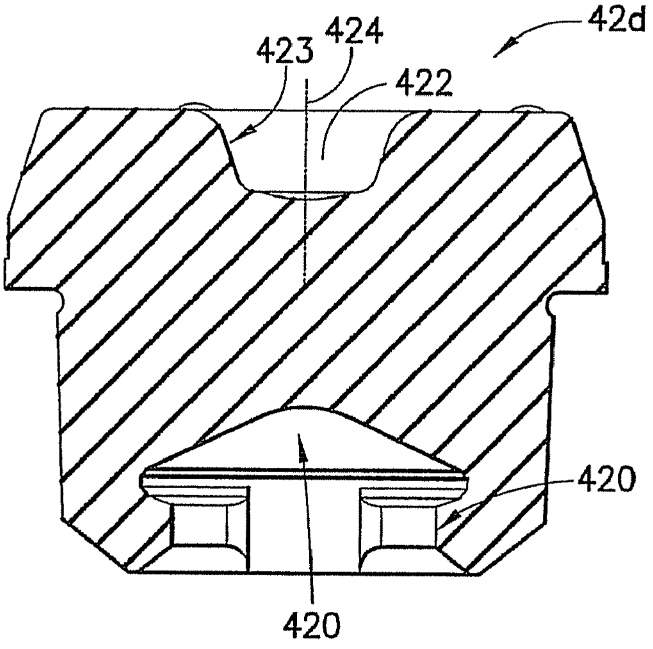
FIG. 54 is a partial cross-sectional front view of a closure and a portion of a mechanical separator in accordance with an embodiment of the present invention.
Figure 55:
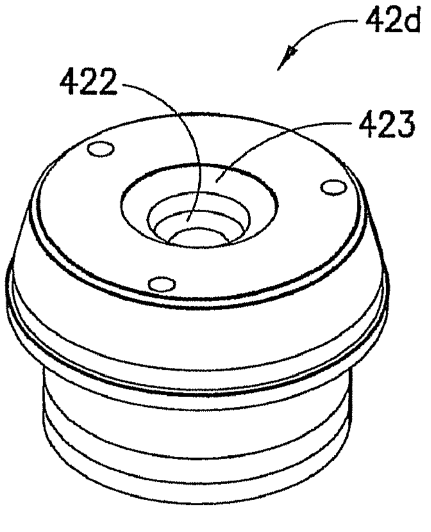
FIG. 55 is a perspective of the top view of the closure of FIG. 54.
Figure 56:
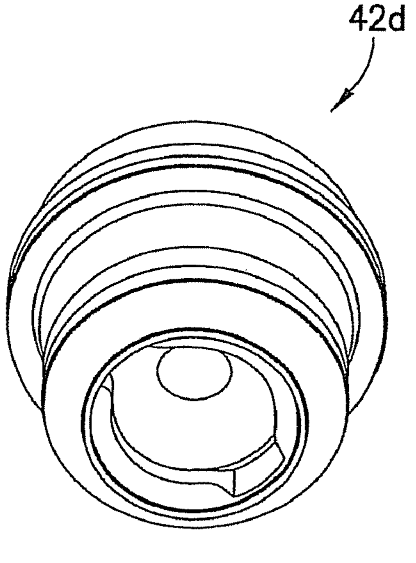
FIG. 56 is a perspective of the bottom view of the closure of FIG. 54.
Figure 58:
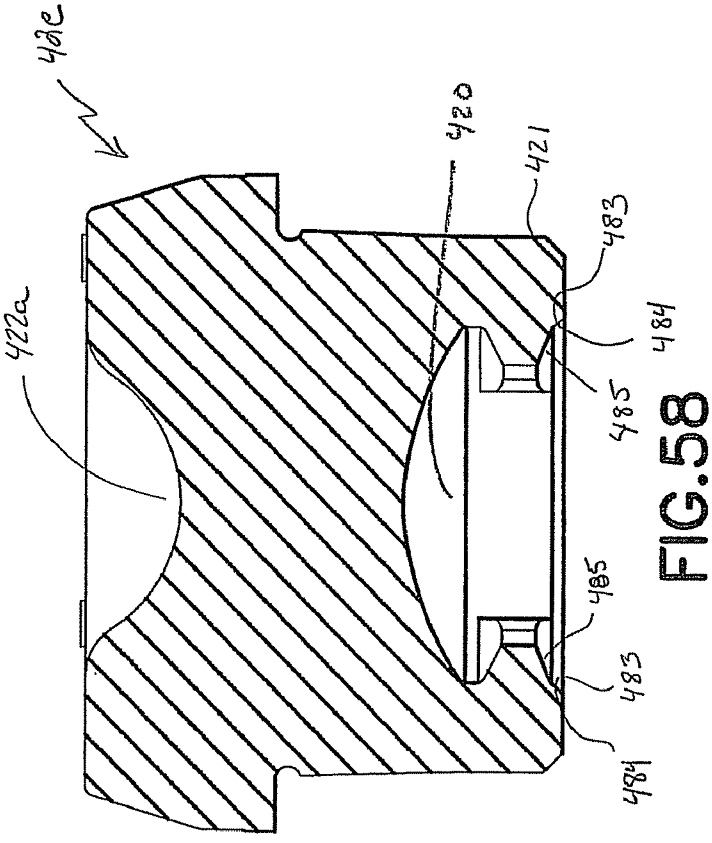
FIG. 58 is a cross-sectional side view of the alternative closure of FIG. 57 taken along line 58-58 of FIG. 57 and a portion of a mechanical separator in accordance with an embodiment of the present invention.
Figure 57:
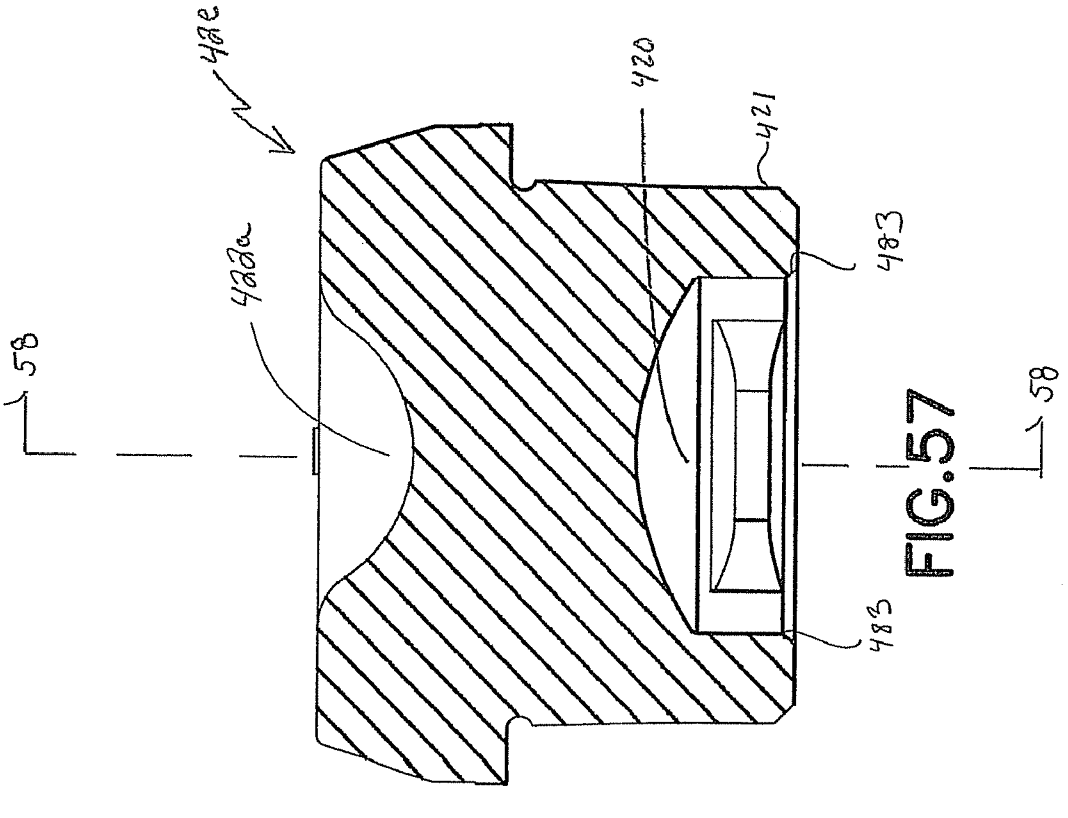
FIG. 57 is a cross-sectional front view of an alternative closure and a portion of a mechanical separator in accordance with an embodiment of the present invention.
Figure 58A:
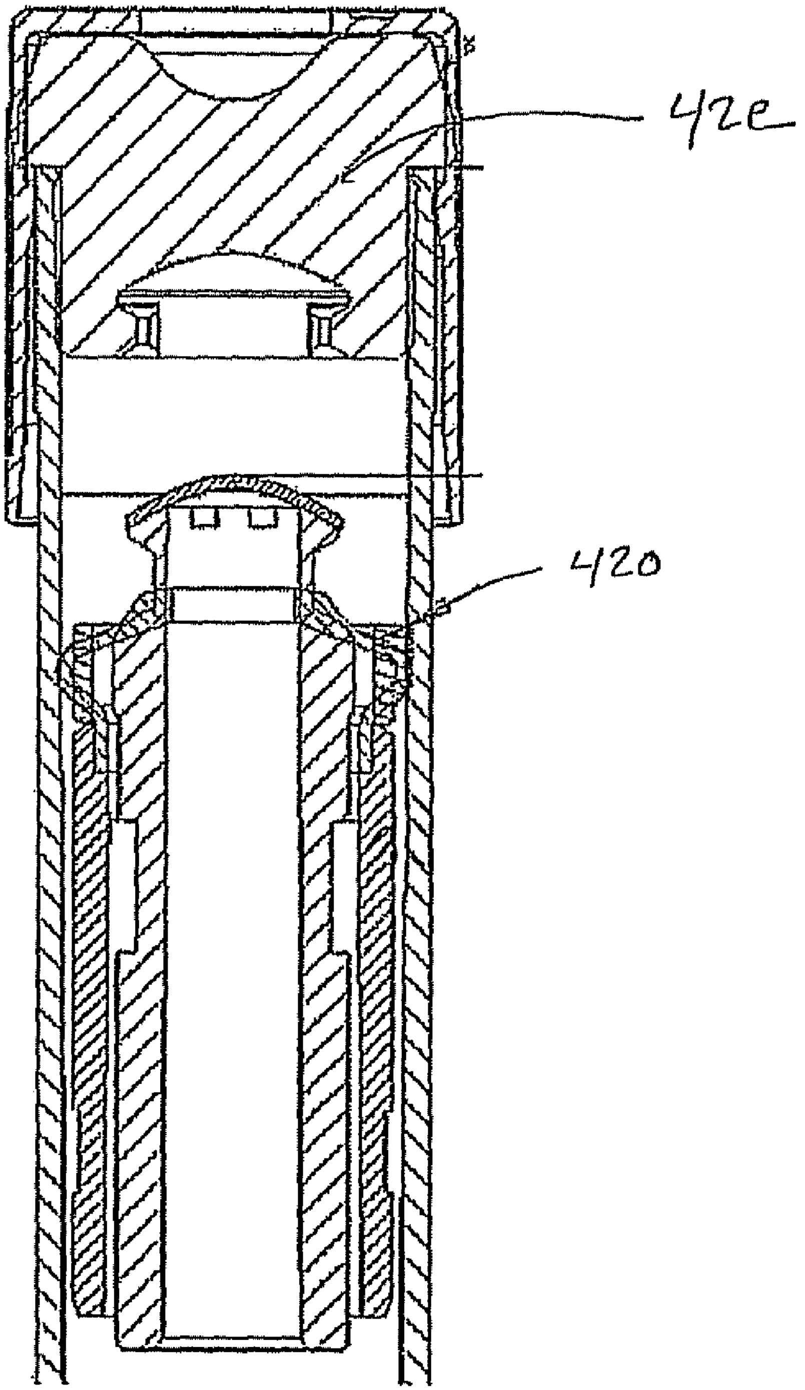
FIG. 58A is a cross-sectional front view of the alternative closure of FIGS. 57-58 engaged with a specimen collection container having a mechanical separator disposed therein in accordance with an embodiment of the present invention.

As shown in FIGS. 54-56, an alternative closure **42*d* may be utilized with the mechanical separator 420 of the present invention. In one embodiment, the closure 42*d* includes a receiving well 422 disposed within a portion of the closure adapted to receive a puncture tip (not shown) therein. The receiving well 422 may have any suitable dimensions to assist in centering the closure 42*d* with the puncture tip. In another embodiment, the receiving well 422 may include a tapered profile 423 for angling the puncture tip to the center 424 of the closure 42*d*. In yet another embodiment, as shown in FIGS. 57-58A, an alternative closure 42*e* may be utilized with the mechanical separator 420 of the present invention. In this configuration, the closure 42*e* may include an enlarged receiving well 422*a* adapted to receive a puncture tip (not shown) therein. The closure 42*e* may also include a smaller chamfered surface 483 adjacent the lower end 421 of the closure 42*e* for engaging a portion of the mechanical separator 420. In one embodiment, the chamfered surface 483 may include a first angled surface 484 and a second angled surface 485, with the first angled surface 484 having a greater angle than the second angled surface 485 for improving release of the mechanical separator 420 from the closure 42*e***.

Figure 59:
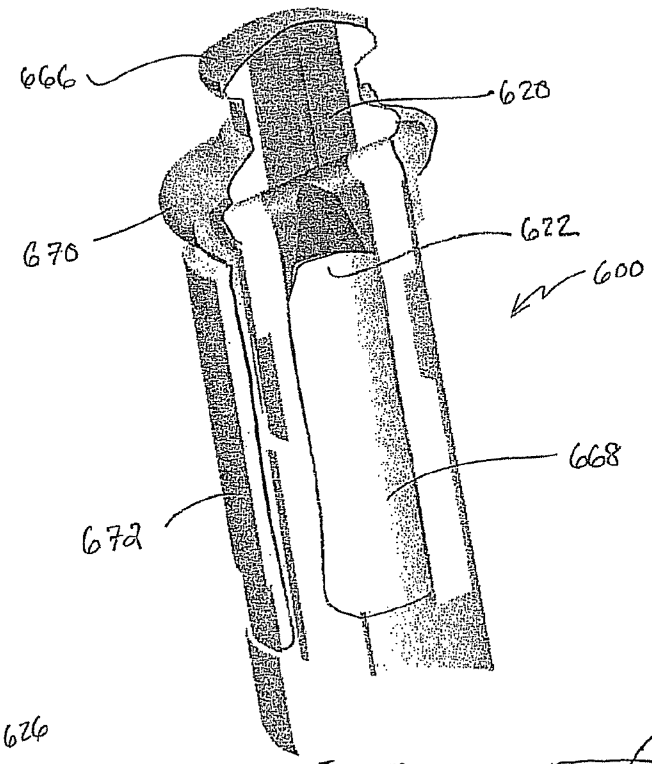
FIG. 59 is a partial cross-sectional perspective view of a mechanical separator having a moveable plug disposed within the float in accordance with an embodiment of the present invention.

In accordance with yet another embodiment of the present invention, shown in FIG. 59, a mechanical separator 600 may include a pierceable head portion 666, a float 668, a bellows 670, and a ballast 672 as described herein. In one configuration, the float 668 may be provided with a moveable plug 620 disposed within an interior portion 622 of the float 668. In one embodiment, the moveable plug 620 may be formed from the same material as the float 668, and in another embodiment, the moveable plug 620 may be formed from a material having substantially the same density as the density of the float 668. In yet another embodiment, the moveable plug 620 may be inserted within an interior portion 622 of the float 668 after formation of the float 668.

In certain situations, a mechanical separator 600 including a float 668 having a moveable plug 620 may be advantageous. For example, certain testing procedures require that a sample be deposited into a specimen collection container and that the specimen collection container be subjected to centrifugal force in order to separate the lighter and heavier phases within the sample, as described herein. Once the sample has been separated, the specimen collection container and sample disposed therein may be frozen, such as at temperatures of about −70° C., and subsequently thawed. During the freezing process, the heavier phase of the sample may expand forcing a column of sample to advance upwardly in the specimen collection container and through a portion of the interior portion 622 of the float 668 thereby interfering with the barrier disposed between the lighter and heavier phases. In order to minimize this volumetric expansion effect, a moveable plug 620 may be provided within the interior portion 622 of the float 668.

Figure 60:
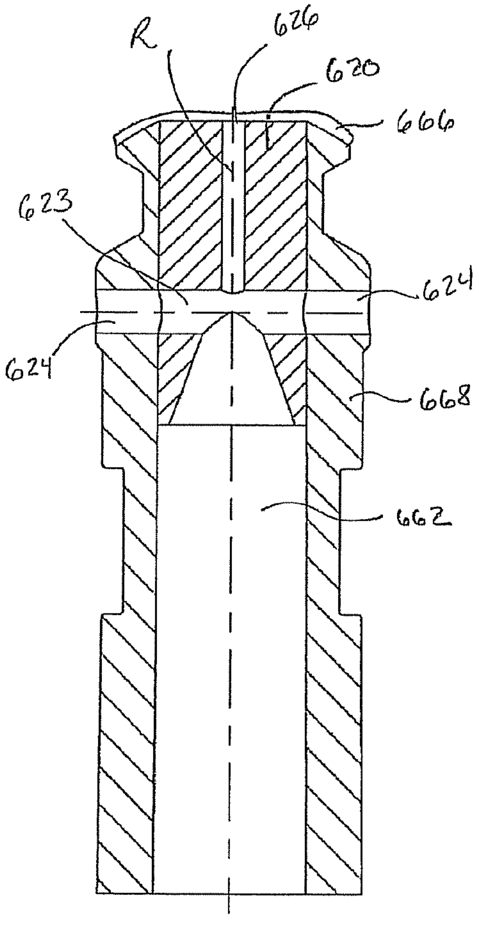
FIG. 60 is a cross-sectional front view of the float having a moveable plug disposed therein of FIG. 59 in an initial position.
Figure 61:
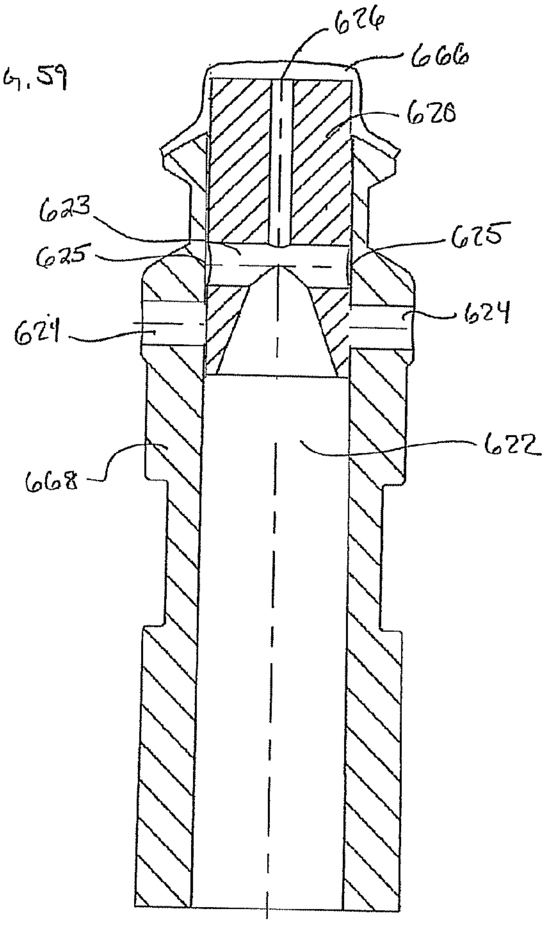
FIG. 61 is a cross-sectional front view of the float and moveable plug of FIG. 60 in a displaced position.

The moveable plug 620 may be provided with a transverse hole 623 which is substantially aligned with a transverse hole 624 provided in the float 668 in the initial position, shown in FIG. 60, and is substantially blocked by a blocking portion 625 of the float 668 in the displaced position, as shown in FIG. 61. In one embodiment, the transverse hole 624 of the moveable plug 620 is disposed substantially perpendicular to a longitudinal axis R of the moveable plug 668. The moveable plug 668 may also be provided with a longitudinal hole 626 that is substantially aligned with the interior portion 622 of the float 668 to allow sample to be directed therethrough upon introduction of a sample into the mechanical separator, as discussed above.

Referring to FIG. 60, in the initial position a sample is introduced into the mechanical separator disposed within a specimen collection container (not shown) through the pierceable head portion 666, through the longitudinal hole 626 of the moveable plug 620 and through the interior portion 622 of the float 668. After sampling and during application of centrifugal force to the mechanical separator, air trapped within the interior portion 622 of the float 668 may be vented through the transverse hole 623 of the moveable plug and the transverse hole 624 of the float 668 and released from the mechanical separator 600. Specifically, air may be vented from between the float 668 and the bellows 670 as described herein.

Referring to FIG. 61, once the sample is separated into lighter and denser phases within the specimen collection container (not shown) the sample may be frozen. During the freezing process, the denser portion of the sample may expand upwardly. In order to prevent the upwardly advanced denser portion of the sample from interfering with the lighter phase, and to prevent the denser portion of the sample from escaping the float 668, the moveable plug 620 advances upwardly with the expansion of the denser phase of the sample. As the moveable plug 620 is upwardly advanced, the transverse hole 623 of the moveable plug 620 aligns with a blocking portion 625 of the float 668, which prevents sample from exiting the moveable plug 620 and interior portion 622 of the float 668 through the transverse hole 623. The moveable plug 620 is adapted to advance with the expanded column of denser material present within the interior portion 622 of the float during freezing. It is anticipated herein, that the moveable plug 620 may be restrained at an upper limit of the pierceable head portion 666, shown schematically in FIGS. 59-61. In this configuration, the elasticity of the pierceable head portion 666 acts as a stretchable balloon to constrain the moveable plug 620 within the mechanical separator 600.

The advancement of the moveable plug 620 may be entirely passive and responsive to the externally applied freezing conditions of the sample. In certain instances, the moveable plug 620 may also be provided to return to its initial position upon subsequent thawing of the sample.

Figure 62:
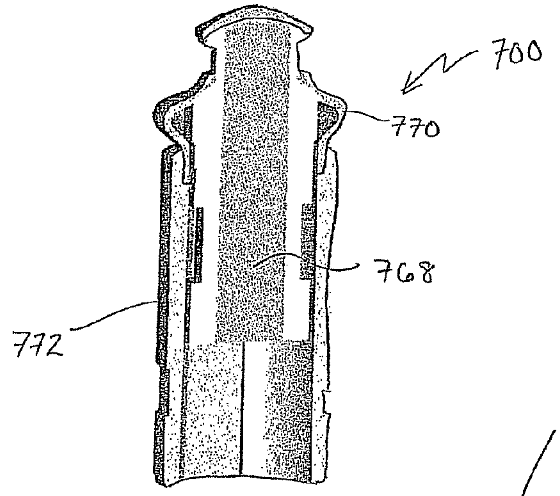
FIG. 62 is a partial cross-sectional view of a mechanical separator having a solid float in accordance with an embodiment of the present invention.
Figure 63:
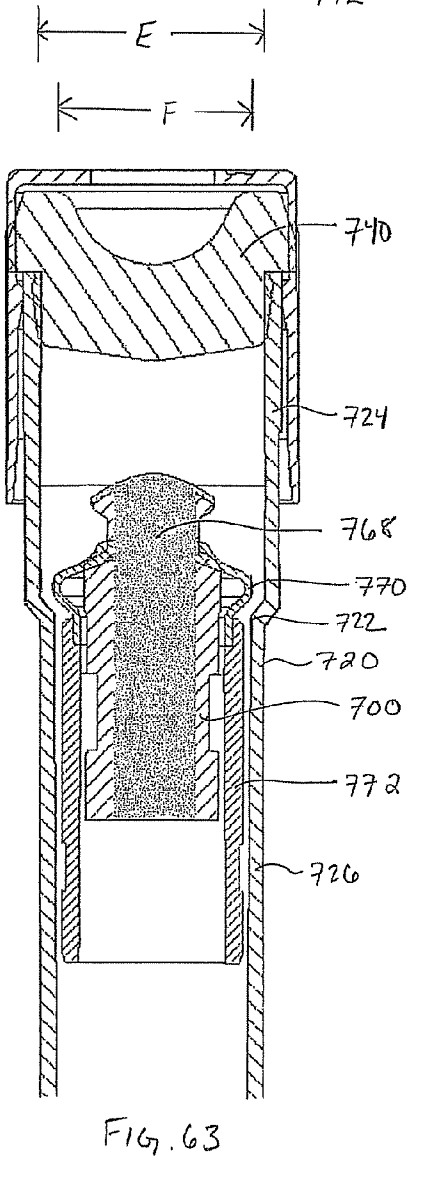
FIG. 63 is a cross-sectional front view of the mechanical separator of FIG. 62 disposed within a specimen collection container and engaged with a closure.
Figure 64:
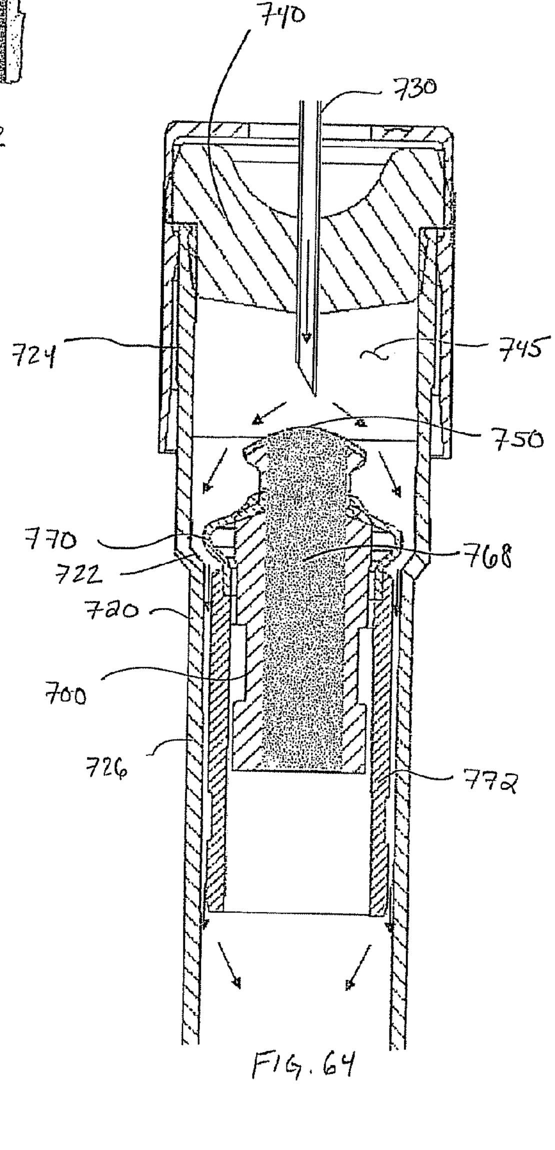
FIG. 64 is a cross-sectional front view of the mechanical separator of FIG. 63 having a needle disposed through a portion of the closure for introducing sample into the specimen collection container.

In yet another embodiment, as shown in FIGS. 62-64, a mechanical separator 700 may include a bellows 770, a ballast 772, as described herein, and a solid float 768 that does not require a pierceable head portion. In this configuration, it is anticipated that the mechanical separator 700 may be restrained within a specimen collection container 720 in an initial position. In one configuration, the mechanical separator 700 may be restrained with the specimen collection container 720 due to a frictional interference with a portion of the sidewall 722 of the specimen collection container 720. In another embodiment, the specimen collection container 720 may include a first portion 724 having a first diameter E and a second portion 726 having a second diameter F, with the first diameter E being larger than the second diameter F. In this configuration, the mechanical separator 700 may be restrained at the interface of the first portion 724 and the second portion 726.

During introduction of a sample into the specimen collection container 720, a needle 730 pierces a portion of the closure 740 and introduces a sample into the interior 745 of the specimen collection container 720. It is anticipated herein that the needle 730 does not pierce the float 768 but rather introduces the sample onto a top surface of the float 768. Sample is then directed around the mechanical separator 700 and passes into the lower portions of the specimen collection container 720. After the sample is introduced into the interior 745 of the specimen collection container 720, the needle is removed and the closure re-seals. Upon application of centrifugal force, the mechanical separator 700 disengages from a restrained position with the sidewall 722 of the specimen collection container 720 upon deformation of the bellows 770 as described herein. In one configuration, at least one of the mechanical separator 700 and the specimen collection container 720 may include a recess for allowing sample to pass between the mechanical separator 700 and the sidewall 722 of the specimen collection container 720 during introduction of the sample.

Figure 65:
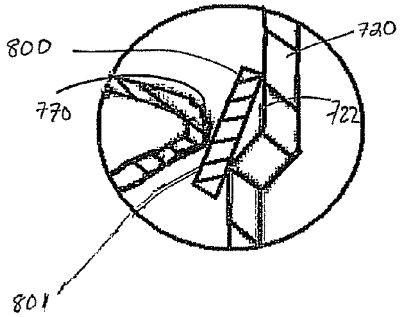
FIG. 65 is a partial cross-sectional front view of an alternative embodiment of a mechanical separator disposed within a specimen collection container having a separation component in accordance with an embodiment of the present invention.
Figure 66:
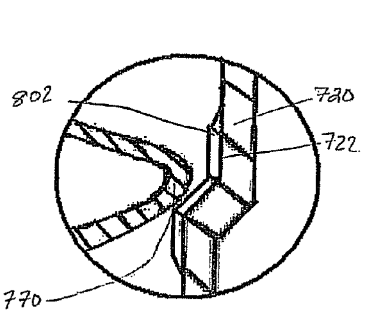
FIG. 66 is a partial cross-sectional front view of an alternative embodiment of a mechanical separator disposed within a specimen collection container having a ribbed protrusion in accordance with an embodiment of the present invention.
Figure 67:
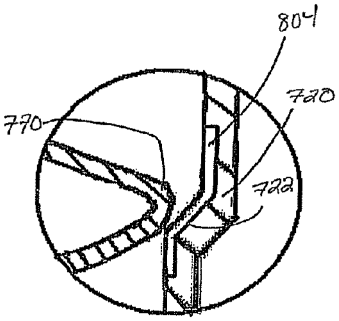
FIG. 67 is a partial cross-sectional front view of an alternative embodiment of a mechanical separator disposed within a specimen collection container having a cutout in accordance with an embodiment of the present invention.

In accordance with yet another embodiment, as shown in FIG. 65, a separation component 800 may be provided between a portion of the bellows 770 and the sidewall 722 of the specimen collection container 720 to assist in at least one of the restraint of the bellows 770 with the sidewall 722, and the passage of sample around the bellows 770 upon entry of the sample into the specimen collection container. In this configuration, the separation component 800 may be a sleeve having an angled portion 801 adapted to allow passage of sample therearound. In accordance with another embodiment, as shown in FIG. 66, the specimen collection container 720 may include a ribbed protrusion 802, such as a plurality of radially spaced ribbed protrusions 802, spaced inwardly from a portion of the sidewall 722. The ribbed protrusion 802 may allow sample to pass therearound while restraining at least a portion of the bellows 770 with the sidewall 722 of the specimen collection container 720. In accordance with yet another embodiment, as shown in FIG. 67, the specimen collection container 720 may include a cutout 804, such as a plurality of radially spaced cutouts 804, within a portion of the sidewall 722. The cutouts 804 may allow sample to pass therethrough while a portion of the sidewall 722 of the specimen collection container 720 restrains at least a portion of the bellows 770.

Figure 68:
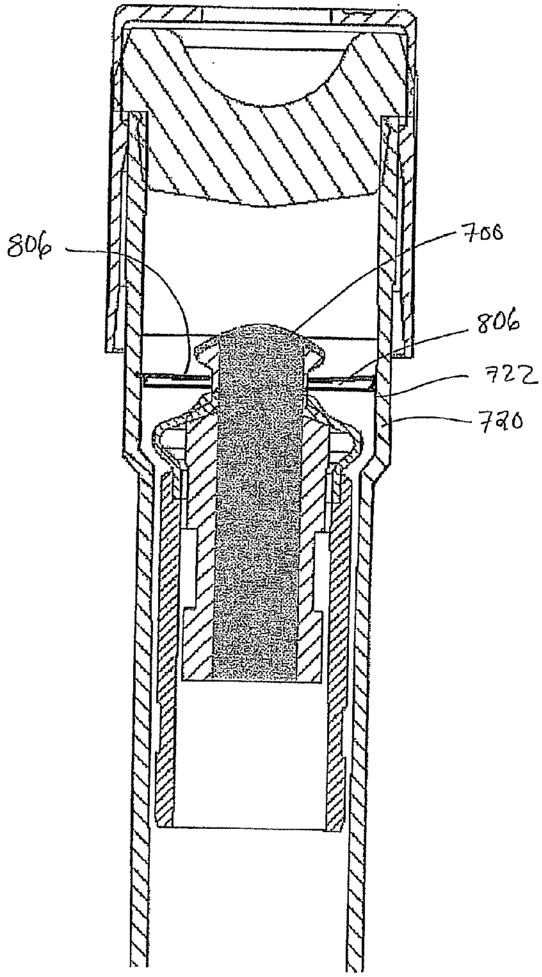
FIG. 68 is a partial cross-sectional front view of the mechanical separator of FIG. 63 having a washer disposed about a portion of the mechanical separator in accordance with an embodiment of the present invention.
Figure 69:
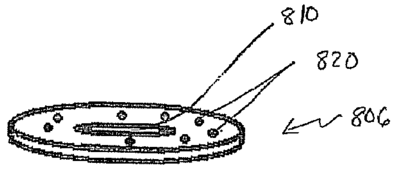
FIG. 69 is a perspective view of a washer of FIG. 68.
Figure 70:
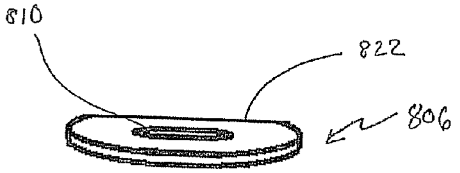
FIG. 70 is a perspective view of an alternative embodiment of the washer of FIG. 68.

In accordance with yet another embodiment, as shown in FIGS. 68-70, the mechanical separator 700 may be restrained against a sidewall 722 of the specimen collection container 720 by a washer 806. The washer 806 may constrain a portion of the mechanical separator 700 such as a portion of the float 768 through an opening 810 in the washer 806. The washer 806 may restrain the mechanical separator 700 with the sidewall 722 through an interference fit. Optionally, the washer 806 may be bonded to the sidewall 722 of the specimen collection container 720. The washer 806 is configured to restrain the mechanical separator 700 with a portion of the specimen collection container 720 and to allow sample to pass around the mechanical separator 700 when introduced into the specimen collection container 720. The washer 806 may hold the mechanical separator 700 in such a fashion that it substantially prevents the mechanical separator 700 from occluding the flow of sample into the specimen collection container 720. Specifically, the washer 806 may hold the mechanical separator 700 in place within the specimen collection container 720 such that sample may pass between the bellows of the mechanical separator 700 and the sidewall 722 of the specimen collection container 720. The washer 806 may also be used with a specimen collection container 700 having a first portion having a larger diameter and a second portion having a smaller diameter as shown herein. In this configuration, the washer 806 may prevent the bellows of the mechanical separator 700 from sealing the junction of the first portion and the second portion of the specimen collection container 720, such as where the specimen collection container 720 "necks down." In this configuration, the washer 806 prevents the mechanical separator 700 from occluding the path of sample into the specimen collection container 720.

In one embodiment the washer 806 includes a plurality of ports 820 adapted to allow passage of the sample therethrough, as shown in FIG. 69. In another embodiment, the washer 806 includes a cut-away portion 822 adapted to allow passage of the sample between the washer 806 and a portion of the sidewall 722 of the specimen collection container 720, as shown in FIG. 70.

Figure 71:
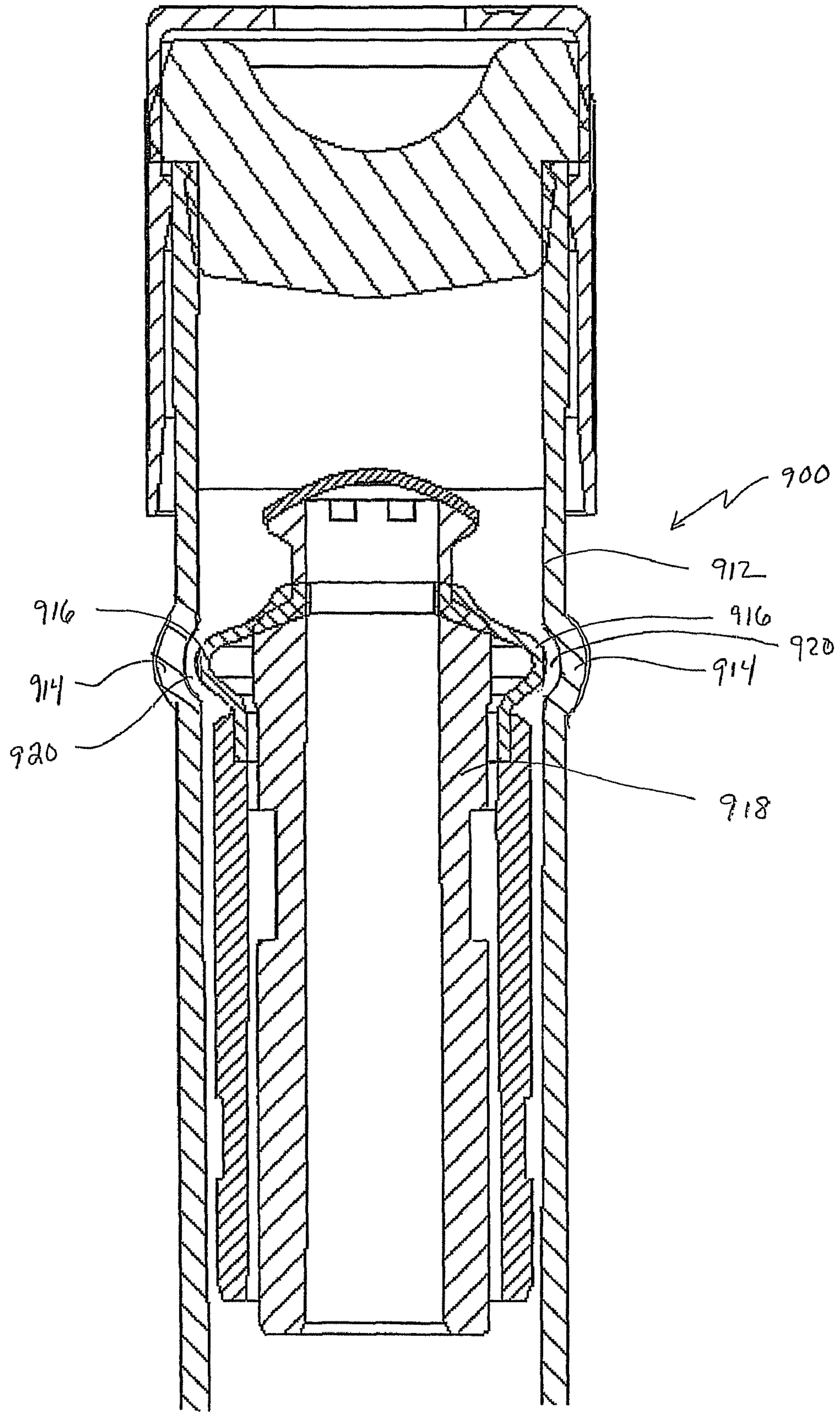
FIG. 71 is a cross-sectional front view of a specimen collection container having a closure engaged therewith and having a mechanical separator disposed therein in accordance with an embodiment of the present invention.

In accordance with yet another embodiment, as shown in FIG. 71, in certain embodiments a portion of the sidewall 912 of the specimen collection container 900 may include a protrusion 914. Optionally, opposing portions of the sidewall 912 may include opposing protrusions 914 adapted to allow a sample entering the specimen collection container 900 to pass around a portion of the bellows 916 of a mechanical separator 918 disposed therein. In this configuration, a portion of the sidewall 912 having a substantially straight profile may contact a portion of the bellows 916 to secure the mechanical separator 918 within the specimen collection container 900 by an interference fit. Another portion of the sidewall 912 of the specimen collection container 900, such as opposing portions of the sidewall 912, may include opposing protrusions having a substantially outwardly curved profile for allowing sample to pass between the sidewall 912 and the bellows 916. In this configuration, the portion of the bellows 916 aligned with the opposing protrusions 914 do not touch the sidewall 912 of the specimen collection container 900, establishing a space 920 for flow of sample therebetween.

Although the present invention has been described in terms of a mechanical separator disposed within the tube adjacent the open end, it is also contemplated herein that the mechanical separator may be located at the bottom of the tube, such as affixed to the bottom of the tube. This configuration can be particularly useful for plasma applications in which the blood sample does not clot, because the mechanical separator is able to travel up through the sample during centrifugation.

While the present invention is described with reference to several distinct embodiments of a mechanical separator assembly and method of use, those skilled in the art may make modifications and alterations without departing from the scope and spirit. Accordingly, the above detailed description is intended to be illustrative rather than restrictive.

The invention claimed is:

1. A separation assembly for enabling separation of a fluid sample into first and second phases, comprising:

a tube, having an open end, a second end, and a sidewall extending therebetween;

a closure adapted for sealing engagement with the open end of the tube, the closure defining a recess; and a mechanical separator releasably engaged within the recess, the mechanical separator comprising:

a float comprising a passageway extending between first and second ends thereof with a pierceable head enclosing the first end of the float;

a ballast longitudinally movable with respect to the float; and a bellows extending between a portion of the float and a portion of the ballast, the bellows adapted for deformation upon longitudinal movement of the float and the ballast, the bellows isolated from the pierceable head, wherein both the pierceable head and the bellows comprise a thermoplastic elastomer.

2. The separation assembly of claim 1, wherein the float has a first density, and the ballast has a second density greater than the first density of the float.

3. The separation assembly of claim 1, wherein the pierceable head is structured to resist deformation upon application of a puncture tip therethrough.

4. The separation assembly of claim 1, wherein the pierceable head and the bellows are isolated by a portion of the float.

5. The separation assembly of claim 1, wherein the pierceable head and the bellows are isolated by a neck portion of the float.

6. The separation assembly of claim 1, wherein the bellows comprises an interior wall defining a restraining surface, and the float comprises a shoulder for engaging the restraining surface.

7. The separation assembly of claim 1, wherein the ballast defines an interlock recess for accommodating a portion of the bellows for attachment thereto.

8. A separation assembly for enabling separation of a fluid sample into first and second phases, comprising:

a closure adapted for sealing engagement with a tube, the closure defusing a recess; and a mechanical separator, comprising:

a float defining a passageway extending between first and second ends thereof with a pierceable head enclosing the first end of the float, the pierceable head releasably engaged within the recess;

a ballast longitudinally movable with respect to the float, the ballast having a second density greater than the first density of the float; and a bellows extending between a portion of the float and a portion of the ballast, the bellows adapted for deformation upon longitudinal movement of the float and the ballast, the bellows isolated from the pierceable head, wherein both the pierceable head and the bellows comprise a thermoplastic elastomer.

9. The separation assembly of claim 8, wherein the interface between the closure and the mechanical separator occurs only between the pierceable head and the recess.

10. The separation assembly of claim 8, wherein the mechanical separator may be released from the closure without elongation of the deformable bellows.

* * * * *